United States Patent
Voigt et al.

(10) Patent No.: US 10,061,958 B2
(45) Date of Patent: Aug. 28, 2018

(54) METHODS AND A COMPUTING DEVICE FOR DETERMINING WHETHER A MARK IS GENUINE

(71) Applicant: SYS-TECH SOLUTIONS, INC., Princeton, NJ (US)

(72) Inventors: Matthias Voigt, Lawrenceville, NJ (US); Michael L. Soborski, Allentown, NJ (US); Rafik Ayoub, Princeton Junction, NJ (US)

(73) Assignee: Sys-Tech Solutions, Inc., Princeton, NJ (US)

(*) Notice: Subject to any disclaimer, the term of this patent is extended or adjusted under 35 U.S.C. 154(b) by 0 days.

(21) Appl. No.: 15/457,380

(22) Filed: Mar. 13, 2017

(65) Prior Publication Data
US 2017/0262680 A1    Sep. 14, 2017

Related U.S. Application Data

(60) Provisional application No. 62/307,901, filed on Mar. 14, 2016.

(51) Int. Cl.
*G06K 7/14* (2006.01)
*G06K 9/00* (2006.01)
*G06K 9/62* (2006.01)

(52) U.S. Cl.
CPC ......... *G06K 7/1434* (2013.01); *G06K 7/1413* (2013.01); *G06K 7/1417* (2013.01);
(Continued)

(58) Field of Classification Search
CPC .. G06K 7/1434; G06K 9/6218; G06K 7/1417; G06K 9/6289; G06K 9/00577; G06K 7/1413; G06K 2009/0059
(Continued)

(56) References Cited

U.S. PATENT DOCUMENTS 5,153,418 A    10/1992    Batterman et al.
5,325,167 A    6/1994    Melen
(Continued)

FOREIGN PATENT DOCUMENTS

GB    2221870 A    2/1990
JP    2004-109172 A    4/2004
(Continued)

OTHER PUBLICATIONS

Extended European Search Report issued in related application EP 15755854.5, dated Feb. 27, 2017, 11 pages.
(Continued)

*Primary Examiner* — Amandeep Saini
(74) *Attorney, Agent, or Firm* — Drinker Biddle & Reath LLP

(57) ABSTRACT

Methods for determining whether a mark is genuine are described. According to various implementations, a computing device (or logic circuitry thereof) receives (e.g., via a camera or via a communication network) an image of a candidate mark (e.g., a one-dimensional or two-dimensional barcode), uses the image to make measurements of a characteristic of a feature of the candidate mark, resulting in a profile for that feature. The computing device filters out, from the feature profile, all spatial frequency components that are indicated to be sibling frequency components. In some embodiments, the computing device carries out the reverse procedure, and filters out all spatial frequency components except for those indicated to be sibling frequency components.

26 Claims, 38 Drawing Sheets

(52) U.S. Cl.
CPC ....... G06K 9/00577 (2013.01); G06K 9/6218 (2013.01); G06K 9/6289 (2013.01); *G06K 2009/0059* (2013.01)

(58) Field of Classification Search
USPC .................................................. 382/141
See application file for complete search history.

(56) References Cited

U.S. PATENT DOCUMENTS

| | | | |
|---|---|---|---|
| 5,351,834 A | 10/1994 | Duss | |
| 5,465,303 A | 11/1995 | Levison et al. | |
| 5,521,984 A | 5/1996 | Denenberg et al. | |
| 5,563,401 A | 10/1996 | Lemelson | |
| 5,583,950 A | 12/1996 | Prokoski | |
| 5,673,338 A | 9/1997 | Denenberg et al. | |
| 5,883,971 A | 3/1999 | Bolle et al. | |
| 5,946,103 A | 8/1999 | Curry | |
| 5,978,495 A | 11/1999 | Thomopoulos et al. | |
| 6,032,861 A | 3/2000 | Lemelson et al. | |
| 6,185,318 B1 | 2/2001 | Jain et al. | |
| 6,398,117 B1 | 6/2002 | Oakeson et al. | |
| 6,460,766 B1 | 10/2002 | Olschafskie et al. | |
| 6,543,691 B1 | 4/2003 | Lemelson et al. | |
| 6,612,494 B1 | 9/2003 | Outwater | |
| 6,760,472 B1 | 7/2004 | Takeda et al. | |
| 6,922,480 B2 | 7/2005 | Rhoads | |
| 6,970,236 B1 | 11/2005 | Markantes et al. | |
| 7,025,269 B2 | 4/2006 | Marshall | |
| 7,044,376 B2 | 5/2006 | Nelson et al. | |
| 7,080,041 B2 | 7/2006 | Nagel | |
| 7,229,025 B2 | 6/2007 | Sussmeier et al. | |
| 7,264,174 B2 | 9/2007 | Chang et al. | |
| 7,277,891 B2 | 10/2007 | Howard et al. | |
| 7,474,773 B2 | 1/2009 | Chau | |
| 7,526,110 B2 | 4/2009 | Niinuma et al. | |
| 7,533,062 B2 | 5/2009 | Sanchez et al. | |
| 7,576,842 B2 | 8/2009 | Park | |
| 7,577,844 B2 | 8/2009 | Kirovski | |
| 7,616,797 B2 | 11/2009 | Bailey et al. | |
| 7,673,807 B2 | 3/2010 | Simske et al. | |
| 7,697,729 B2 | 4/2010 | Howell et al. | |
| 7,752,077 B2 | 7/2010 | Holden et al. | |
| 7,773,812 B2 | 8/2010 | Hanus et al. | |
| 8,027,468 B2 | 9/2011 | McCloskey | |
| 8,061,611 B2 | 11/2011 | Cheung et al. | |
| 8,194,919 B2 | 6/2012 | Rodriguez et al. | |
| 8,267,321 B2 | 9/2012 | Kuyper-Hammond et al. | |
| 8,542,930 B1 | 9/2013 | Negro et al. | |
| 8,950,662 B2 | 2/2015 | Soborski | |
| 2002/0041712 A1 | 4/2002 | Roustaei et al. | |
| 2002/0087869 A1 | 7/2002 | Kim | |
| 2002/0113127 A1 | 8/2002 | Takeuchi et al. | |
| 2002/0122878 A1 | 9/2002 | Kerns et al. | |
| 2002/0171862 A1 | 11/2002 | Nagashige | |
| 2003/0021452 A1 | 1/2003 | Hamid | |
| 2003/0169456 A1 | 9/2003 | Suzaki | |
| 2004/0161153 A1 | 8/2004 | Lindenbaum | |
| 2004/0263911 A1 | 12/2004 | Rodriguez et al. | |
| 2005/0053236 A1 | 3/2005 | Samii et al. | |
| 2005/0161515 A1 | 7/2005 | Lubow | |
| 2005/0234857 A1 | 10/2005 | Plutchak et al. | |
| 2005/0257064 A1 | 11/2005 | Boutant et al. | |
| 2007/0041622 A1 | 2/2007 | Salva Calcagno | |
| 2007/0170257 A1 | 7/2007 | Haraszti | |
| 2007/0199991 A1 | 8/2007 | Haraszti et al. | |
| 2008/0025555 A1 | 1/2008 | Visan et al. | |
| 2008/0149725 A1 | 6/2008 | Rosenbaum | |
| 2008/0181447 A1 | 7/2008 | Adams et al. | |
| 2008/0226297 A1 | 9/2008 | Sinclair et al. | |
| 2009/0001164 A1 | 1/2009 | Brock et al. | |
| 2009/0169019 A1 | 7/2009 | Bauchot et al. | |
| 2009/0232368 A1 | 9/2009 | Niinuma et al. | |
| 2010/0027851 A1 | 2/2010 | Walther et al. | |
| 2011/0121066 A1 | 5/2011 | Tian et al. | |
| 2012/0145779 A1 | 6/2012 | Bietenbeck et al. | |
| 2012/0325902 A1 | 12/2012 | Goyal et al. | |
| 2013/0034290 A1 | 2/2013 | Lee et al. | |
| 2013/0228619 A1 | 9/2013 | Soborski | |
| 2013/0240628 A1 | 9/2013 | van der Merwe et al. | |
| 2014/0061316 A1 | 3/2014 | Narayanaswami et al. | |
| 2015/0083801 A1 | 3/2015 | Soborski | |
| 2015/0098655 A1 | 4/2015 | Chang et al. | |
| 2015/0262347 A1 | 9/2015 | Duerksen et al. | |
| 2015/0379321 A1 | 12/2015 | Soborski | |
| 2017/0091611 A1 | 3/2017 | Soborski | |

FOREIGN PATENT DOCUMENTS

| | | | |
|---|---|---|---|
| JP | 2005-267598 A | 9/2005 | |
| JP | 2009-109419 A | 5/2009 | |
| JP | 2009-124599 A | 6/2009 | |
| JP | 2012-039494 A | 2/2012 | |
| JP | 2012-141729 A | 7/2012 | |
| JP | 2014-203289 A | 10/2014 | |
| KR | 10-2003-0051712 A | 6/2003 | |
| KR | 10-2005-0093715 A | 9/2005 | |
| RU | 2 208 248 C2 | 7/2003 | |
| RU | 2370377 C2 | 10/2009 | |
| RU | 2 451 340 C2 | 5/2012 | |
| RU | 2458395 C2 | 8/2012 | |
| RU | 2461883 C2 | 9/2012 | |
| RU | 2 476 936 C2 | 2/2013 | |
| RU | 2507076 C2 | 2/2014 | |
| WO | 9603714 A1 | 2/1996 | |
| WO | 9724699 A1 | 7/1997 | |
| WO | 02/31752 A1 | 4/2002 | |
| WO | 02/065782 A1 | 8/2002 | |
| WO | 2008078009 A1 | 7/2008 | |
| WO | 2009/044352 A1 | 4/2009 | |
| WO | 2009/115611 A2 | 9/2009 | |
| WO | 2010/021965 A1 | 2/2010 | |
| WO | 2011/076406 A1 | 6/2011 | |
| WO | 2011077459 A2 | 6/2011 | |
| WO | 2015/130697 A1 | 9/2015 | |
| WO | WO-2016077934 A1 * | 5/2016 | ............ G01N 21/84 |

OTHER PUBLICATIONS

Search Report issued in related application RU 2016138293/08, dated Feb. 7, 2017, with English language translation, 4 pages.
PCT Search Report and Written Opinion issued in related application PCT/US2017/022097, dated May 24, 2017, 17 pages.
Office Action issued in related application CA 2,960,716, dated Apr. 13, 2017, 4 pages.
Office Action issued in related application CA 2,960,716, dated Dec. 27, 2017, 5 pages.
Decision to Grant issued in related application RU 2017132260, dated Jan. 10, 2018, with English language translation, 27 pages.
Office Action issued in related application CN 201580062910.5, dated Jan. 30, 2018, with English language translation, 9 pages.
Examination Report issued in related application AU 2016278954, dated Jan. 31, 2018, 6 pages.
Office Action issued in related application KR 10-2017-7026160, dated Feb. 22, 2018, with English language translation, 19 pages.
Office Action issued in related application KR 10-2018-7001086, dated Feb. 22, 2018, with English language translation, 15 pages.
Office Action issued in related application JP 2017-541598, dated Mar. 7, 2018, with English language translation, 4 pages.
"rank, v.3", Def. 3a, OED Online, Oxford English Dictionary, 2nd Ed., 1989, Oxford University Press, <http://www.oed.com/oed2/00197225>; 5 pages.
Ahmed et al., "The structural microscopically analysis for the full color printers & copiers utilized in valuable secured prints counterfeiting crimes," WAN-IFRA, Mar. 3, 2011, 13 pages.
Office Action issued in related application KR 10-2015-7020798, dated Jul. 11, 2016, with English language translation, 14 pages.
Office Action issued in related application JP 2016-565026, dated Feb. 3, 2017, with English language translation, 12 pages.
Seo et al., "A robust image fingerprinting system using the Radon transform," Signal Processing: Image Communication, Elsevier Science Publishers, Amsterdam, NL, Apr. 1, 2004, vol. 19 (4), pp. 325-339.

(56) References Cited

OTHER PUBLICATIONS

Examination Report issued in related application MY PI2014002470, dated Nov. 15, 2017, 3 pages.
Office Action issued in related application KR 10-2017-7026160, dated Nov. 21, 2017, with English language translation, 11 pages.
Notice of Acceptance issued in related application AU 2015383137, dated Nov. 24, 2017, 3 pages.
Third Party Observation filed in related application EP 13754659.4, Nov. 3, 2017, 3 pages.
Office Action issued in related application IL 253685, dated Jan. 6, 2018, with English language translation, 6 pages.
Decision to Grant Patent issued in related application JP 2017-515692, dated Jan. 10, 2018, with English language translation, 6 pages.
Supplementary European Search Report issued in related application EP 15882884.8, dated Dec. 14, 2017, 4 pages.
Examination Report issued in related application EP 15882884.8, dated Jan. 23, 2018, 7 pages.
PCT Search Report and Written Opinion issued in related application PCT/US2017/064900, dated Jan. 12, 2018, 8 pages.
Office Action issued in related application JP 2017-515692, dated Aug. 2, 2017, with English language translation, 5 pages.
Examination Report issued in related application AU 2015383137, dated Aug. 18, 2017, 3 pages.
Notice of Acceptance issued in related application AU 2015223174, dated Aug. 18, 2017, 3 pages.
Supplementary European Search Report issued in related application EP 15844793.8, dated Sep. 13, 2017, 4 pages.
Examination Report issued in related application EP 15844793.8, dated Oct. 6, 2017, 8 pages.
Office Action issued in related application CN 201580076348.1, dated Mar. 15, 2018, with English language translation, 16 pages.
Decision to Grant issued in related application RU 2018101250, dated Apr. 19, 2018, with English language translation, 22 pages.
Extended European Search Report issued in related application EP 16812194.5, dated May 11, 2018, 7 pages.
Notice of Acceptance issued in related application AU 2016278954, dated May 9, 2018, 3 pages.
Office Action issued in related application JP 2017-564394, dated May 14, 2018, with English language translation, 4 pages.
Office Action issued in related application IL 256161, dated May 31, 2018, with partial English language translation, 3 pages.

\* cited by examiner though the appended claims set forth the features of the
METHODS AND A COMPUTING DEVICE FOR DETERMINING WHETHER A MARK IS GENUINE

CROSS-REFERENCE TO RELATED APPLICATIONS

The present application claims the priority benefit of U.S. Provisional Patent Application 62/307,901, filed on Mar. 14, 2016 and incorporated herein by reference.

TECHNICAL FIELD

The present disclosure is related generally to anti-counterfeiting technology and, more particularly, to methods and a computing device for determining whether a mark is genuine.

BACKGROUND

Counterfeit products are, unfortunately, widely available and often hard to spot. When counterfeiters produce fake goods, they typically copy the labeling and bar codes in addition to the actual products. At a superficial level, the labels and bar codes may appear genuine and even yield valid data when scanned (e.g., decode to the appropriate Universal Product Code). While there are many technologies currently available to counter such copying, most of these solutions involve the insertion of various types of codes, patterns, microfibers, microdots, and other indicia to help thwart counterfeiting. Such techniques require manufacturers to use additional equipment and material and add a layer of complexity to the production process.

DRAWINGS

While the appended claims set forth the features of the present techniques with particularity, these techniques, together with their objects and advantages, may be best understood from the following detailed description taken in conjunction with the accompanying drawings of which:

Figure 14A:
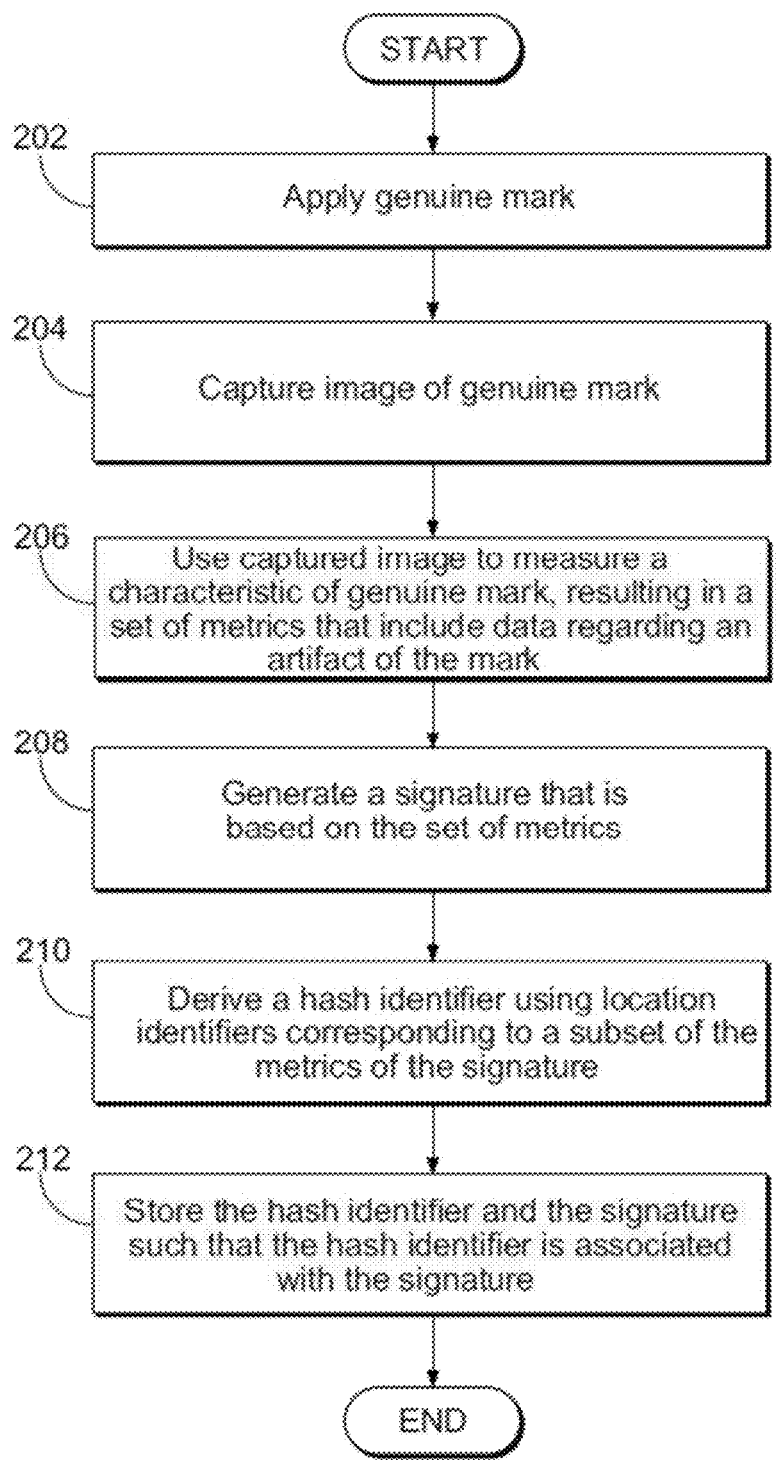
Figure 14B:
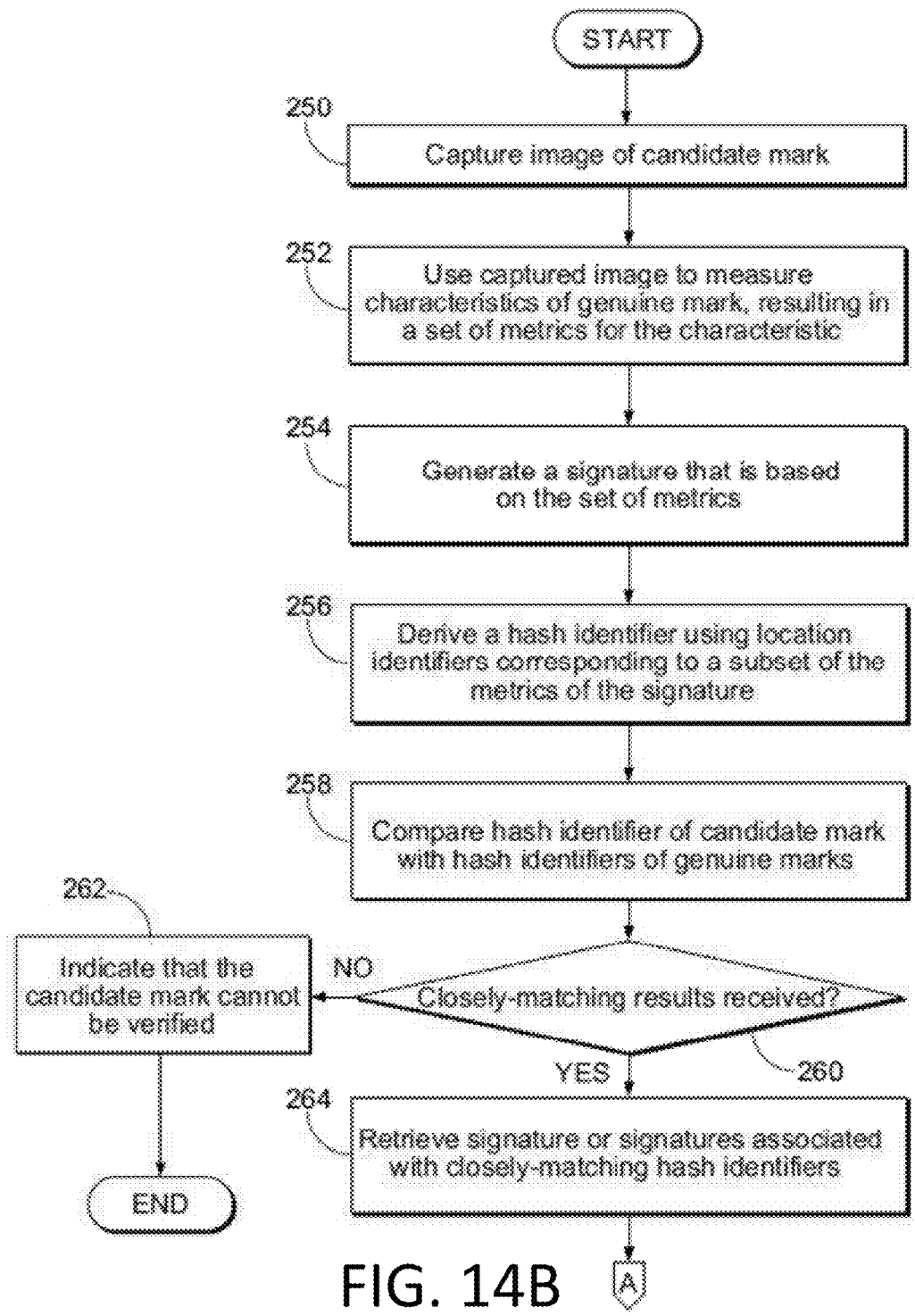
Figure 14C:
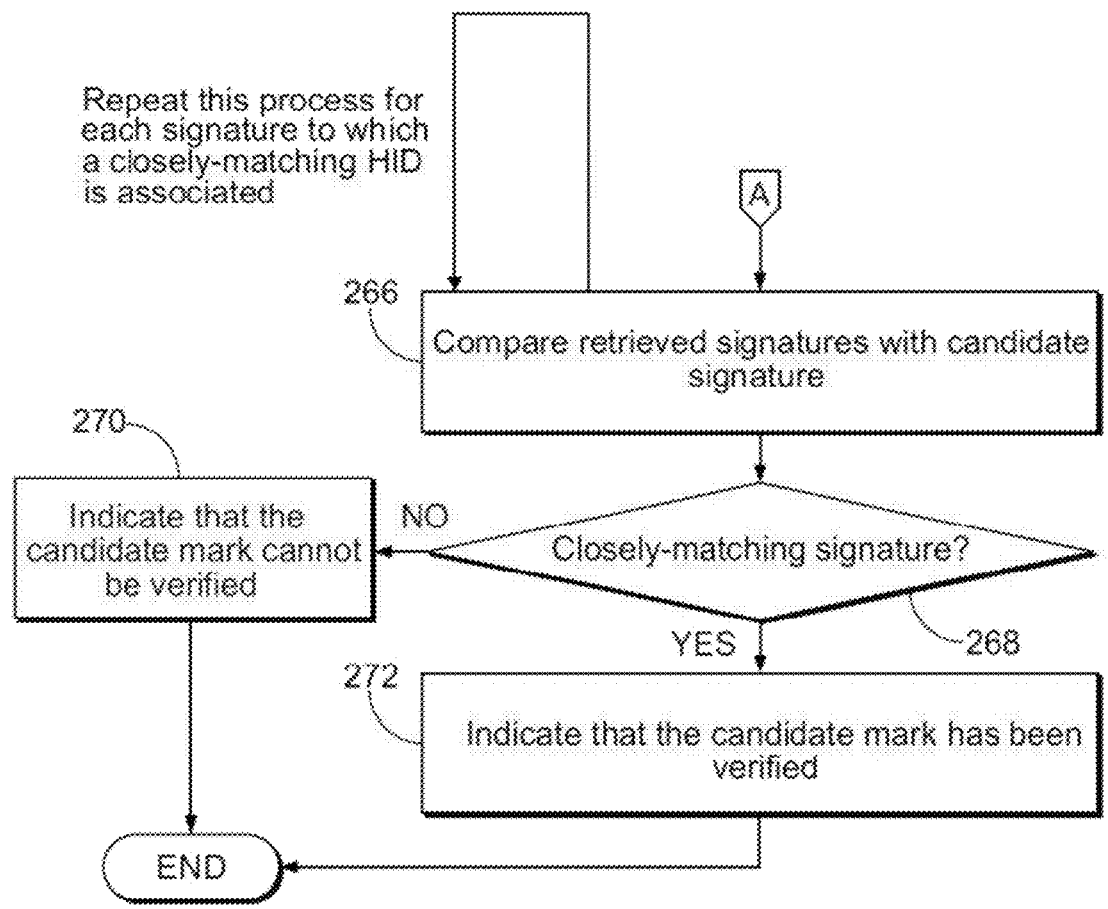

FIG. 14A, FIG. 14B, and FIG. 14C are flow charts of processes carried by one or more computing devices according to an embodiment.

Figure 15:
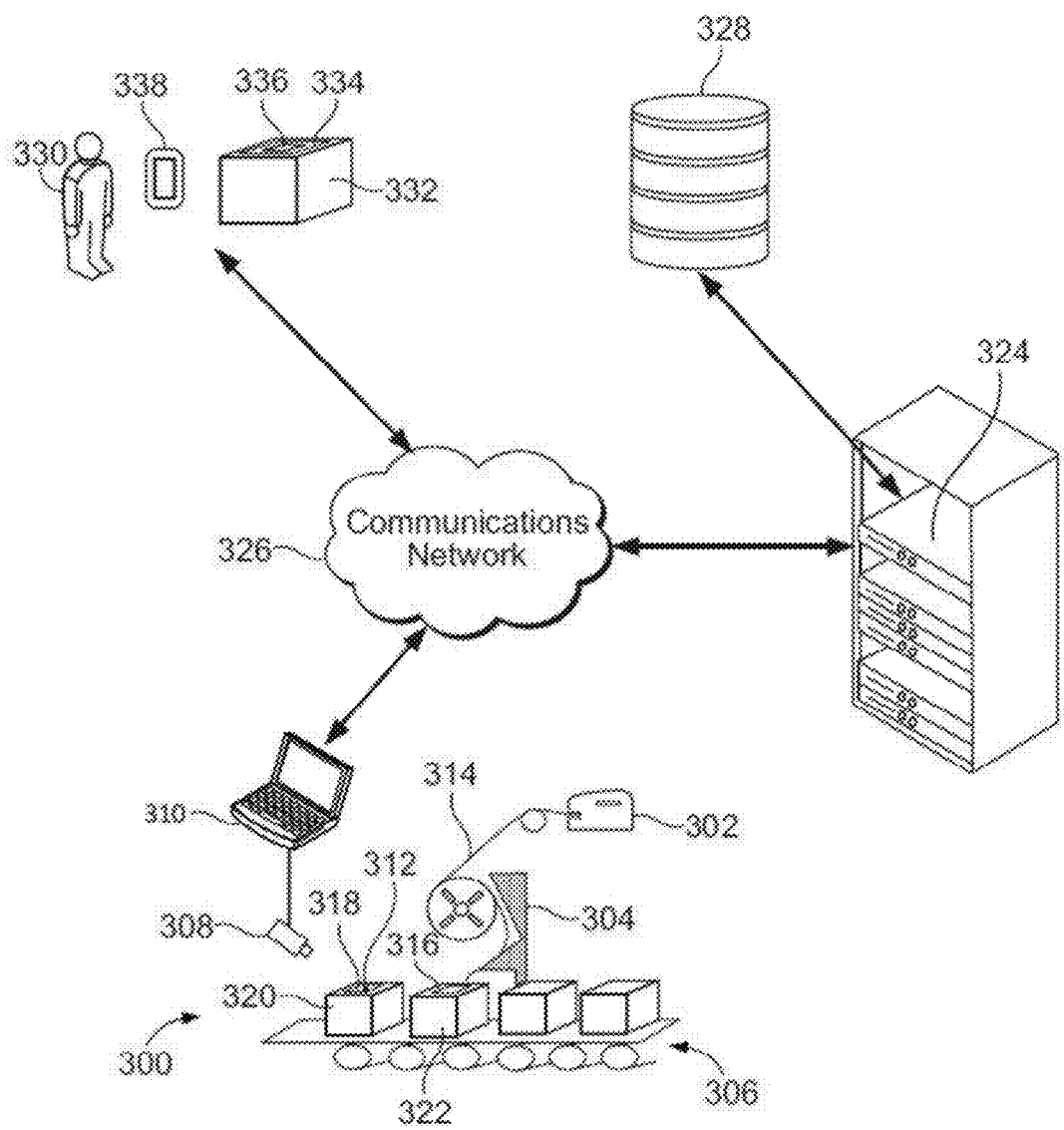

FIG. 15 is another example of a system in which various embodiments of the disclosure may be implemented.

Figure 16A:
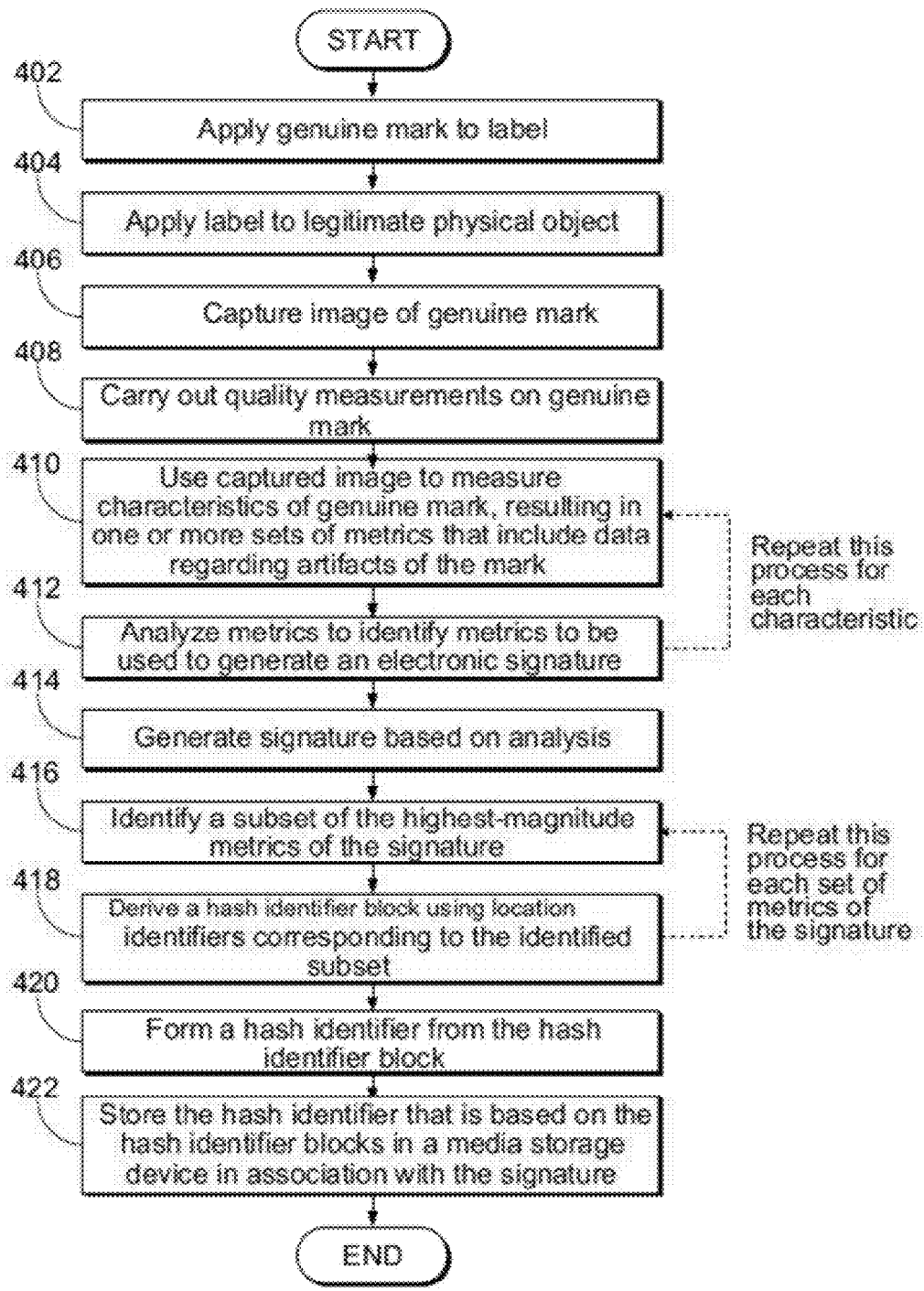
Figure 16B:
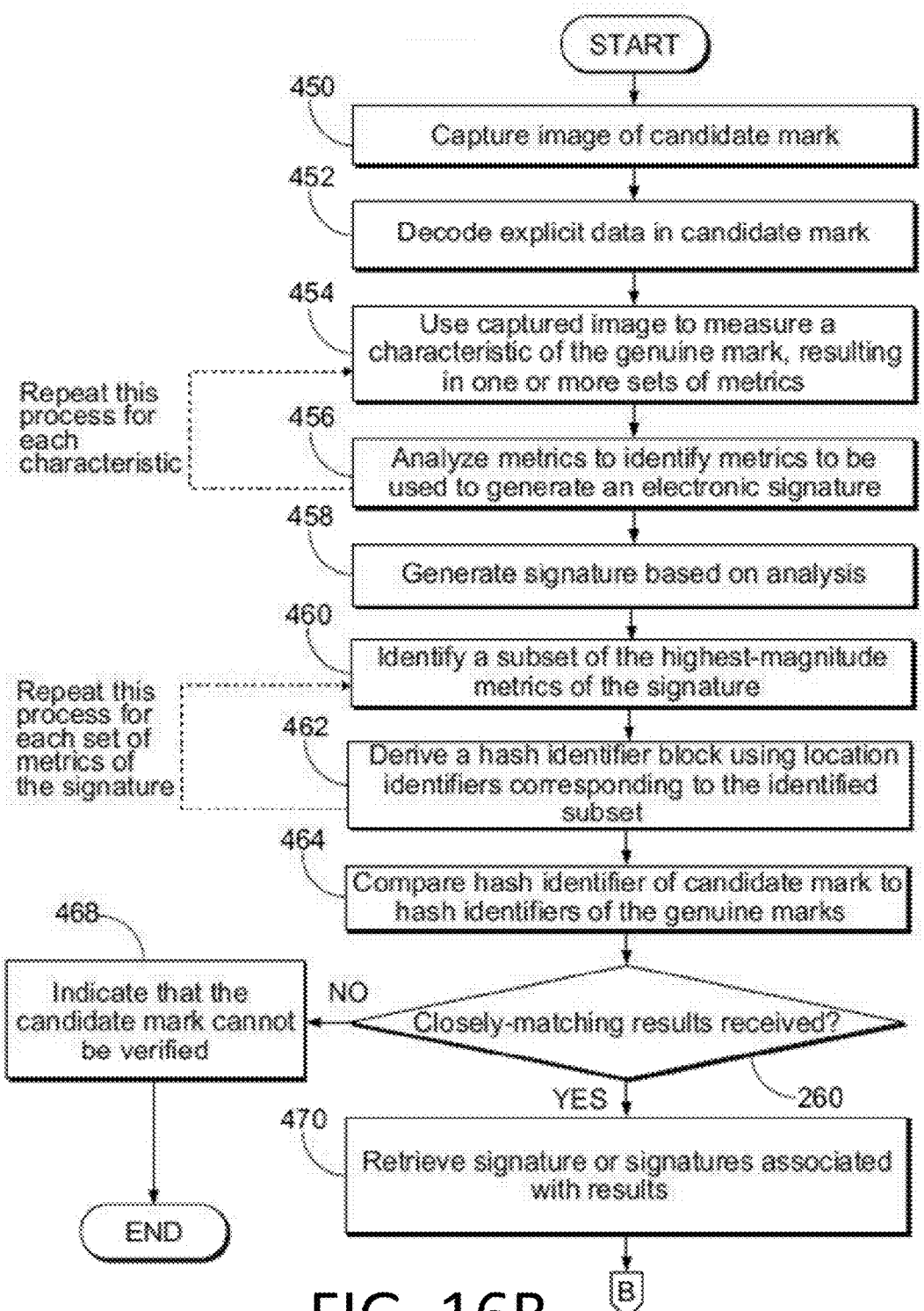
Figure 16C:
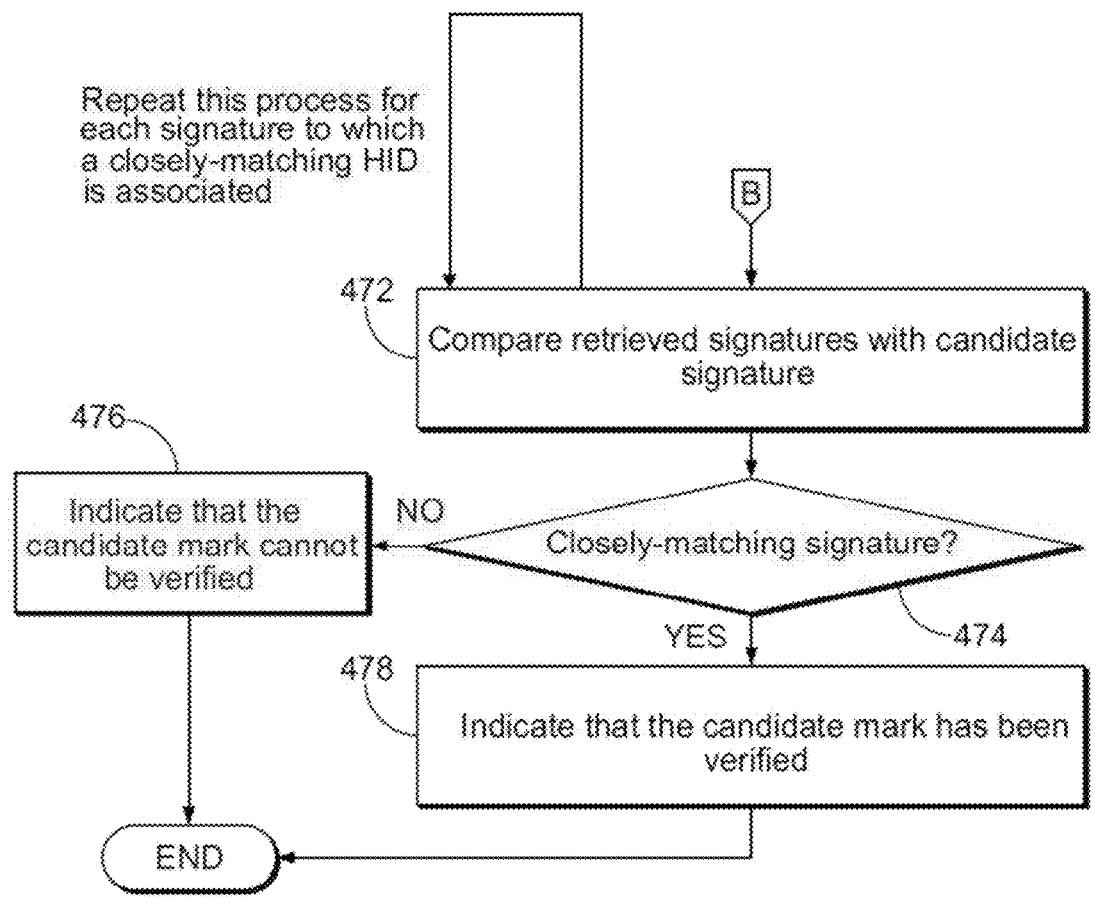

FIG. 16A, FIG. 16B, and FIG. 16C are flow charts of processes carried out by one or more computing devices according to an embodiment.

Figure 17:
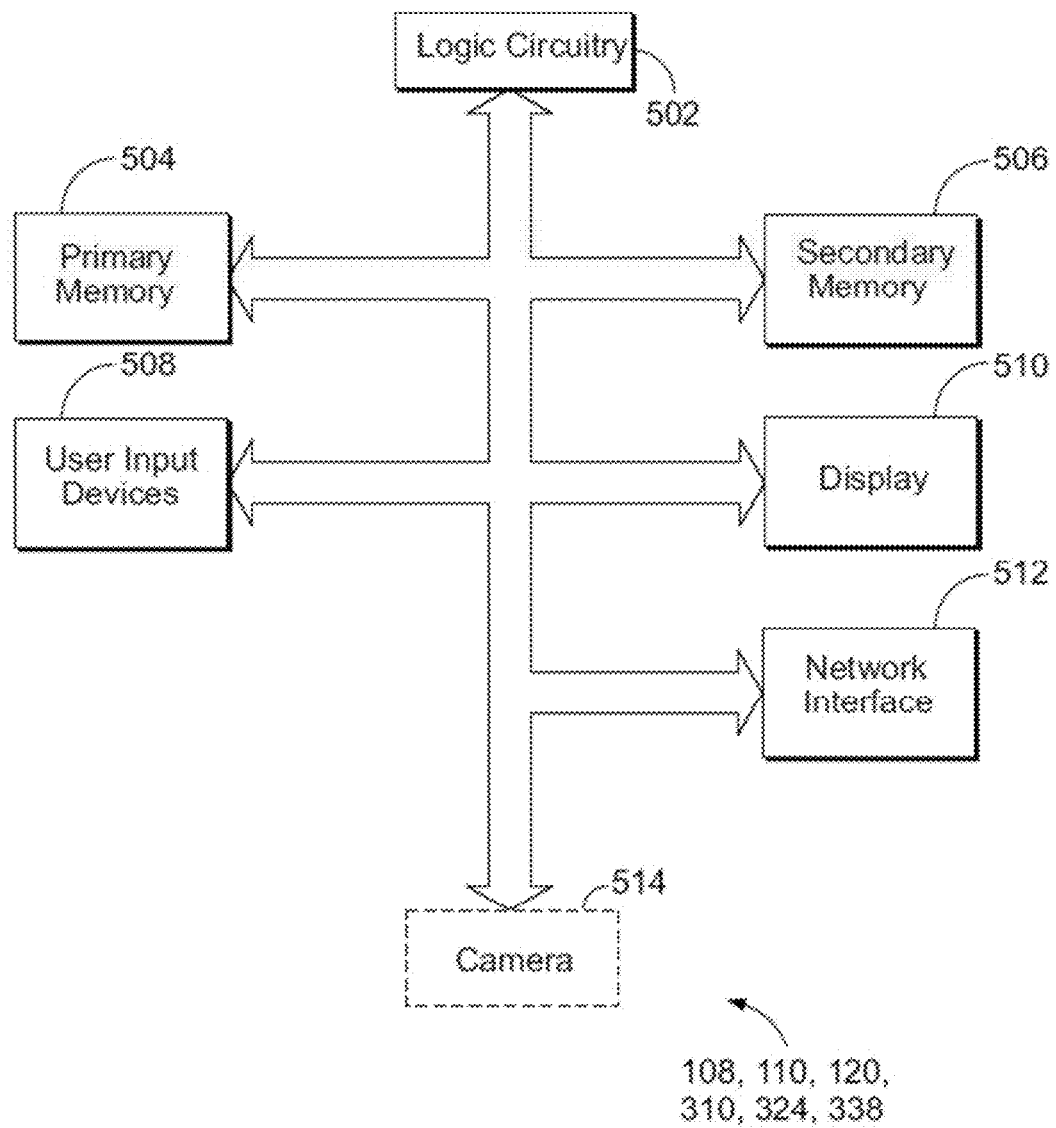

FIG. 17 shows the architecture of a computing device according to an embodiment.

Figure 18:
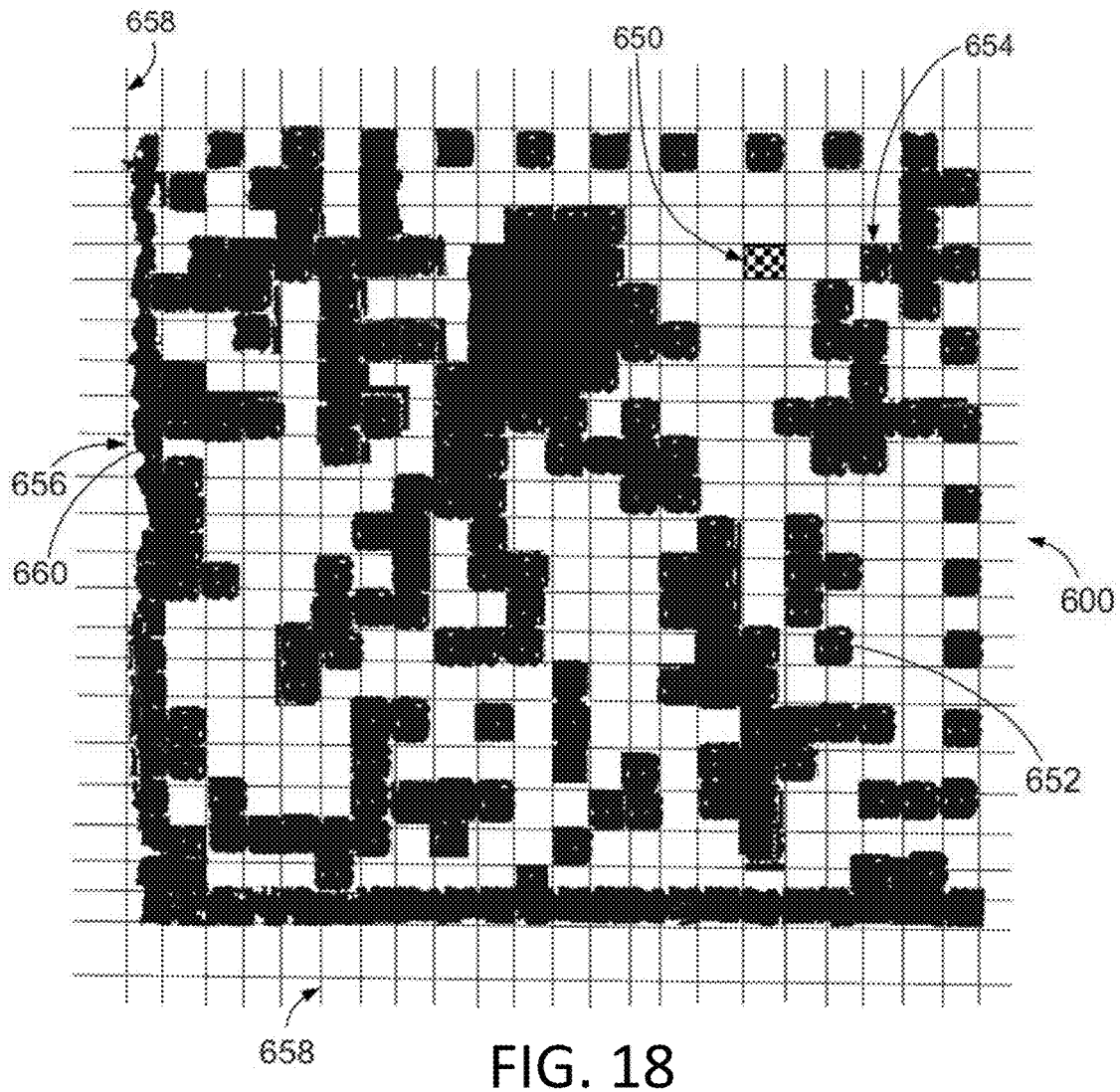

FIG. 18 shows an example of a mark according to an embodiment.

Figure 19:
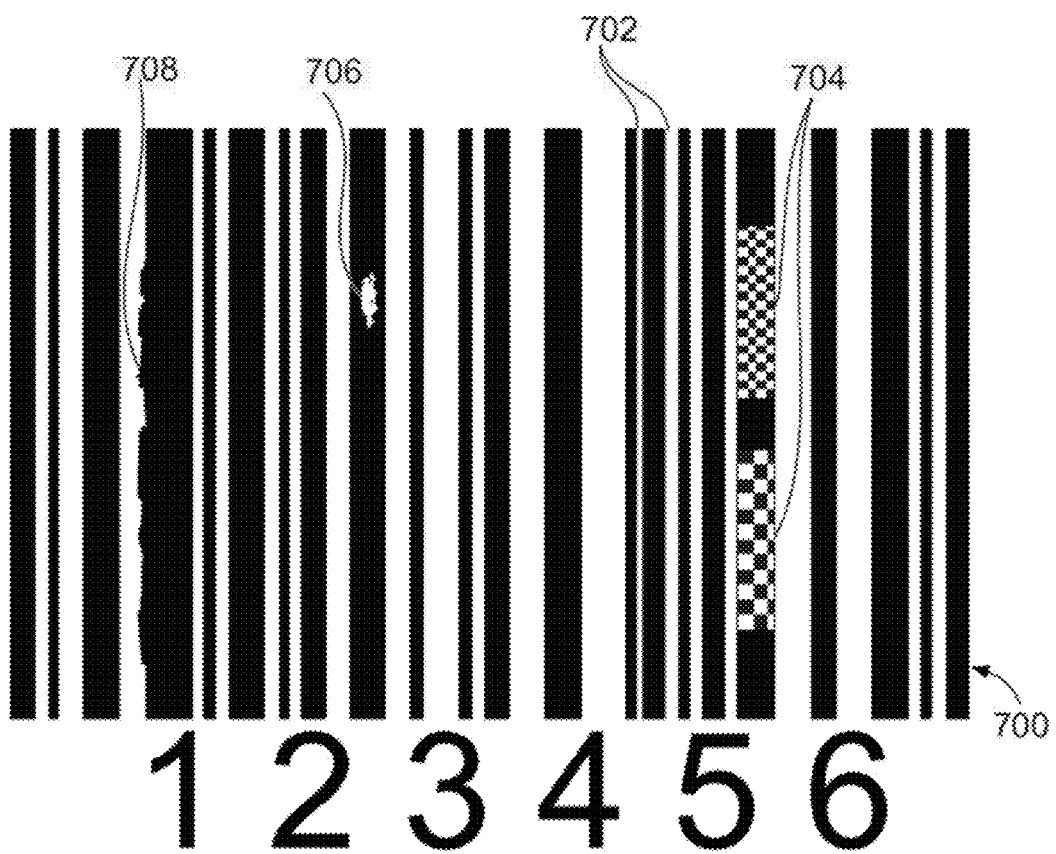

FIG. 19 shows an example of a mark according to another embodiment.

Figure 20:
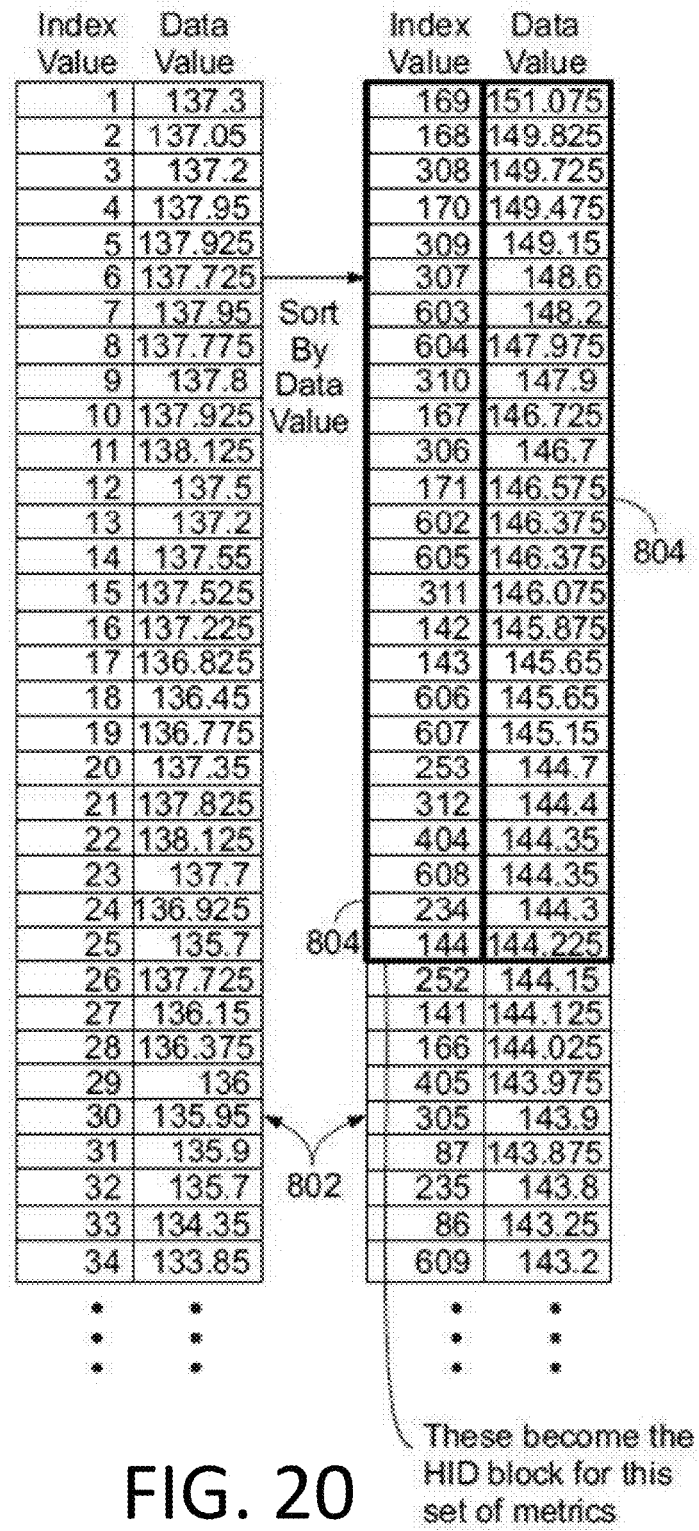

FIG. 20 shows an example of how a computing device sorts a set of metrics and selects the location identifiers of a subset of the metrics according to an embodiment.

Figure 21:
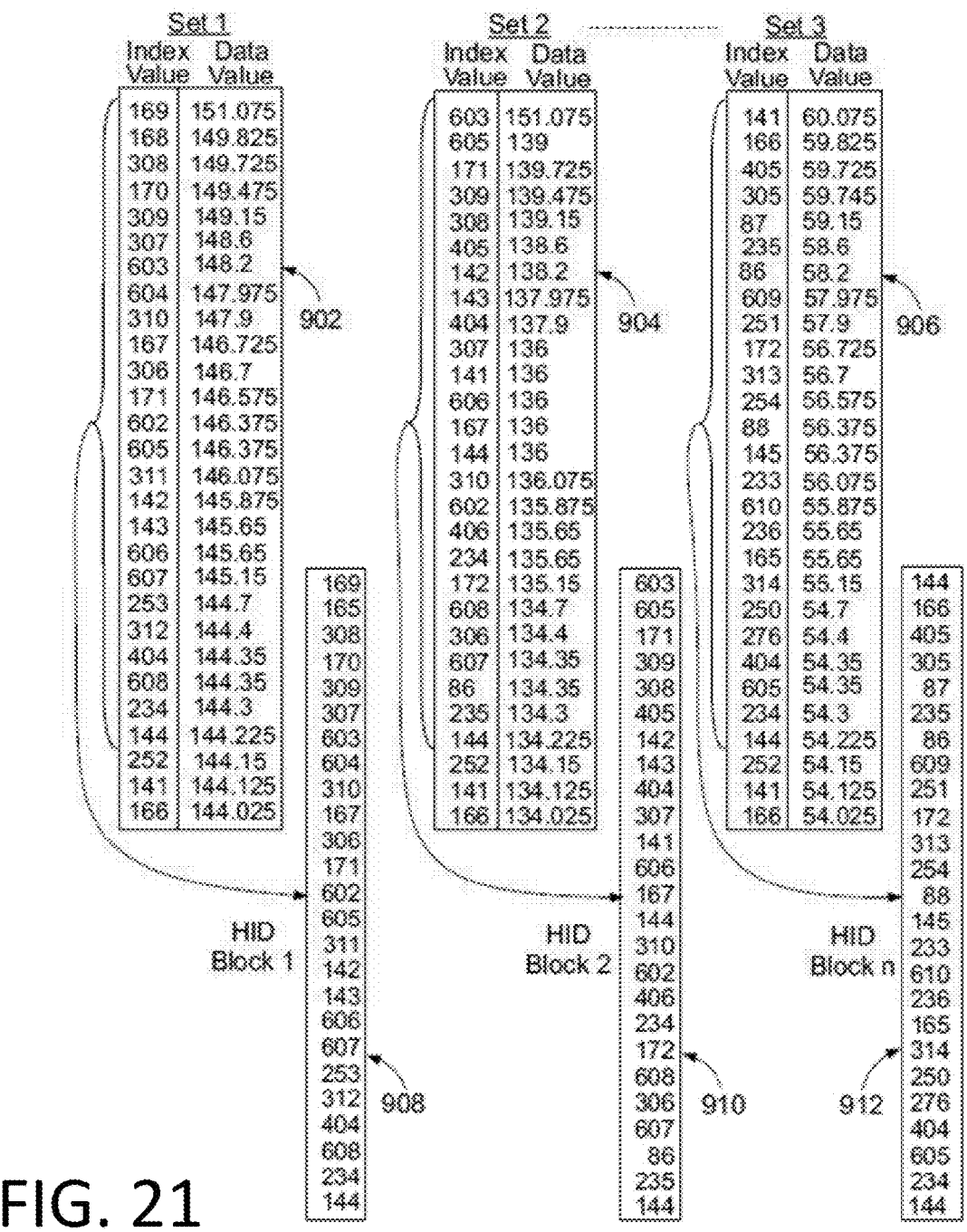

FIG. 21 shows an example of how a computing device forms a hash identifier blocks from location identifiers corresponding of multiple subsets of metrics according to an embodiment.

Figure 22:
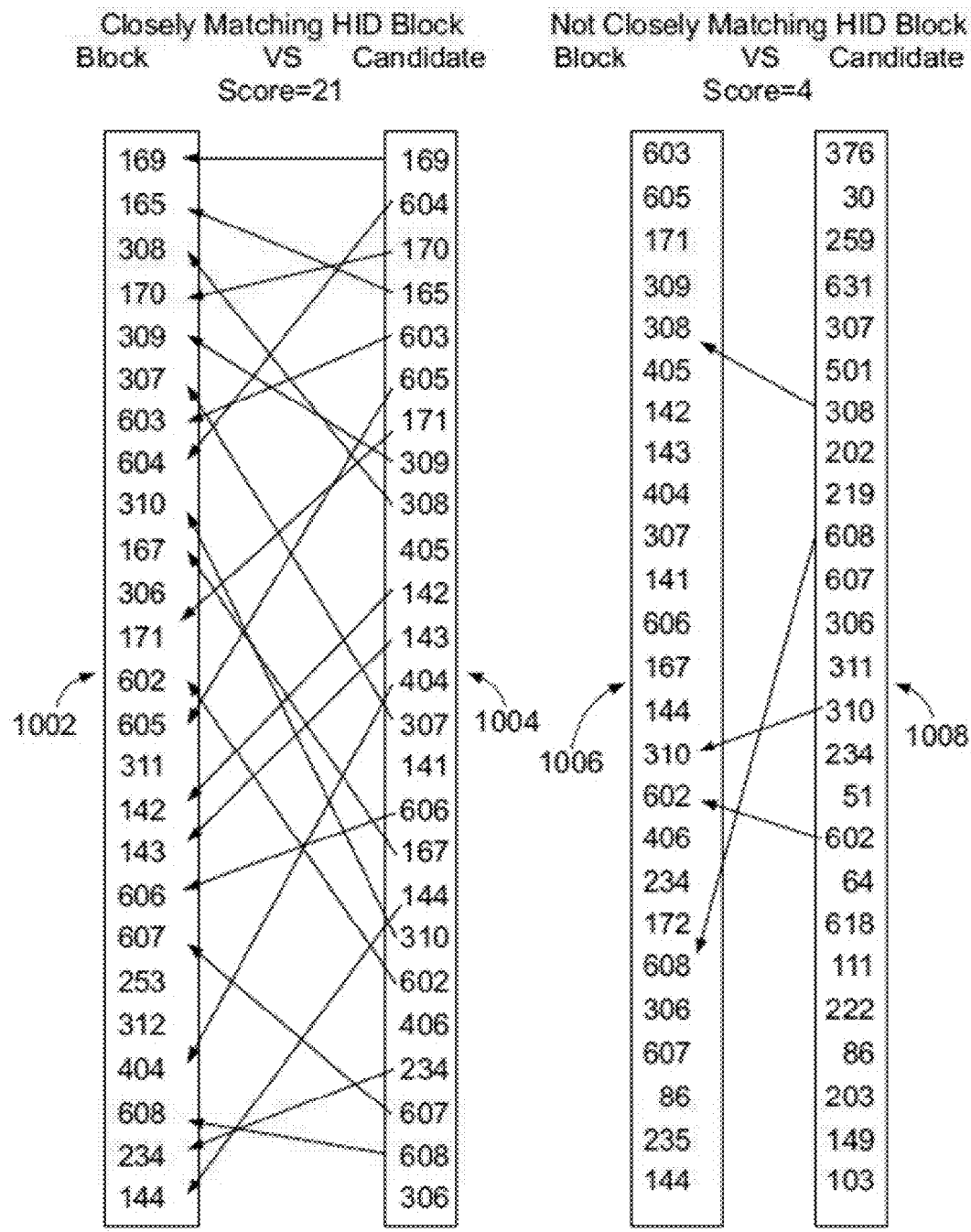

FIG. 22 shows an example of how a computing device compares two hash-identifier blocks and scores the results of the comparison in an embodiment.

Figure 23:
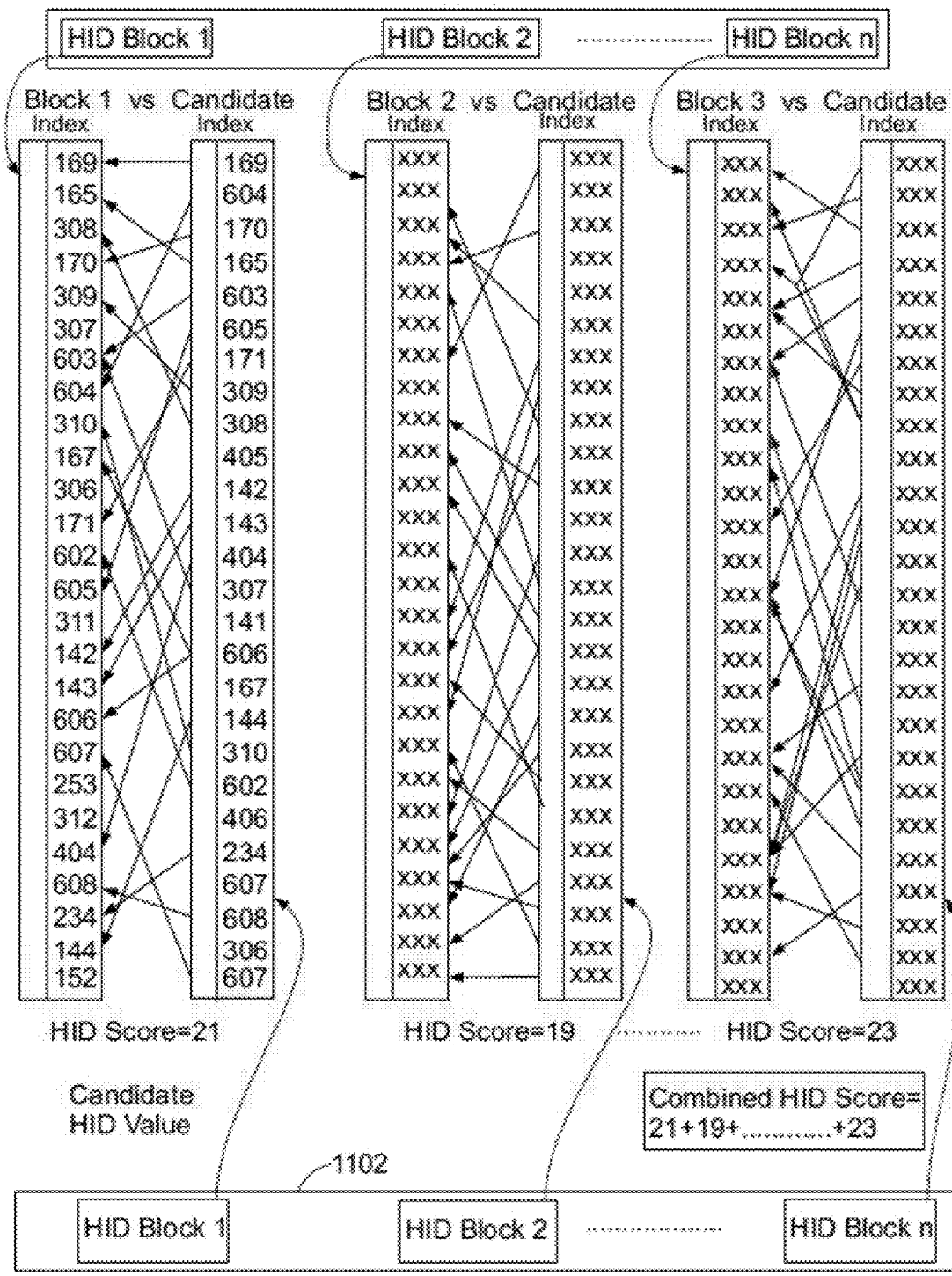

FIG. 23 shows an example of how a computing device combines multiple hash-identifier blocks into an overall hash identifier in an embodiment.

Figure 24:
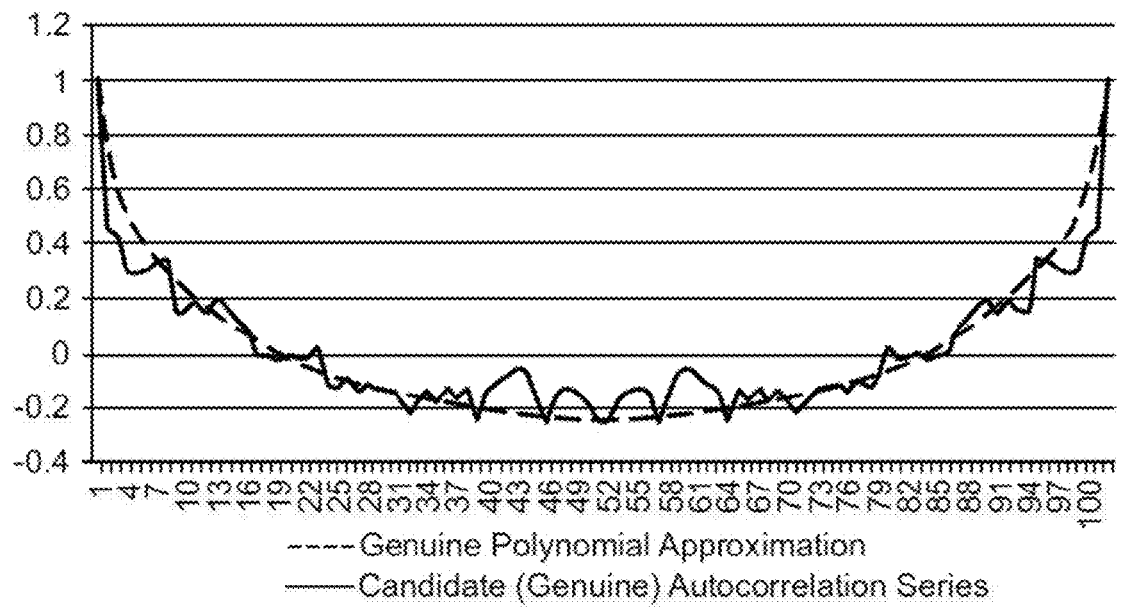
Figure 25:
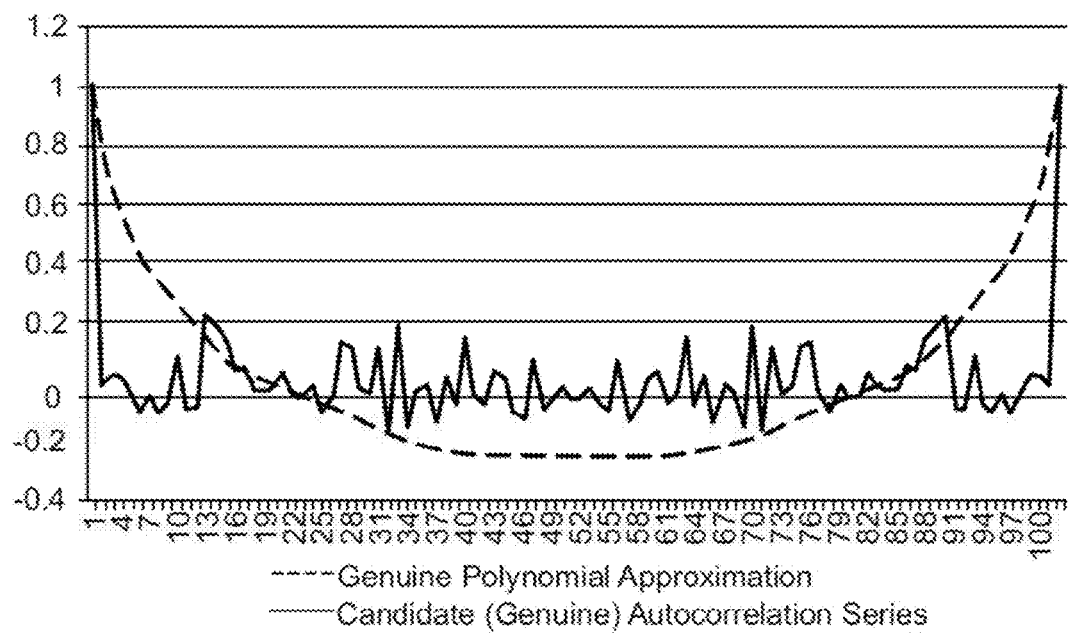

FIG. 24 and FIG. 25 illustrate the process that a computing device carries out to convert the degree of correlation between the two sets of autocorrelated values for a given characteristic (or given set of metrics for a characteristic) to a match score for that characteristic or set of metrics in an embodiment.

Figure 26:
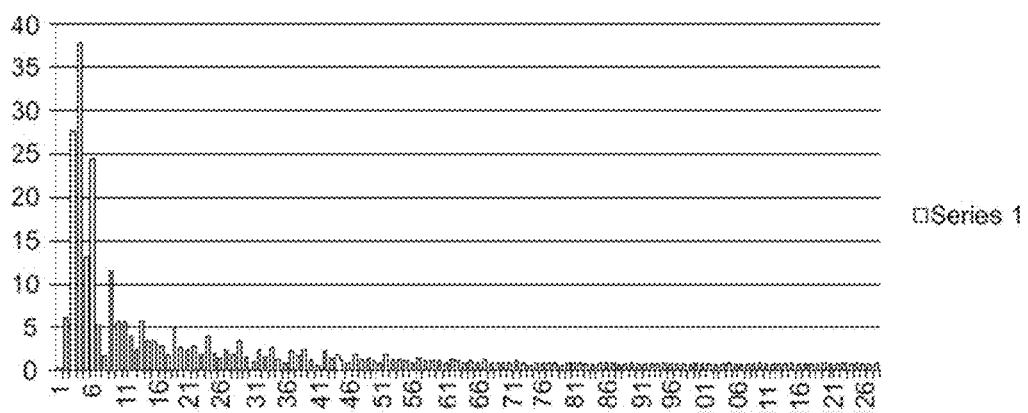
Figure 27:
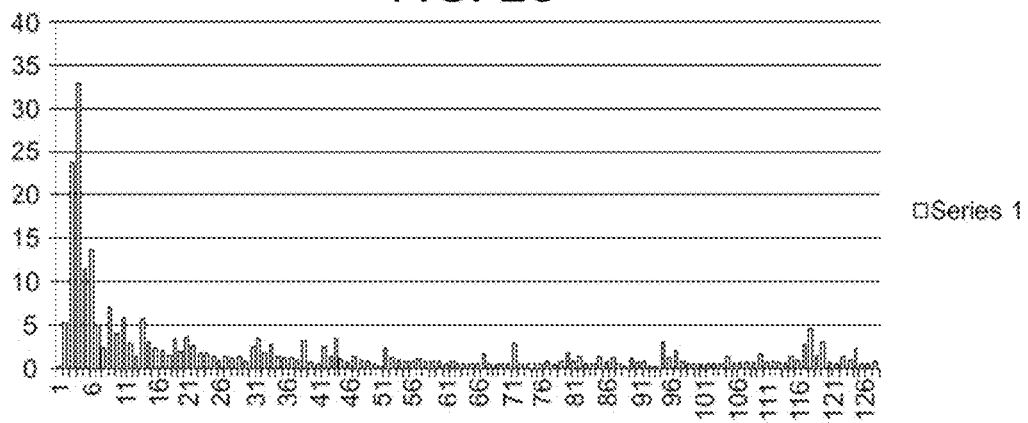
Figure 28:
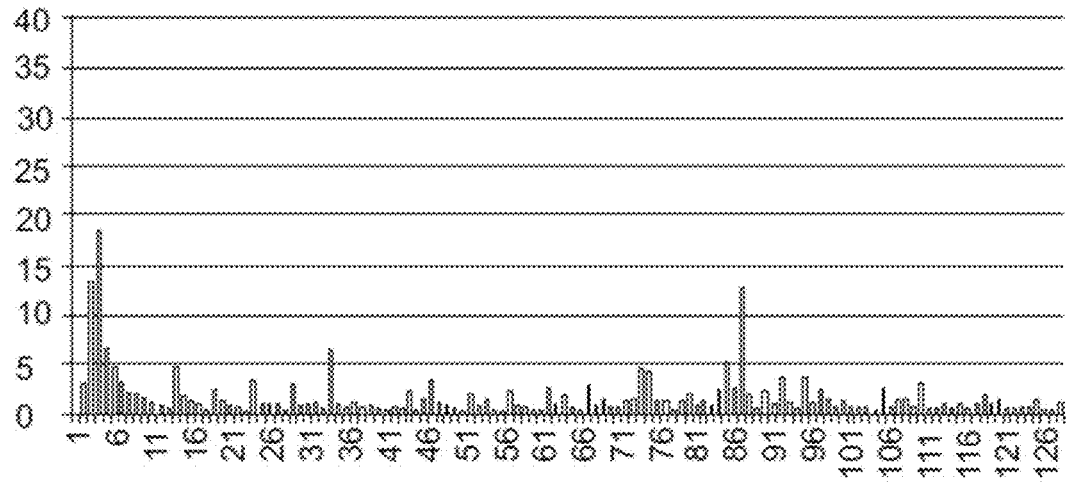

FIG. 26, FIG. 27, and FIG. 28 show examples of power series generated by a computing device in an embodiment.

Figure 29:
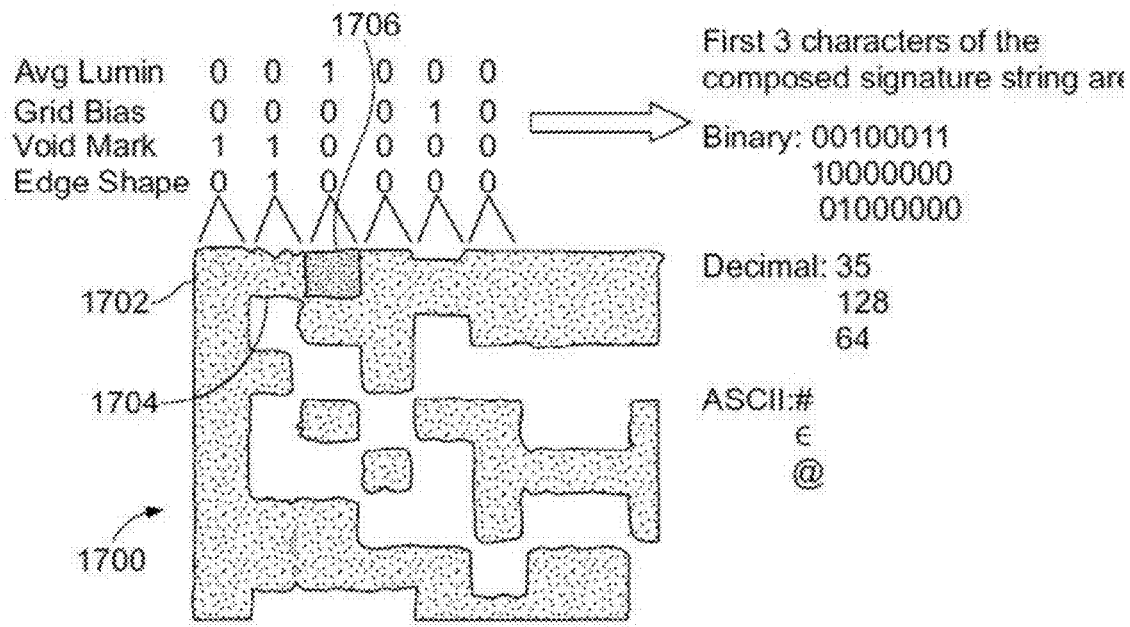

FIG. 29 shows an example of how a computing device generates an electronic signature for a mark in an embodiment.

Figure 30:
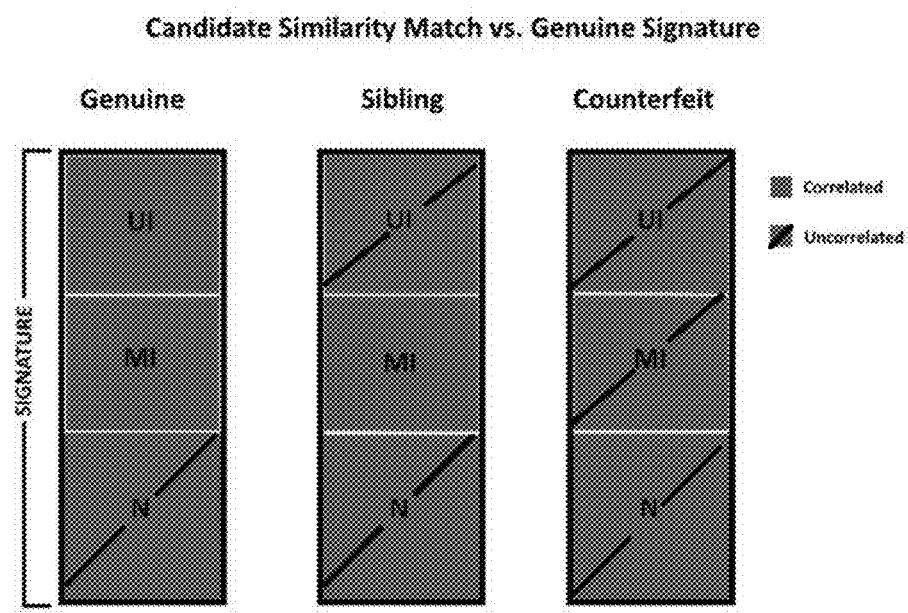

FIG. 30 illustrates candidate similarity match versus a genuine signature, according to an embodiment.

Figure 31:
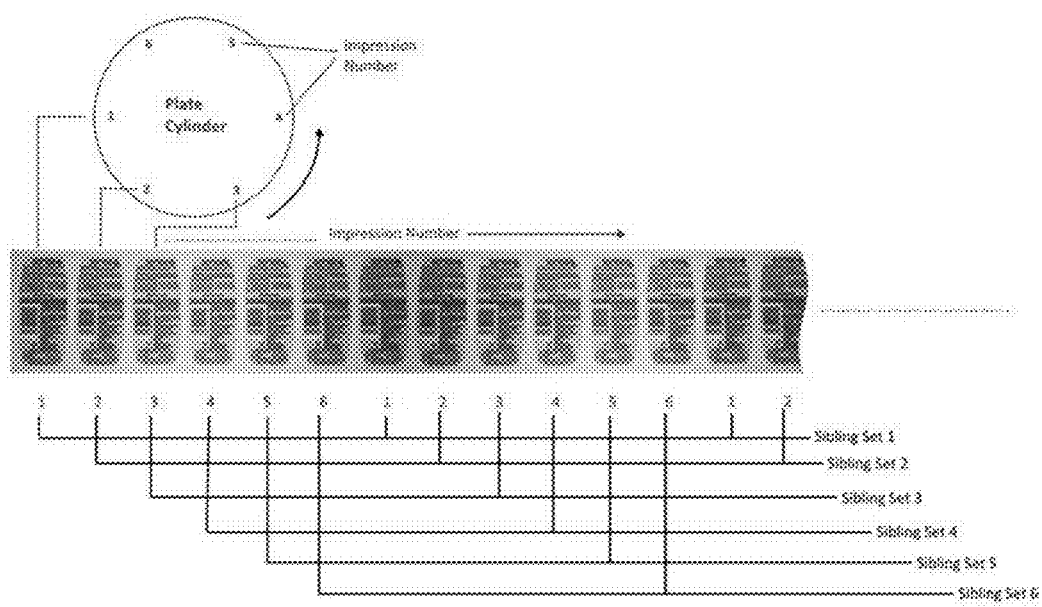

FIG. 31 illustrates sibling signatures, according to an embodiment.

Figure 32:
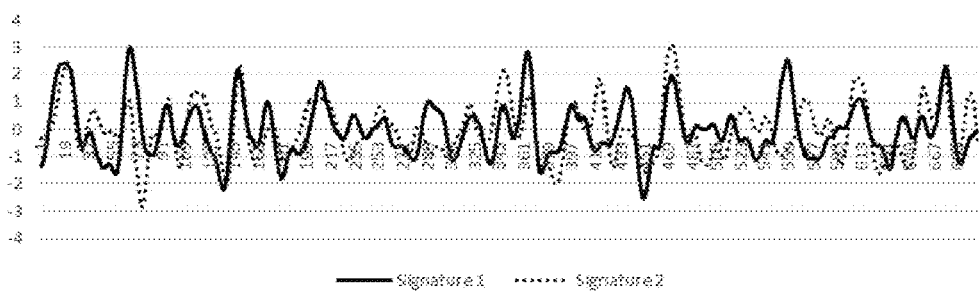

FIG. 32 illustrates how sibling marks correlate with one another, according to an embodiment.

Figure 33:
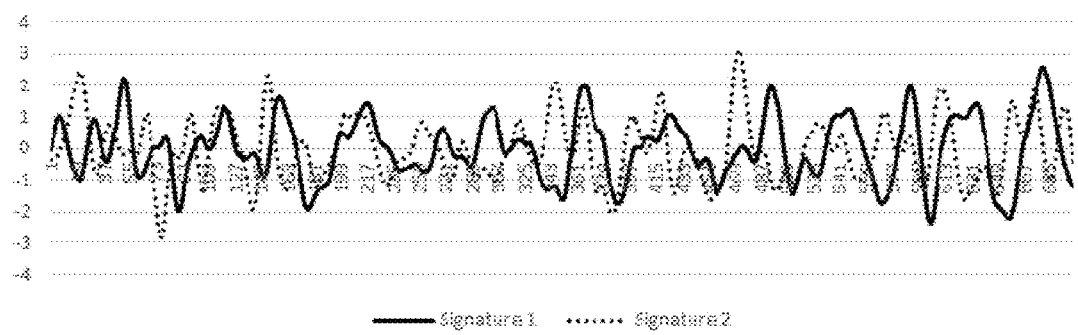

FIG. 33 illustrates the correlation of non-sibling, non-related signatures, according to an embodiment.

Figure 34:
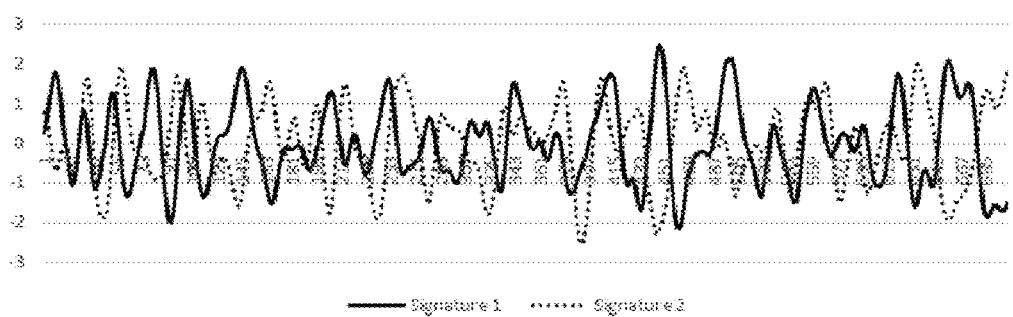

FIG. 34 illustrates the correlation of anti-sibling signatures, according to an embodiment.

Figure 35:
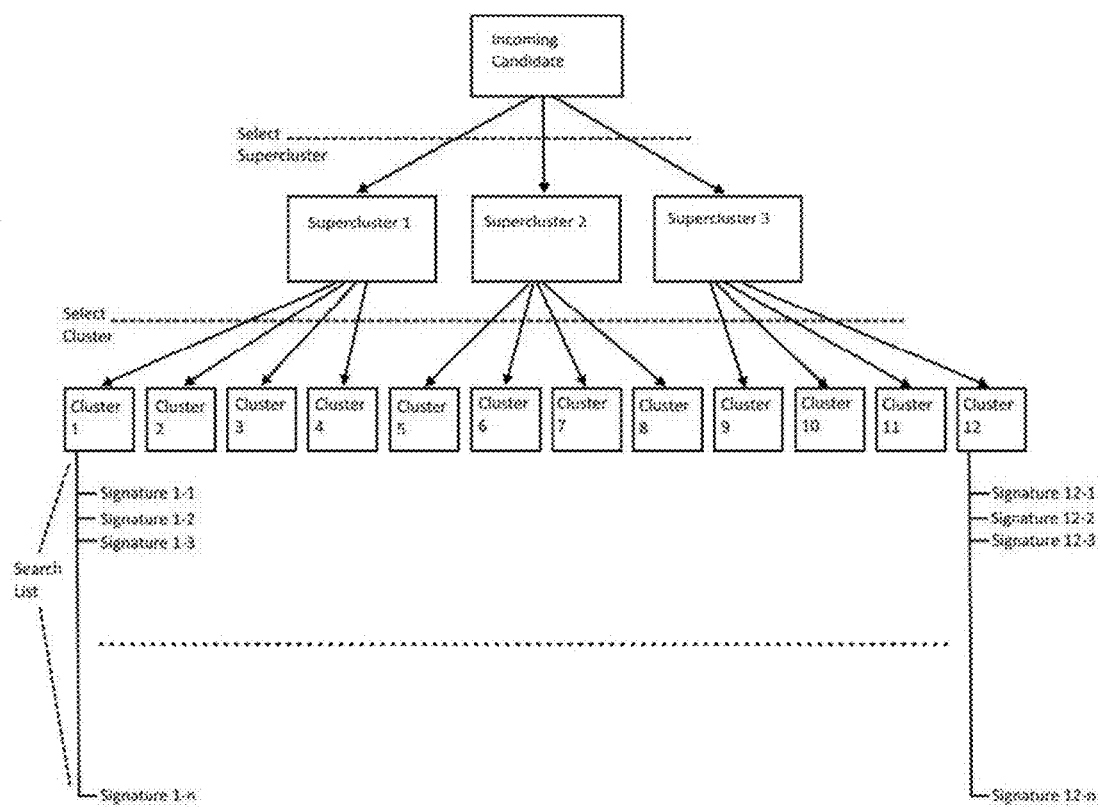

FIG. 35 illustrates the use of sibling and/or anti-sibling signatures to search a database (e.g., via a binary tree) in an embodiment.

Figure 36:
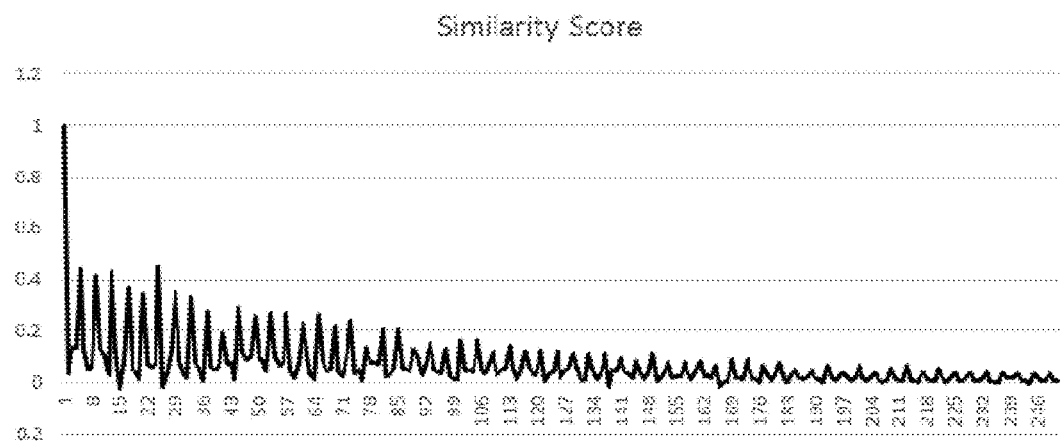

FIG. 36 illustrates a similarity score, according to an embodiment.

Figure 37:
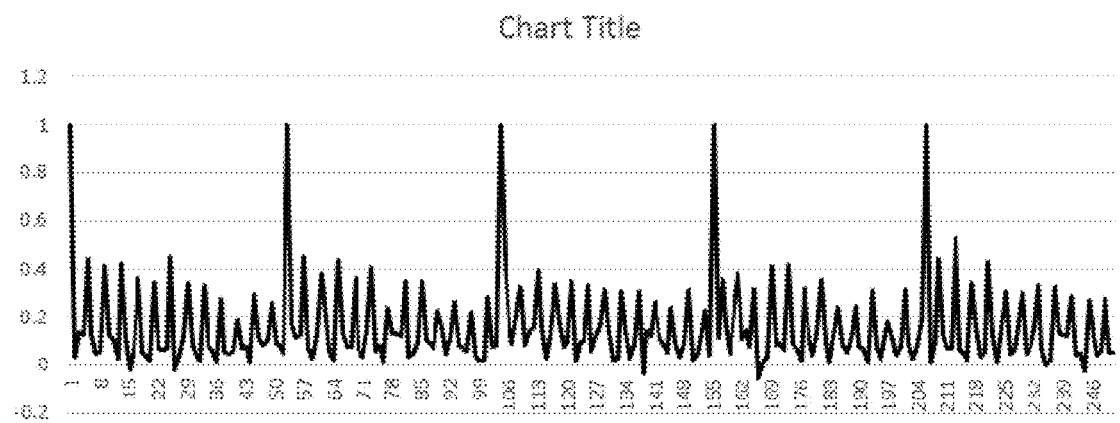

FIG. 37 illustrates the single cluster data of FIG. 36 processed into five smaller clusters.

Figure 38:
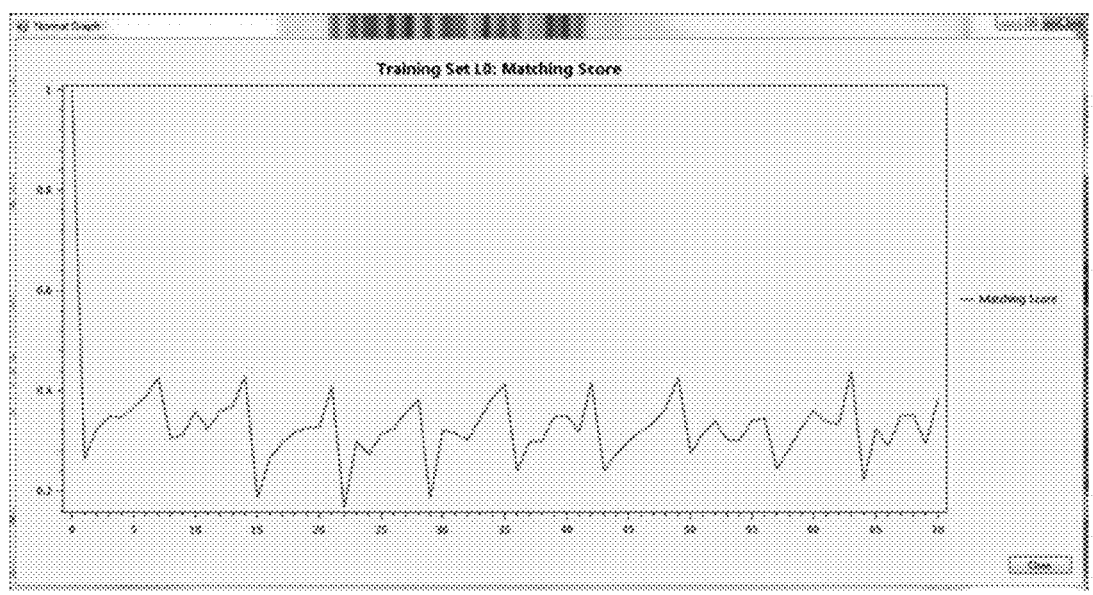

FIG. 38 illustrates another example matching score, according to an embodiment.

Figure 39:
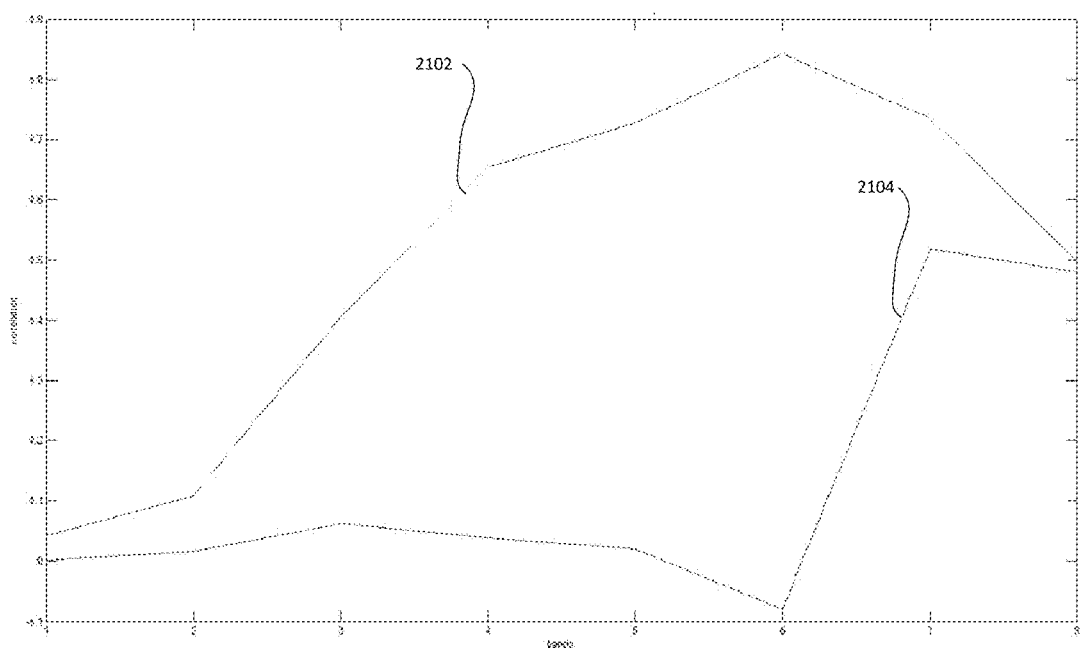
Figure 40:
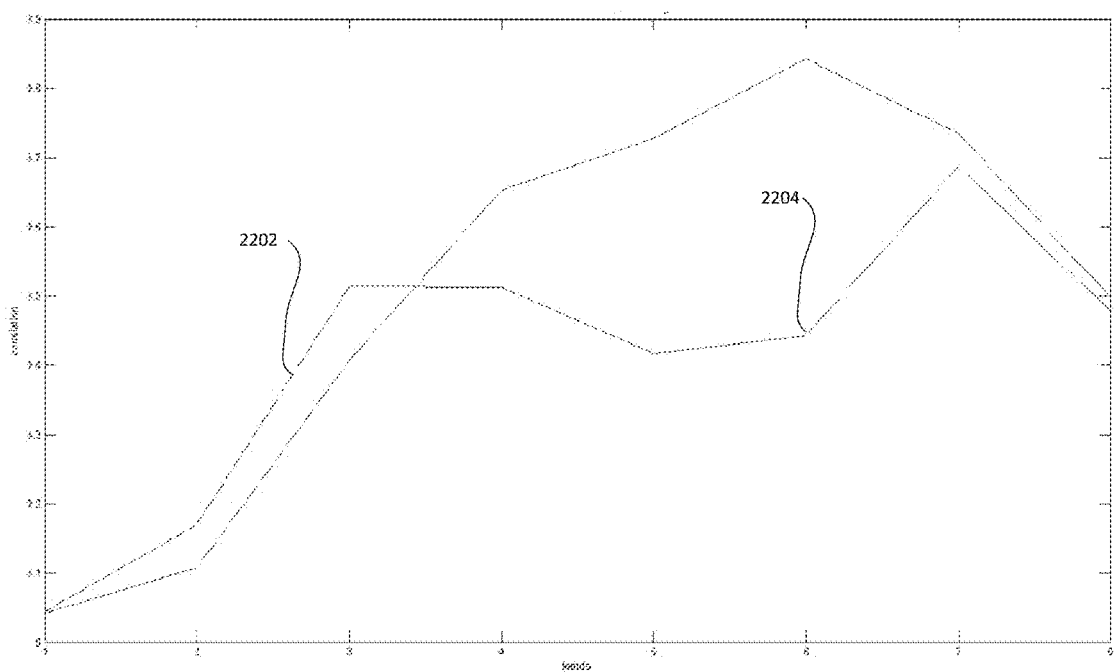

FIGS. 39 and 40 show examples of a spatial frequency spectrum correlation profile according to various embodiments.

DESCRIPTION

The present disclosure is generally directed to methods and a computing device for determining whether a mark is genuine. According to various embodiments, a computing device (or logic circuitry thereof) receives (e.g., via a camera or via a communication network) an image of a candidate mark (e.g., a one-dimensional or two-dimensional barcode), uses the image to make measurements (e.g., linearity, color, or deviation from best-fit grid) of a characteristic of a feature (an edge, a cell, a bar, a subarea, a blank area, or an artifact) of the candidate mark, resulting in a profile for that feature. The computing device filters out, from the feature profile, all spatial frequency components that are indicated to be sibling frequency components. In some embodiments, the computing device carries out the reverse procedure, and filters out all spatial frequency components except for those indicated to be sibling frequency components.

In an embodiment, the feature that the computing device measures is an edge of the mark, and the characteristic of the edge that the computing device measures is its projected average pixel values. For example, the computing device may determine projected average pixel values in a portion of the candidate mark that includes the edge (e.g., along one or more edges of a barcode), resulting in a profile for the edge. The computing device may use various filtering techniques.

For example, the computing device may filter out, from the edge profile, all spatial frequency components except for a first band of spatial frequency components (e.g., by applying a band-pass filter), resulting in a first filtered profile for the edge. The computing device may then repeat this filtering process for a second band of spatial frequency components (e.g., by applying a second band-pass filter to the original edge profile), resulting in a second filtered profile for the edge, and may repeat this filtering process for further spatial frequency bands. The computing device compares the first filtered profile of the candidate mark with an equivalent first filtered profile of a genuine mark (e.g., a filtered profile that the computing device obtained from an application of the same band-pass filter to a first profile of the same edge of the genuine mark). The computing device also compares the second filtered profile of the candidate mark with an equivalent second filtered profile of the genuine mark. The computing device determines whether the candidate mark is genuine based on these comparisons.

In an embodiment, for each comparison that the computing device makes with between a filtered profile of the candidate mark and a filtered profile of the genuine mark, the computing device assigns a correlation score. By mapping the band-pass filters applied to the feature profiles (of the candidate mark and the genuine mark) to the correlation scores (e.g., plotting each correlation score versus the band-pass filter that was applied to create the filtered profiles being compared), the computing device creates a spatial frequency spectrum correlation profile. The computing device determines whether the candidate mark is genuine based on its analysis of the spatial frequency spectrum correlation profile.

According to various embodiments, the computing device analyzes only a sub-portion of the spatial frequency spectrum correlation profile in order to identify the origin of the candidate mark. For example, the computing device may focus on the lowermost (e.g. lowest four) bands of the spatial frequency spectrum correlation profile in order to determine whether the candidate mark is a photocopy of the genuine mark.

According to various embodiments, a computing device (or logic circuitry thereof) uses unintentionally-produced artifacts within a genuine mark to define an identifiable electronic signature ("signature"), and extracts certain features of the signature in order to enhance the ease and speed with which numerous genuine signatures can be searched and compared with signatures of candidate marks.

According to an embodiment, a computing device receives a captured image of a candidate mark, measures a characteristic of the candidate mark in multiple locations of the candidate mark using the captured image, resulting in a set of metrics (in some cases, multiple sets of metrics) for that characteristic. The computing device generates a signature for the candidate mark based on the set of metrics. The computing device derives a hash identifier ("HID") using location identifiers corresponding to a subset of the locations at which it measured the characteristic (e.g., raster index numbers of the locations that yielded the highest-magnitude measurements). The computing device determines, based on a comparison of the HID of the candidate mark to a previously-derived and stored HID of a genuine mark, whether the respective HIDs closely match one another. If the computing device determines that the HID of the candidate mark closely matches (according to a predetermined threshold) the HID of the genuine mark, then the computing device retrieves the signature of the genuine mark from a media storage device (wherein the signature of the genuine mark contains data regarding an artifact of the genuine mark) and compares the signature of the candidate mark with the retrieved signature of the genuine mark.

In another embodiment, a computing device (or logic circuitry thereof) receives a captured image of a genuine mark, measures a characteristic of the candidate mark using the captured image, resulting in a set of metrics (in some cases, multiple sets of metrics) for that characteristic. The computing device generates a signature for the genuine mark based on the set of metrics. The computing device derives an HID from the signature using location identifiers corresponding to a subset of the locations at which it measured the characteristic (e.g., raster index numbers of the locations that yielded the highest-magnitude measurements) and stores the HID in a media storage device in association with the signature. In one embodiment, the computing device stores the HID and signature in a database in such a way that the computing device can subsequently query the database using the HID (or using an unknown HID that may closely match the HID of the signature of the genuine mark).

According to various embodiments, an HID of a candidate mark may closely match the HIDs of multiple genuine marks. Comparing the HID of a candidate mark with HIDs of genuine marks is, however, less computationally intensive and uses less memory than comparing actual signatures. Thus, by using HIDs in an initial pass through a set of known signatures of genuine marks, a computing device or logic circuitry can significantly cut down on the number of actual signatures that need to be compared.

This disclosure will often refer to a "mark." As used herein, a "mark" is a visible indicator that is intentionally put on a physical object. A mark may be something that identifies a brand (e.g., a logo), something that bears information, such as a barcode (e.g., a two-dimensional ("2D") barcode as specified in the International Organization for Standardization ("ISO") and the International Electrotechnical Commission ("IEC") standard ISO/IEC 16022), an expiration date, or tracking information such as a serial number), or a decoration. A mark is visible in some portion of the electromagnetic spectrum, though not necessarily with the naked eye. A "feature" of a mark is something on the mark that is visible (either to the aided or unaided eye). A "characteristic" of a feature is some measurable aspect of the feature, such as its linearity, color, or deviation from a best-fit grid.

A "profile" is a set of measurements of one or more characteristics of a feature. In various embodiments, one or more computing devices described herein may use one or more profiles in order to determine whether or not a mark is genuine. The following is a non-exhaustive list of types of profiles: an edge profile, a cell profile, a subarea profile, and an artifact profile.

The term "artifact" as used herein is a feature of a mark that was produced by the machine or process that created the mark, but not by design or intention (i.e., an irregularity). An artifact may have measurable characteristics. An artifact of a mark may occur outside of the intended borders of the mark. Examples of artifacts and their measurable characteristics include: (a) deviation in average color of a subarea (e.g., a cell of a 2D barcode) from an average derived from within the mark (which may be an average for neighboring cells of the same nominal color), (b) bias in the position of a subarea relative to a best-fit grid of neighboring subareas, (c) areas of a different one of at least two colors from a nominal color of the cells, (d) deviation from a nominal shape of a continuous edge within the mark, and (e) imperfections or other variations resulting from the mark being printed, such as extraneous marks or voids. In some embodiments, an artifact is not controllably reproducible.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a computing device carrying out an action, it is to be understood that this can also mean that logic circuitry integrated with the computing device is, in fact, carrying out the action.

The term "mobile communication device" as used herein is a communication device that is capable of sending and receiving information over a wireless network such as a cellular network or a WiFi network. Examples of mobile communication devices include cell phones (e.g., smartphones), tablet computers, and portable scanners having wireless communication functionality.

The term "spatial frequency" as used herein refers to the periodicity of the variation in pixel color (e.g., grayscale color) over a distance. The units of spatial frequency are pixels per unit of linear distance. For convenient reference, spatial frequency may also be expressed herein in terms of wavelength (e.g., the distance between adjacent peaks in pixel grayscale variation). For example, applying a band-pass filter to permit only components whose wavelengths are between 0.3 millimeters and 3 millimeters is equivalent to applying a band-pass filter to permit only components whose spatial frequencies are between 3.33 pixels per millimeter and 0.33 pixels per millimeter. Thus, when the term "spatial frequency band" is used herein, it may include a range of spatial wavelengths.

The terms "closely match," "closely matching," and "closely matched" as used herein refer the results of a determination made based on a comparison between values (e.g., two hash identifiers) that yields a similarity between the values that reaches or exceeds a predetermined threshold. For example, if the predetermined threshold is 20 percent, then two hash identifiers may be said to "closely match," be "closely matching," or are "closely matched" if 20 percent or more of the constituent parts (e.g., 20 percent or more of the constituent hash identifier blocks) of one hash identifier are equal in value to 20 percent or more of the constituent parts of the other hash identifier.

The term "location identifier" as used herein refers to a numerical value that maps to a location in a mark. The mapping relationship between a location identifier and the location within the mark may be one-to-one. An example of a location identifier having a one-to-one mapping relationship with a location in a mark is a raster index number.

The term "clustering" as used herein refers to a computing device carrying out the task of grouping a set of signatures (or data derived from such signatures—e.g., HIDs of the signatures) in such a way that signatures in the same group ("cluster") are more similar (by some at least one criterion) to each other than to those in other cluster. A computing device may carry out a clustering operation on a set of clusters to create a "supercluster." The clusters and superclusters of signatures are stored in one or more media storage devices and may be accessed via a database program.

Figure 1:
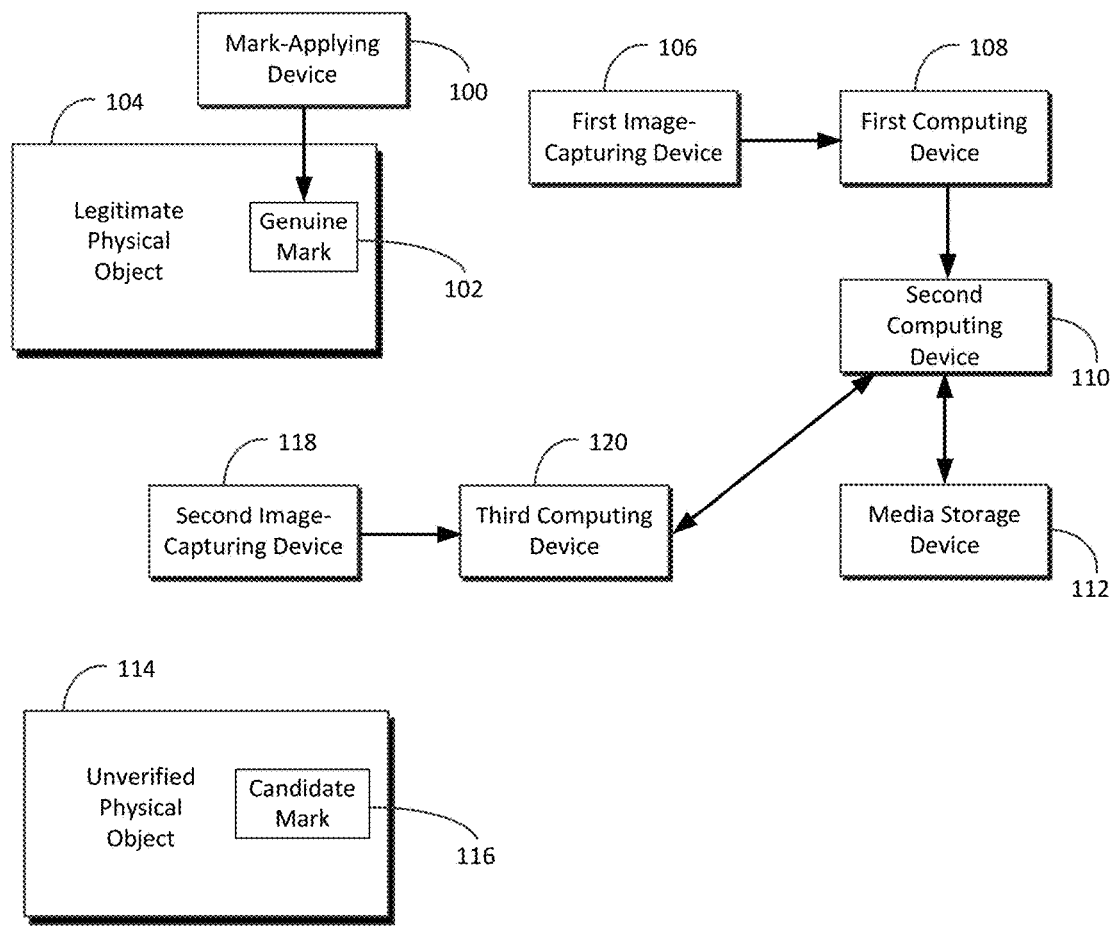
FIG. 1 is an example of a system in which various embodiments of the disclosure may be implemented.

Turning to FIG. 1, a mark-applying device 100 applies a genuine mark 102 ("mark 102") to a legitimate physical object 104 ("object 104"). In some embodiments, the object 104 is an article of manufacture, such as a piece of clothing, handbag, or fashion accessory. In other embodiments, the object 104 is a label, such as a barcode label or packaging for some other physical object. The mark 102 may be something that identifies a brand (e.g., a logo), something that bears information (e.g., a barcode), or a decoration. Possible embodiments of the mark-applying device 100 include a printer (e.g., a laser or thermal printer), an etching device, an engraving device, a mold-applying device, a branding device, a stitching device, and a thermal-transfer device. The mark-applying device 100 applies the mark 102 by, for example, printing, etching, engraving, molding, branding, stitching, or thermally transferring the mark 102 onto the object 104. The mark 102 includes one or more artifacts. In some embodiments, the mark 102 also includes intentionally-produced anti-counterfeiting features, such as microscopic patterns.

A first image-capturing device 106 (e.g., a camera, machine-vision device, or scanner) captures an image of the mark 102 after the mark 102 is applied. The circumstances under which the first image-capturing device 106 captures the image of the mark 102 are controlled, such that there is reasonable assurance that the image is, in fact, that of a genuine mark 102. For example, the time interval between the mark-applying device 100 applying the mark 102 and the first image-capturing device 106 obtaining the image of the mark 102 may be small, and the first image-capturing device 106 may be physically located next to the mark-applying device 100 along a packaging line. Thus, when the term "genuine mark" is used, it refers to a mark that was applied by a mark-applying device at a legitimate source (i.e., not copied illegally or surreptitiously).

The first image-capturing device 106 transmits the captured image to a first computing device 108. Possible embodiments of the first computing device 108 include a desktop computer, a rack-mounted server, a laptop computer, a tablet computer, and a mobile communication device. In some embodiments, the first image-capturing device 106 is integrated with the first computing device 108, in which case the first image-capturing device 106 transmits the captured image to logic circuitry of the first computing device 108. The first computing device 108 or logic circuitry therein receives the captured image and transmits the captured image to a second computing device 110. Possible implementations of the second computing device 110 include all of those devices listed for the first computing device 108.

Upon receiving the captured image, the second computing device 110 generates one or more filtered profiles of one or more features of the genuine mark 102. Actions that the second computing device may perform in carrying out this task in an embodiment are those set forth in FIG. 5, which will be described in more detail below. The second computing device 110 stores the filtered profiles in the media storage device 112.

According to an embodiment, the captured image of the genuine mark becomes part of a fused image prior to being used to generate a filtered profile. For example, assume that the first image-capturing device 106 captures multiple (two or more) images of the genuine mark and transmits the captured images to the first computing device 108. The first computing device 108 fuses the images (e.g., by averaging them together) into a single images (the "fused image") and transmits the fused image to the second computing device 110. The second computing device 110 then uses the fused image to generate one or more filtered profiles of one or more features of the genuine mark 102 by employing one or more of the techniques described herein. Alternatively, the first computing device 108 could send the multiple captured images to the second computing device 110, and then the second computing device could fuse the images (and generate one or more filtered profiles based on the resulting fused image).

Continuing with FIG. 1, an unverified physical object 114 ("unverified object 114"), which may or may not be the legitimate physical object 104, needs to be tested to ensure that it is not counterfeit or otherwise illegitimate. Possible embodiments of the unverified object 114 are the same as those of the legitimate physical object 104. On the unverified object 114 is a candidate mark 116. Possible embodiments of the candidate mark 116 are the same as those of the genuine mark 102. A second image-capturing device 118 (e.g., a camera, machine-vision device, or scanner) captures an image of the candidate mark 116 and transmits the image to a third computing device 120. As with the first image-capturing device 106 and the first computing device 108, the second image-capturing device 118 may be part of the third computing device 120, and the transmission of the captured image of the candidate mark 116 may be internal (i.e., from the second image-capturing device 118 to logic circuitry of the third computing device 120). The third computing device 120 (or logic circuitry therein) receives the captured image and transmits the captured image to the second computing device 110.

According to an embodiment, the captured image of the candidate mark becomes part of a fused image prior to being used to generate a filtered profile. This may be accomplished in the same way described above with respect to the captured image of the genuine mark 102.

Upon receiving the captured image, the second computing device 110 generates one or more filtered profiles of one or more features of the candidate mark 116. Actions that the second computing device may perform in carrying out this task in an embodiment are those set forth in FIG. 6, which will be described in more detail below.

Figure 2:
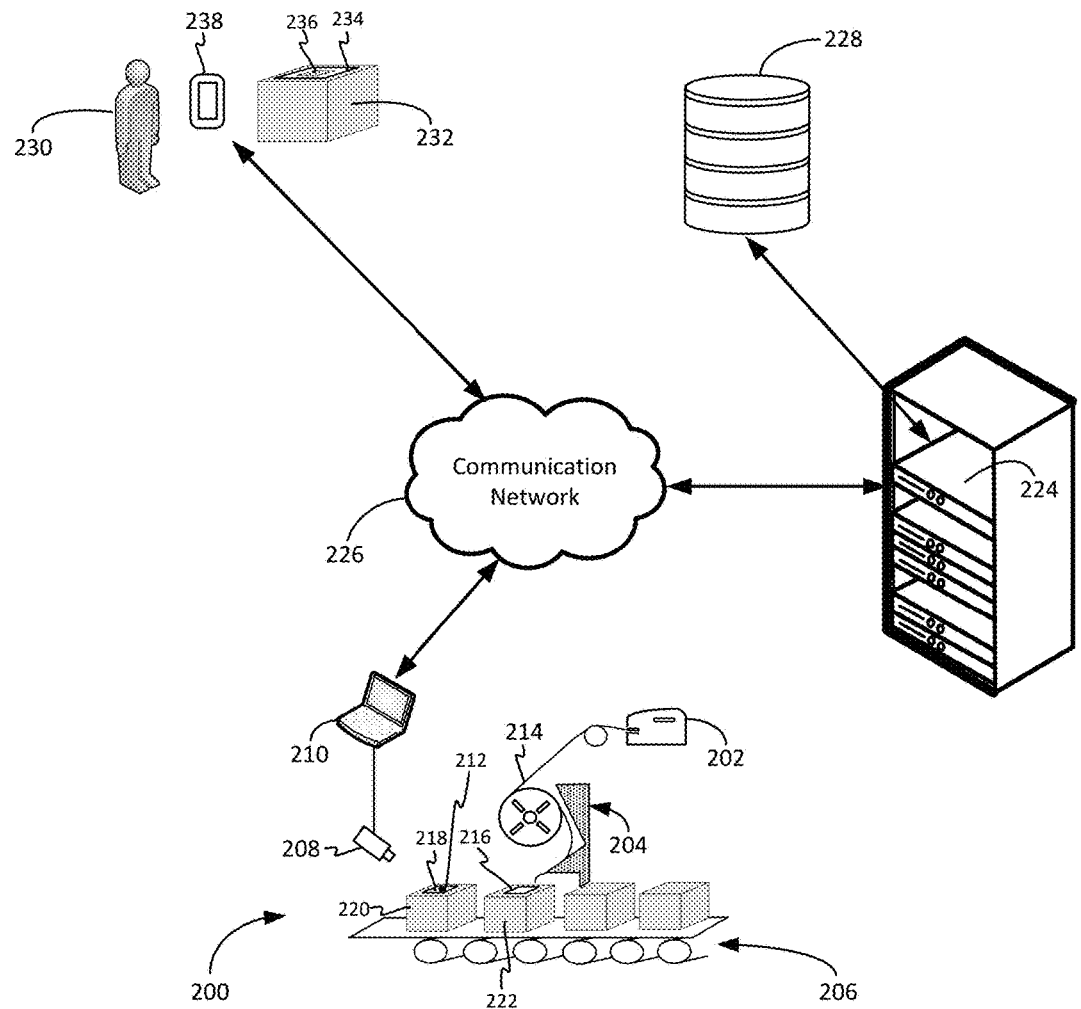
FIG. 2 is another example of a system in which various embodiments of the disclosure may be implemented.

Turning to FIG. 2, an example of a system that may be used in another embodiment is described. Located at a packaging facility 200 are a label printer 202, a label-applying device 204, a packaging line 206, an image-capturing device 208, and a first computing device 210. The label printer 202 applies genuine marks, including a genuine mark 212 ("mark 212"), to a number of labels that are carried on a label web 214. Possible embodiments of a genuine mark include a one-dimensional ("1D") barcode and a 2D barcode. The label applying device 204 applies the labels (including individually-shown labels 216 and 218 of FIG. 2) to legitimate physical objects, two of which are shown in FIG. 2 with reference numbers 220 and 222 ("first object 220" and "second object 222"). FIG. 2 shows the physical objects as being boxes (e.g., boxes containing manufactured products), but the objects do not have to be boxes or containers. Possible embodiments of the legitimate physical objects include those listed previously for the object 104 of FIG. 1.

The image-capturing device 208 captures an image of the mark 212 and transmits the captured image to a first computing device 210. The first computing device 210 receives the captured image and transmits the captured image to a second computing device 224 via a communication network 226 ("network 226"). Possible embodiments of the network 226 include a local-area network, a wide-area network, a public network, a private network, and the Internet. The network 226 may be wired, wireless, or a combination thereof.

Upon receiving the captured image, the second computing device 224 generates one or more filtered profiles of one or more features of the genuine mark 212. Actions that the second computing device 224 may perform in carrying out this task in an embodiment are those set forth in FIG. 5, which will be described in more detail below. The second computing device 224 stores the filtered profiles in the media storage device 228.

Continuing with FIG. 2, at some point in the chain of distribution from the packaging facility 200 to a point of distribution (e.g., a point of sale), a user 230 (e.g., a salesperson or law enforcement worker) handles an unverified physical object 232 ("unverified object 232") that has an unverified label 234 that carries a candidate mark 236. Indicia on the unverified object 232 or information encoded in the candidate mark 236 might suggest that the unverified object 232 originated from a legitimate source, such as the packaging facility 200 (or the company for which the packaging facility 200 is handling the original objects on the packaging line 206). In this scenario, the user 230 wishes to determine whether the unverified object 232 is counterfeit or otherwise illegitimate.

The user 230 launches an application on a third computing device 238 which, in FIG. 2, is depicted as a smartphone. The third computing device 238, under control of the application (and possibly in response to additional input from the user 230) captures an image of the candidate mark 236 (e.g., using a camera 314, depicted in FIG. 3). The third computing device 238 decodes the explicit data in the candidate mark 236 (e.g., data in a bar code, which indicates the identity of a product to which the bar code is applied), and transmits the captured image to the second computing device 224 via the network 226.

Upon receiving the captured image, the second computing device 224 generates one or more filtered profiles of one or more features of the candidate mark 236. Actions that the second computing device 224 may perform in carrying out this task in an embodiment are those set forth in FIG. 6, which will be described in more detail below.

Figure 3:
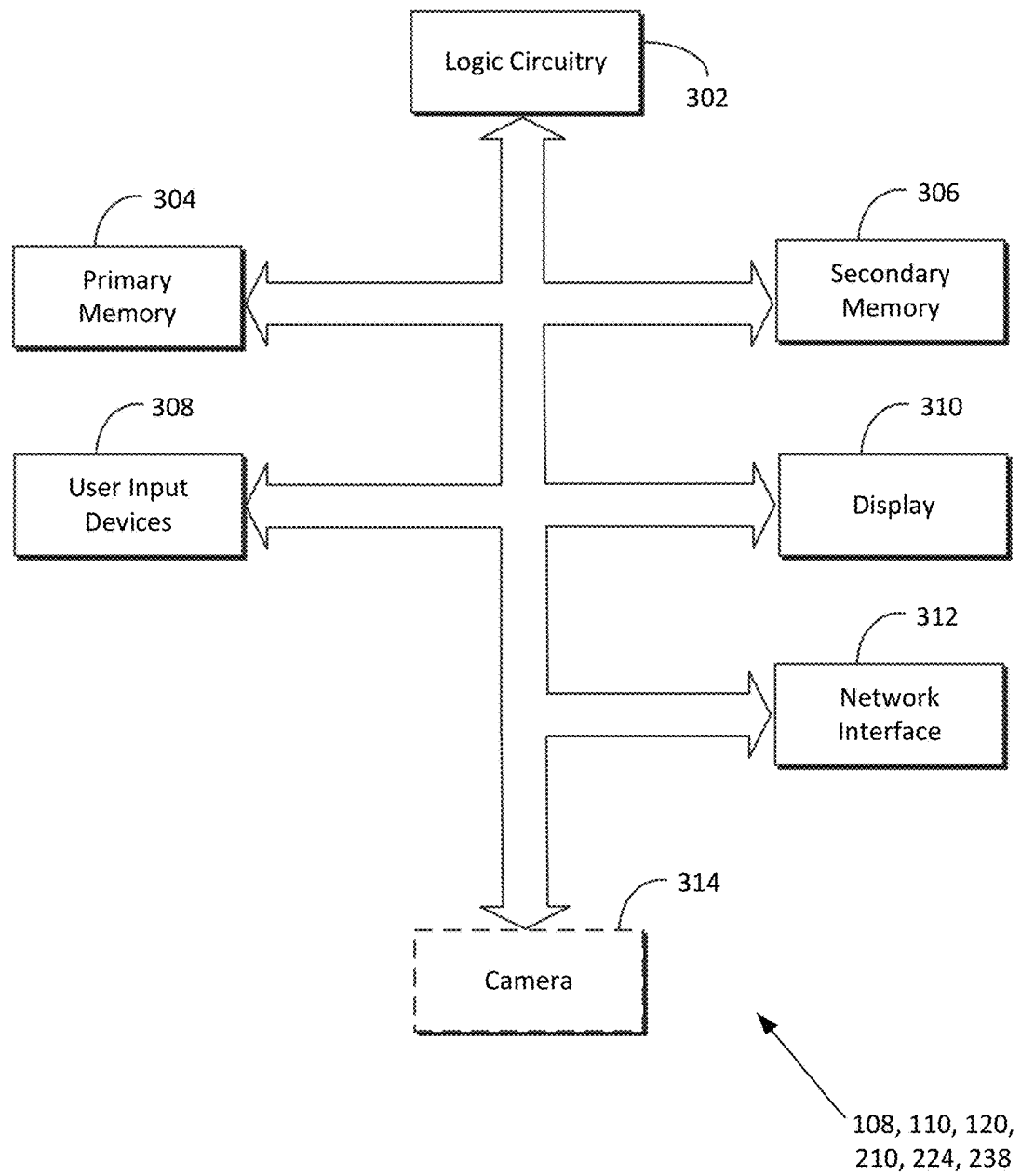
FIG. 3 shows the architecture of a computing device according to an embodiment.

In one implementation, one or more of the computing devices 108, 110, and 120 of FIG. 1 and one or more of the computing devices 210, 224, and 238 of FIG. 2 have the general architecture shown in FIG. 3. The device depicted in FIG. 3 includes logic circuitry 302, a primary memory 304 (e.g., volatile memory, random-access memory), a secondary memory 306 (e.g., non-volatile memory), user input devices 308 (e.g., a keyboard, mouse, or touchscreen), a display 310 (e.g., an organic, light-emitting diode display), and a network interface 312 (which may be wired or wireless). The memories 304 and 306 store instructions and data. Logic circuitry 302 executes the instructions and uses the data to carry out various procedures including, in some embodiments, the methods described herein (including, for example, those procedures that are said to be carried out by a computing device). Some of the computing devices may also include a camera 314 (e.g., the third computing device 238, particularly if it is implemented as a mobile communication device).

Figure 4:
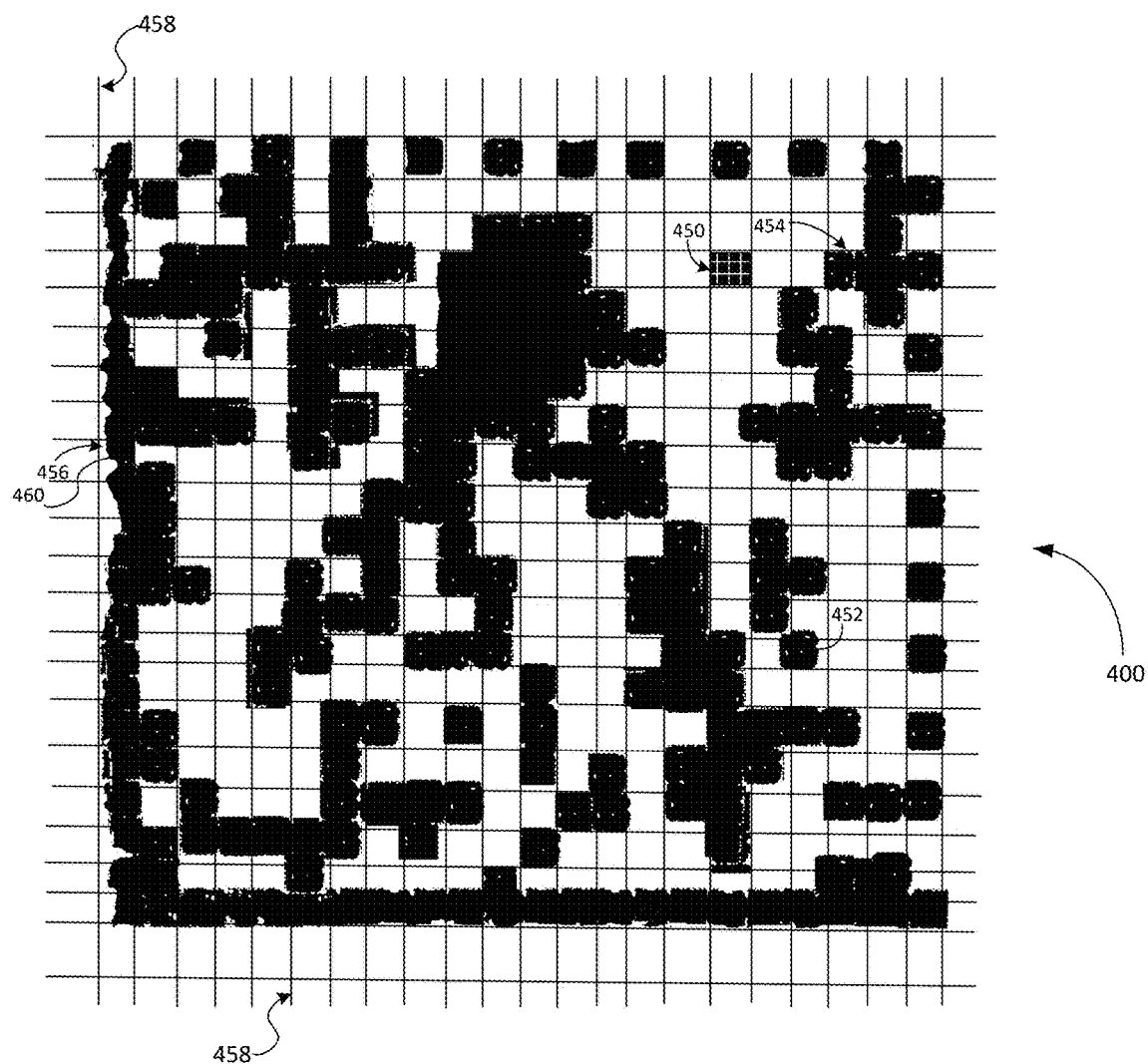
FIG. 4 shows an example of a mark according to an embodiment.

In an embodiment, a genuine mark (such as the genuine mark 212 of FIG. 2) is made up of a number of features referred to herein as "subareas." The subareas may correspond to "cells" according to ISO/IEC 15415 and may be uniformly-sized. To help illustrate some of the concepts discussed herein, attention is directed to FIG. 4, which illustrates a mark 400 having a first subarea 450, a second subarea 452, a third subarea 454, and a fourth subarea 456. A characteristic of the first subarea 450 is its average pigmentation, which a computing device may measure and determine to deviate significantly (e.g., to a degree that exceeds a predetermined threshold) from that of other subareas. A characteristic of the second subarea 452 is its offset from a best-fit grid 458. A computing device may measure this deviation and determine the amount of deviation to be significantly higher than that of other subareas. A characteristic of the third subarea 454 is the incidence of voids. A computing device may measure the incidence of voids and determine that the third subarea 454 includes significantly higher incidence of voids than other subareas. Finally, a feature that can be found in the fourth subarea 456 is an edge 460. A characteristic of the edge 460 is its linearity. A computing device may measure this linearity and determine that the linearity is significantly less than edges of other subareas.

Figure 5:
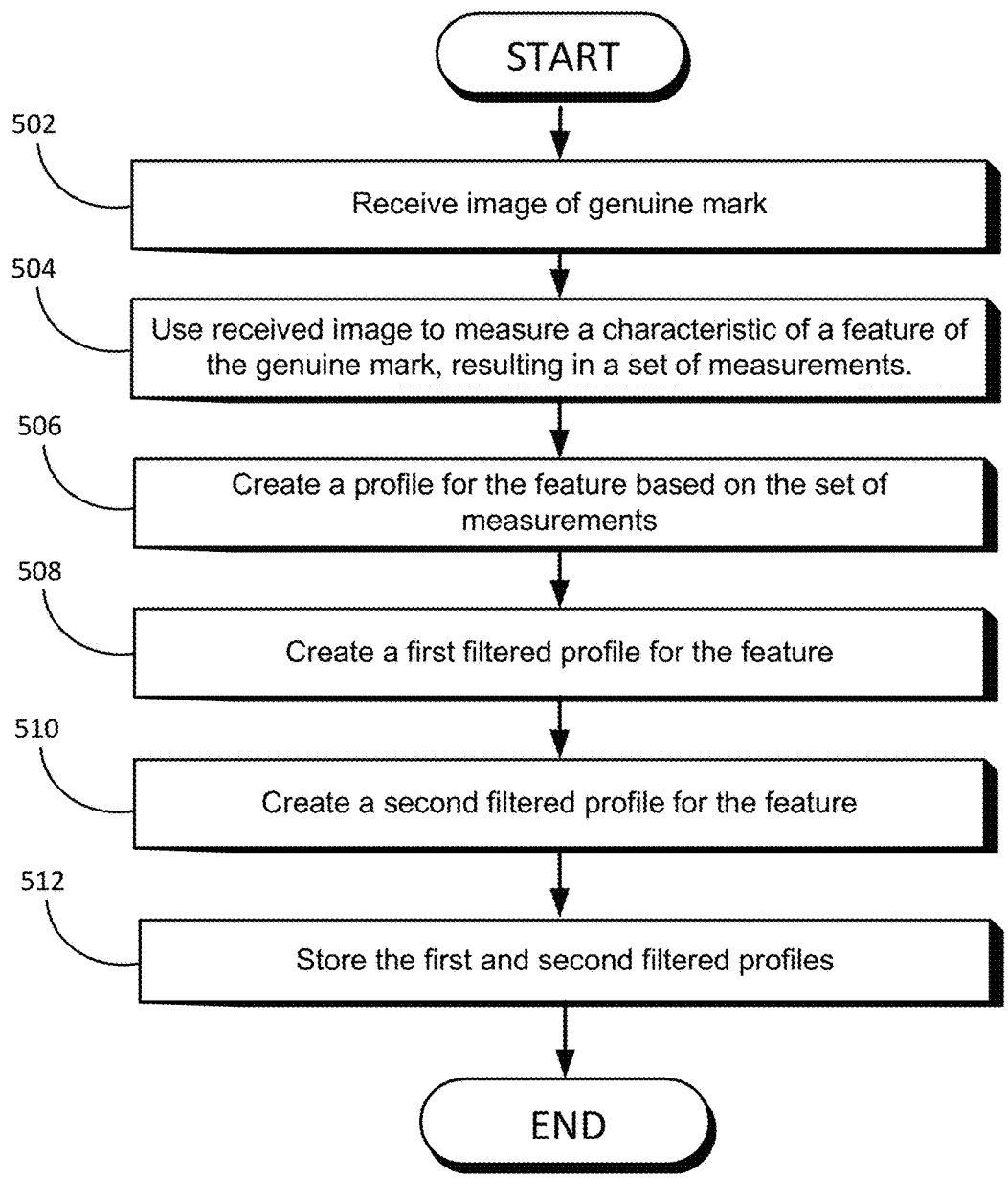
FIG. 5 is a flow chart of a process carried out by one or more computing devices according to an embodiment.

Turning to FIG. 5, an example of a procedure that the second computing device 110 or second computing device 224 carries out in an embodiment is described. At block 502, the computing device receives an image of the genuine mark. At block 504, the computing device uses the received image to make measurements of a feature of the genuine mark, resulting in a set of measurements. If a feature whose characteristics are being measured happens to be an artifact, then the set of measurements will consequently include data regarding the artifact. The set of measurements may be one of several sets of measurements that the computing device generates about the genuine mark. The computing device may carry out the measurements in different locations on the genuine mark. In doing so, the computing device can divide the mark into multiple subareas (e.g., in accordance with an industry standard). In an embodiment, if the mark is a 2D barcode, the computing device carries out measurements on all of or a subset of the total number of subareas (e.g., all of or a subset of the total number of cells) of the mark.

Examples of features of the genuine mark that the computing device may measure include: edges, bars, areas between bars, extraneous marks, regions, cells, and subareas. Examples of characteristics of features that the computing device may measure include: shape, aspect ratio, location, size, contrast, prevalence of discontinuities, color (e.g., lightness, hue, or both), pigmentation, and contrast variations. In some embodiments, the computing device takes measurements of the same characteristic on the same features from mark to mark, but on different features for different characteristics. For example, the computing device might measure the average pigmentation on a first set of subareas of a mark, and on that same first set of subareas for subsequent marks, but measure edge linearity on a second set of subareas on the mark and on subsequent marks. The two sets of subareas (for the different features) may be said to be "different" if there is at least one subarea that is not common to both sets. For example, the computing device may measure (for all or a subset of subareas of the mark): (1) the average pigmentation of some or all of the subareas of the mark (e.g., all or some of the cells), (2) any deviation in the position of the subareas from a best-fit grid, (3) the prevalence of stray marks or voids, and (4) the linearity of one or more edges of the subarea.

At block 506, the computing device creates a profile for the feature based on the measurements. At block 508, the computing device creates a first filtered profile for the feature. For example, the computing device applies a first band-pass filter to the profile. At block 510, the computing device creates a second filtered profile for the feature. For example, the computing device applies a second band-pass filter to the profile. At block 512, the computing device stores the first and second filtered profiles (e.g., in the media storage device 112 or the media storage device 228).

In an embodiment, a computing device (such as the second computing device 110 or second computing device 224) measures the pixel value (e.g., the grayscale value) of each pixel along a line starting from the interior of a portion of a mark and extending out beyond an edge of the mark and calculates an average of all of the measured pixels (referred to as the "projected average pixel value").

Figure 6:
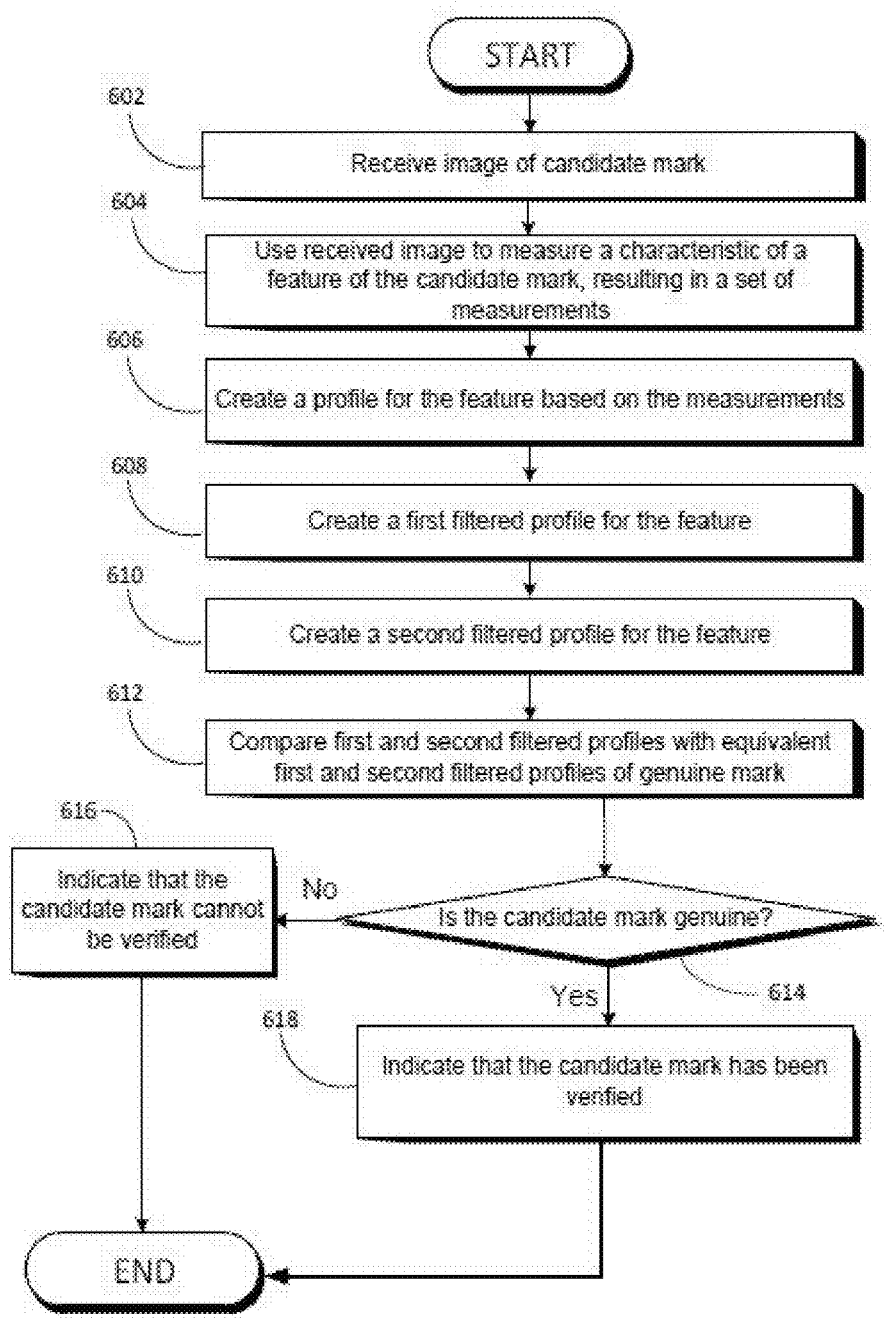
FIG. 6 is a flow chart of a process carried out by one or more computing devices according to another embodiment.

Turning to FIG. 6, an example of a procedure that the second computing device 110 or second computing device 224 carries out in an embodiment is described. At block 602, the computing device receives an image of a candidate mark. At block 604, the computing device uses the received image to make measurements of a feature of the candidate mark. At block 606, the computing device creates a profile for the feature based on the measurements. At block 608, the computing device creates a first filtered profile for the feature. At block 610, the computing device creates a second filtered profile for the feature. The computing device may carry out blocks 606, 608, and 610 using the image of the candidate mark in the same way described above (e.g., blocks 506, 508, and 510) for the genuine mark. At block 612, the computing device compares the first and second filtered profiles with equivalent first and second profiles of the genuine mark (e.g., retrieving the first and second profiles of the genuine mark from the media storage device). Based on the comparison, the computing device determines, at block 614, whether the candidate mark is genuine. If the computing device determines that the candidate mark is not genuine then (at block 616) the computing device indicates that candidate mark cannot be verified (e.g., by transmitting a message to the third computing device 110, which the third computing device 110 displays to the user). If the computing device determines that the candidate mark is genuine then (at block 618) the computing device indicates that candidate mark has been verified (e.g., by transmitting a message to the third computing device 110, which the third computing device 110 displays to the user).

Figure 7A:
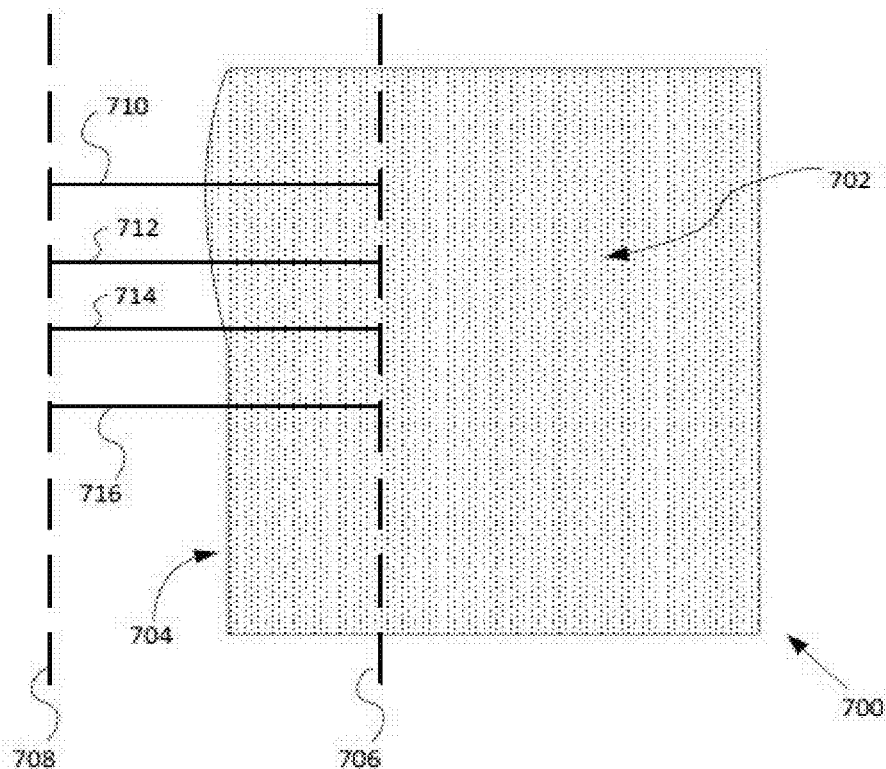
FIG. 7A and FIG. 7B show an example of how a computing device calculates projected average pixel values according to an embodiment.

As noted above, one possible feature for which a computing device (in an embodiment) can take measurements of a characteristic (e.g., block 504 or block 604) is an edge. Turning to FIG. 7A, for example, a portion 700 of a barcode has an interior area 702 (typically printed in black) and an edge 704. FIG. 7A also depicts a first reference axis 706 and extending out beyond the edge 704 to a second reference axis 708. There are many possible values for the distance between the first reference axis 706 and the second reference axis 708. For example, the distance may be the distance to the next printed area (the white space gap) or one-half the width of the printed area in which the computing device is taking measurements currently operating (the interior area 702). The distance may a larger or smaller fraction of the width of the interior area 702. In other embodiments, both the first reference axis 706 and the second reference axis 708 are within the interior area 702. In other embodiments, both axes are outside of the interior area 702 (e.g., only in the white space). The computing device in this embodiment measures the grayscale value (e.g., on a scale from 0 to 255) of each of the pixels along a first line 710, along a second line 712, along a third line 714, and along a fourth line 716. Each of the first line 710, second line 712, third line 714, and fourth line 716 starts at the first axis 706, extends out towards and beyond the edge 704, and terminates at the second axis 708.

In FIG. 7A, the lines 710, 712, 714, and 716 are depicted in FIG. 7A as being perpendicular to the first reference axis 706 and second reference axis 708, but need not be. Although depicted in FIG. 7A has being spaced apart from one another, the lines 710, 712, 714, and 716 may have no space in between one another. Furthermore, although four lines are depicted, there may be fewer (even as few as one) or more. Additionally, the lines 710, 712, 714, and 716 may be straight, but need not be. For example, if the barcode (of which the portion 700 is part) is on a curved surface, then the lines 710, 712, 714, and 716 might be straight in the x-y plane, but be curved with respect to the z-axis (e.g., bulging outwardly from the page).

Although the edge 704 is depicted as generally linear with regard to the y direction, it need not be. For example, the edge could be an offset curve (e.g., resemble a wavy line). Furthermore, while the first reference axis 706 and second reference axis 708 are depicted as being generally parallel to the edge 706, they need not be.

Figure 8:
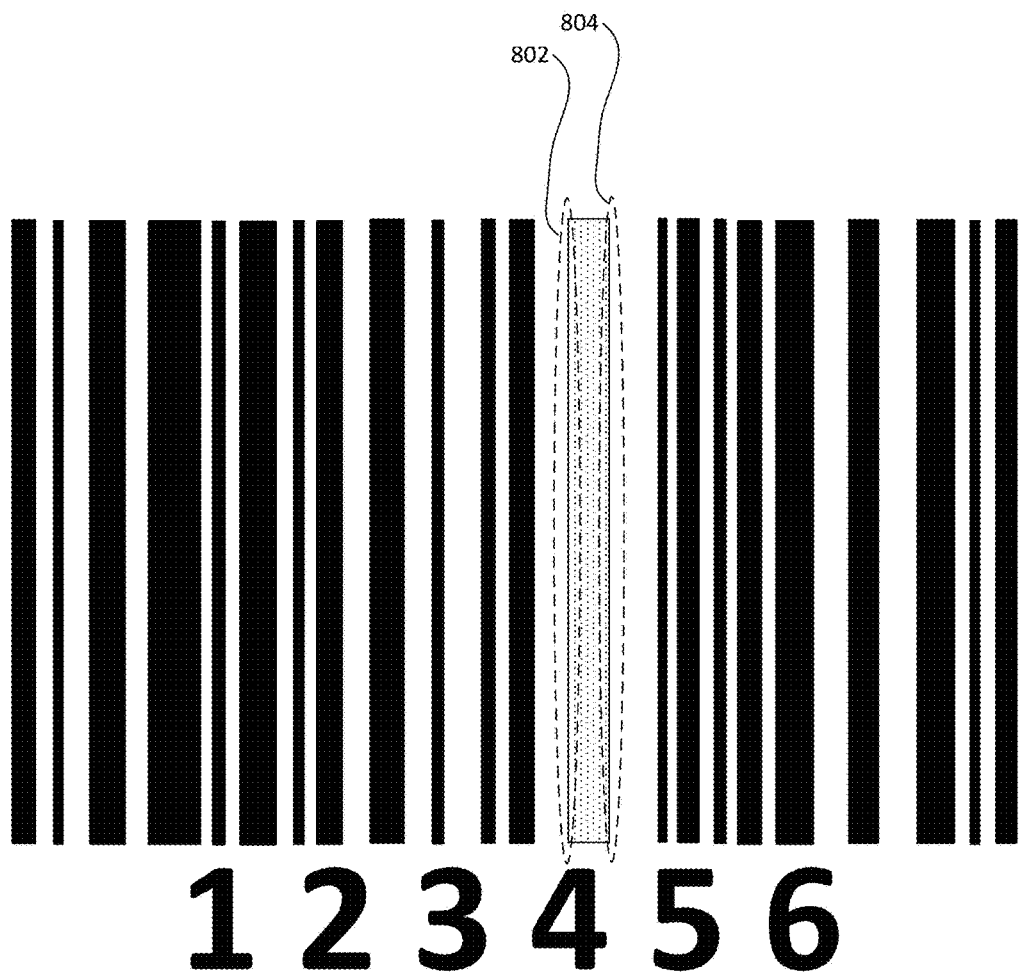
FIG. 8 shows an example of a mark according to another embodiment.

In an embodiment, if the feature is an edge, for a given edge of a mark, the computing device develops profile for the edge (blocks 506 and 606). The edge profile, in an embodiment, includes a data series of the projected average pixel values calculated for a portion of the mark that includes the edge. The computing device calculates a projected average pixel value of the pixels along each of the first line 710, second line 712, third line 714, and fourth line 716. The computing device may carry out this projected average pixel value operation on multiple edges of the mark, and do so on the entire length of an edge or less than the entire length of an edge. For example, on a 2D barcode, such as that shown in FIG. 4, the computing device may carry out the operation on any combination of: top edges of one or more cells, bottom edges of one or more cells, left edges of one or more cells, and right edges of one or more cells. In another example, on a 1D barcode, such as that shown in FIG. 8, the computing device may carry out the projected average pixel value operation on each of the bars of the portions of the bars of the barcode. For example, the computing device could carry out the operation on the portion 802 of the thirteenth bar (shaded for clarity) of the barcode of FIG. 8, which includes the leading edge of that bar, and carry out the operation on the portion 804, which includes the trailing edge. The computing device may carry out this operation on the leading and trailing edges of each of the bars.

Figure 7B:
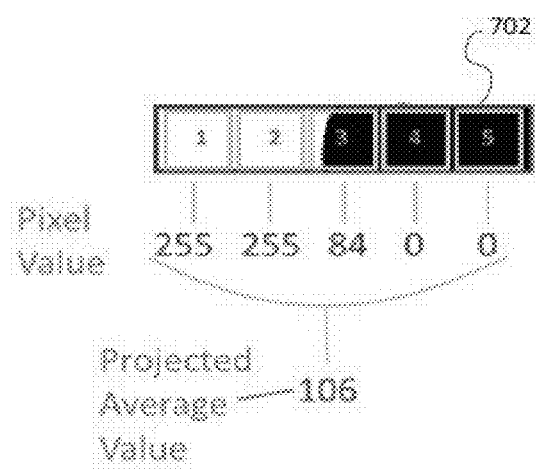

Turning to FIG. 7B, the pixels of the first line 710 are represented by four individual pixels. Naturally, there may be many more pixels, but only four are shown for ease of description. Pixels 1 and 2 each have a value of 255, Pixel 3 has a value of 84, and Pixels 4 and 5 each have a value of 0. The average of those values (the projected average pixel value) is 106.

Figure 9A:
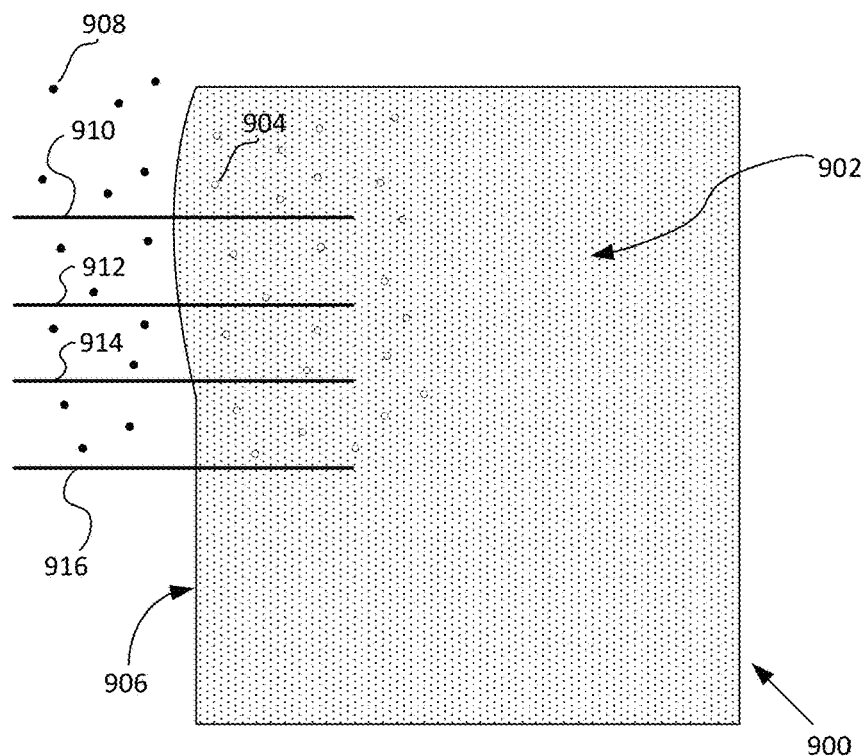
FIG. 9A and FIG. 9B show another example of how a computing device calculates projected average pixel values according to an embodiment.
Figure 9B:
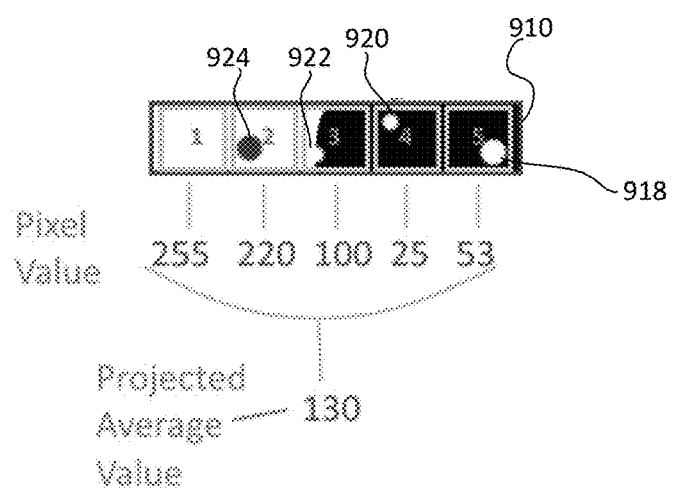

Taking an average along the projection lines allows the computing device to account for artifacts that are within the interior area 702 of the barcode portion 700 in addition to the artifacts along the edge 704. For example, FIG. 9A shows a portion 900 of a barcode having an interior area 902 in which there are extraneous voids 904, and an edge 906, beyond which are extraneous marks 908. The computing device in this embodiment measures the grayscale value each of the pixels along a first line 910, along a second line 912, along a third line 914, and along a fourth line 916. FIG. 9B illustrates that the projected average pixel value (130) along the first line 910 is partly a result of extraneous voids 918, 920, and 922, as well as extraneous mark 924. These extraneous marks and voids affect the individual values of pixels, so that Pixel 2 has a value of 220, Pixel 3 has a value of 100, Pixels 4 has a value of 25, and Pixel 5 has a value of 53.

Figure 10:
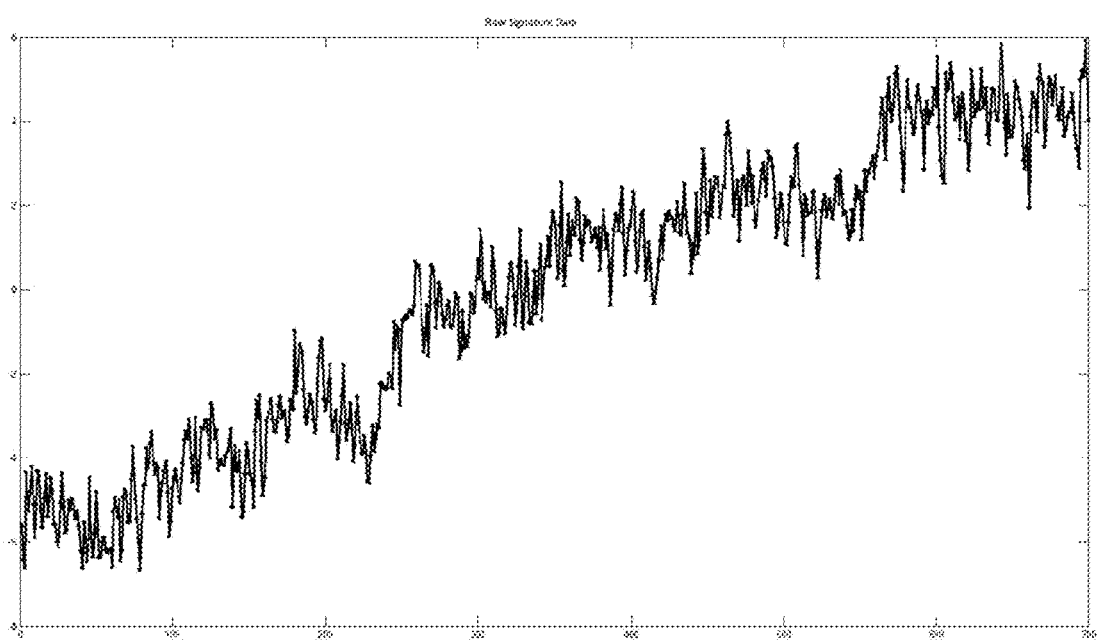
FIG. 10 shows an example of a plot of a profile of an edge according to an embodiment.

FIG. 10 depicts a plot of an example of an edge profile. The vertical axis represents the projected average pixel value (e.g., gray value) taken along a line (e.g., as described in conjunction with FIG. 7A and FIG. 9A) in the region of an edge of a mark. The horizontal axis represents the position along the first reference axis 706 (e.g., in units of pixel index values, or the order of a pixel in a continuous line of pixels along the reference axis).

Figure 11:
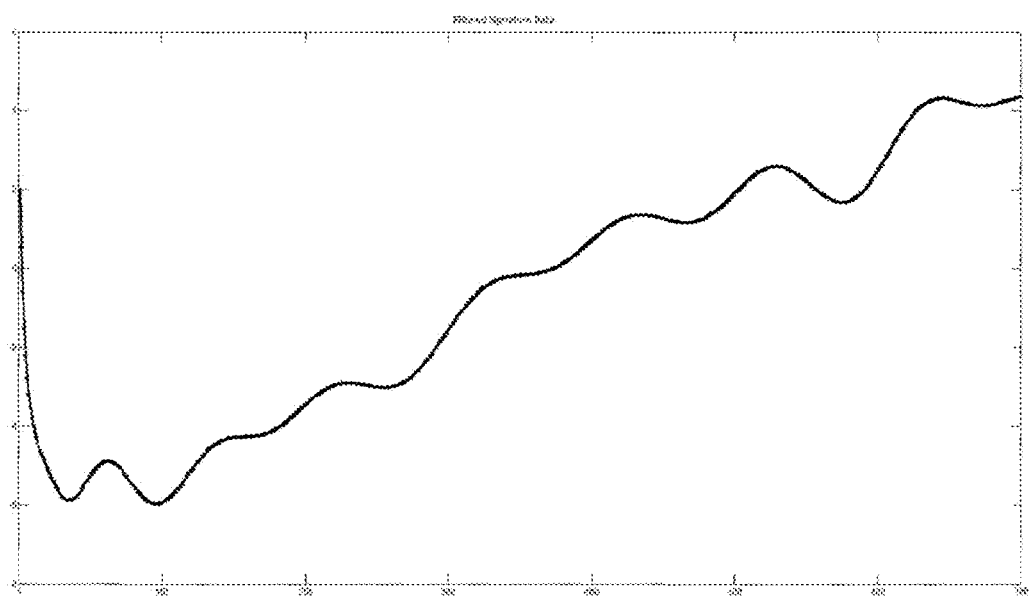
FIG. 11 shows an example of the edge profile of FIG. 10 after the computing device has applied a band-pass filter according an embodiment.

According to an embodiment, to carry out blocks 508, 510, 608, and 610, the computing device applies a series of band-pass filters, one at a time, to the profile of an edge of the mark, and may do so for multiple edge profiles (e.g., for each edge for which the computing device has developed an average value profile). The band-pass filter eliminates all spatial frequency components except for those frequency components that fall within the range of the band-pass filter. FIG. 10 shows an example of an edge profile before the computing device has applied a band-pass filter. FIG. 11 shows a plot representing the edge projection of FIG. 10 after the computing device applies a band-pass filter.

There are many possible types of filters and filtering techniques that may be used in various embodiments. For example, it has been discovered that there exists a detectable relationship between different marks printed by the same marking equipment when subjected to a signature analysis as set forth above. Being neither as strong as the similarity measured between a genuine item and it's matching signature, nor as weak as the similarity score of a true counterfeit, the similarity measured falls somewhere between the two extremes. This property will sometimes be referred to herein as "the sibling phenomenon." Similarly, marks exhibiting it will sometimes be referred to as "siblings" of the mark from which the genuine signature used in the comparison was derived. A "sibling signature" refers to data that is (1) derived from measuring characteristics (e.g., resulting from artifacts) of sibling marks, and (2) is usable to identify sibling marks. The term "individual signature" will sometimes be used to refer to the overall signature of a mark to distinguish from its "sibling signature" in the description.

Figure 12:
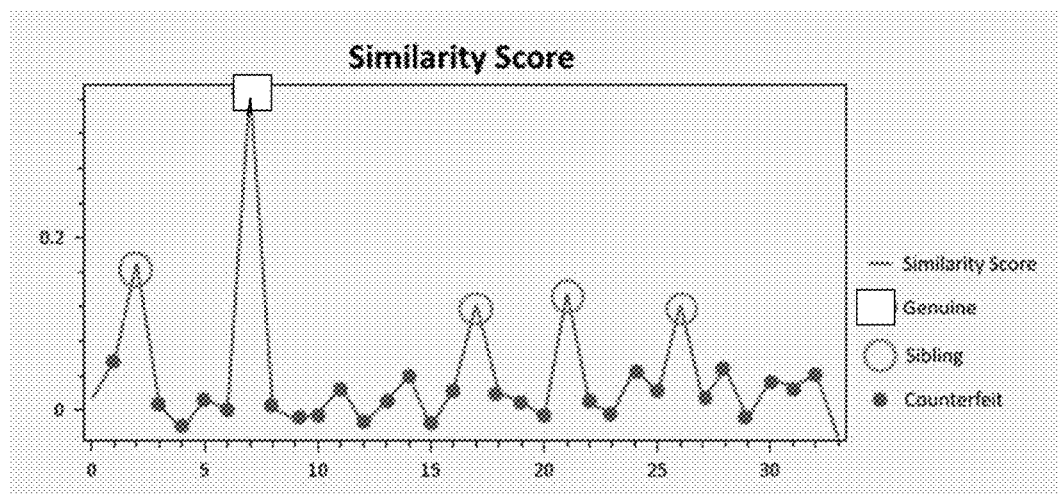
FIG. 12 illustrates the respective similarity measured among a typical set of marks including a genuine, four siblings of the genuine, and a larger number of counterfeits, according to an embodiment.

FIG. 12 illustrates the respective similarity measured among a typical set of marks including a genuine mark, four siblings of the genuine mark, and a larger number of counterfeits.

HID Embodiment

Figure 13:
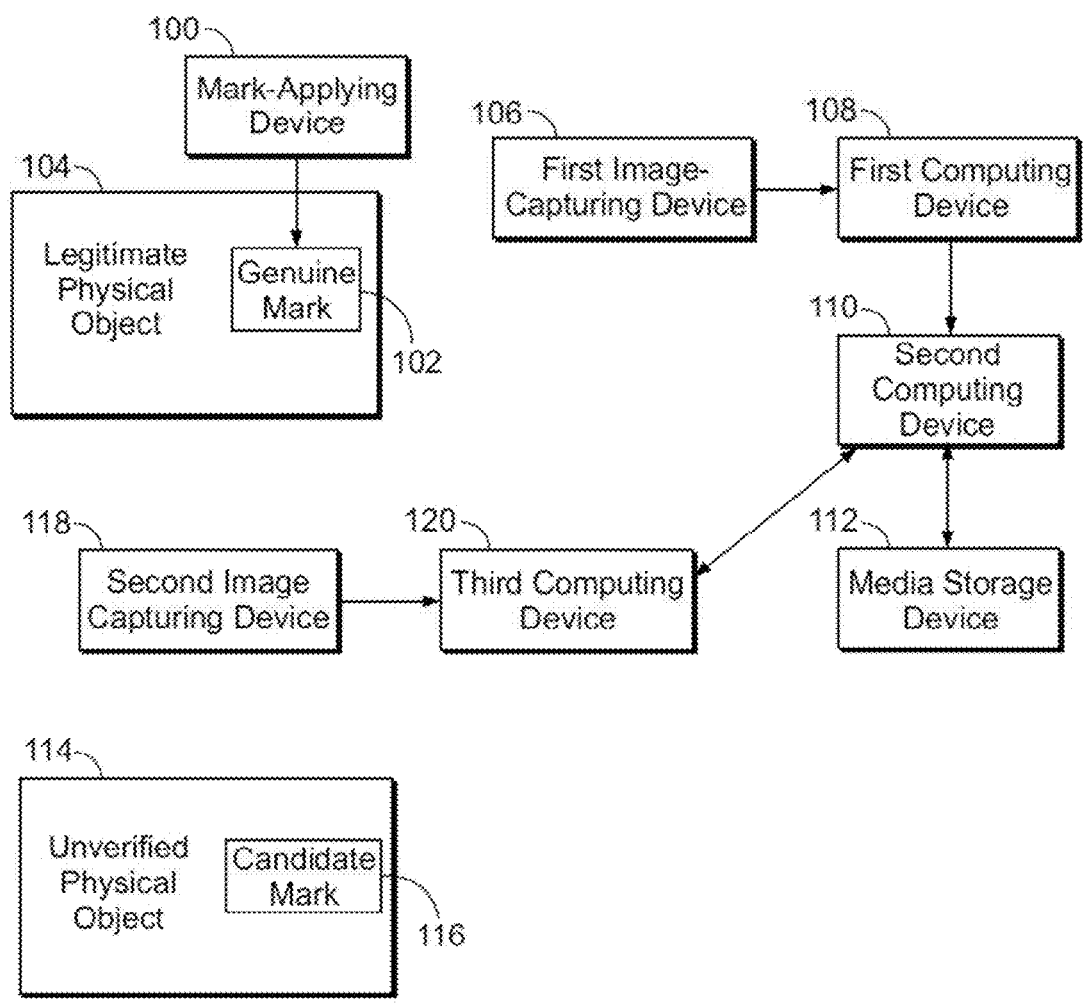
FIG. 13 is an example of a system in which various embodiments of the disclosure may be implemented.

Turning to FIG. 13, an example of a system in which various embodiments of the disclosure may be implemented is shown. The procedures carried out within this system are shown in the flow charts of FIG. 14A, FIG. 14B, and FIG. 14C. FIG. 1 is described here in parallel with FIG. 14A, FIG. 14B, and FIG. 14C.

A mark-applying device 100 applies a genuine mark 102 ("mark 102") to a legitimate physical object 104 ("object 104") (block 202 of FIG. 14A). In some embodiments, the object 104 is an article of manufacture, such as a piece of clothing, handbag, or fashion accessory. In other embodiments, the object 104 is a label, such as a barcode label or packaging for some other physical object. The mark 102 may be something that identifies a brand (e.g., a logo), something that bears information (e.g., a barcode), or a decoration. Possible embodiments of the mark-applying device 100 include a printer (e.g., a laser or thermal printer), an etching device, an engraving device, a mold-applying device, a branding device, a stitching device, and a thermal-transfer device. The mark-applying device 100 applies the mark 102 by, for example, printing, etching, engraving, molding, branding, stitching, or thermally transferring the mark 102 onto the object 104. The mark 102 includes one or more artifacts. In some embodiments, the mark 102 also includes intentionally-produced anti-counterfeiting features, such as microscopic patterns.

A first image-capturing device 106 (e.g., a camera, machine-vision device, or scanner) captures an image of the mark 102 after the mark 102 is applied (block 204). The circumstances under which the first image-capturing device 106 captures the image of the mark 102 are controlled, such that there is reasonable assurance that the image is, in fact, that of a genuine mark 102. For example, the time interval between the mark-applying device 100 applying the mark 102 and the first image-capturing device 106 obtaining the image of the mark 102 may be small, and the first image-capturing device 106 may be physically located next to the mark-applying device 100 along a packaging line. Thus, when the term "genuine mark" is used, it refers to a mark that was applied by a mark-applying device at a legitimate source (i.e., not copied illegally or surreptitiously).

The first image-capturing device 106 transmits the captured image to a first computing device 108. Possible embodiments of the first computing device 108 include a desktop computer, a rack-mounted server, a laptop computer, a tablet computer, and a mobile phone. In some embodiments, the first image-capturing device 106 is integrated with the first computing device 108, in which case the first image-capturing device 106 transmits the captured image to logic circuitry of the first computing device 108. The first computing device 108 or logic circuitry therein receives the captured image and transmits the captured image to a second computing device 110. Possible implementations of the second computing device 110 include all of those devices listed for the first computing device 108.

The second computing device 110 receives the captured image and uses the captured image to measure various characteristics of the mark 102, resulting in a set of metrics that include data regarding artifacts of the mark 102 (block 206). As will be described further, the set of metrics may be one of several sets of metrics that the second computing device 110 generates about the mark 102. The second computing device 110 may carry out the measurements in different locations on the mark 102. In doing so, the second computing device 110 can divide the mark 102 into multiple subareas (e.g., in accordance with an industry standard). In an embodiment, if the mark 102 is a 2D barcode, the second computing device 110 carries out measurements on all of or a subset of the total number of subareas (e.g., all of or a subset of the total number of cells) of the mark 102. Examples of characteristics of the mark 102 that the second computing device 110 may measure include: (a) feature shape, (b) feature aspect ratios, (c) feature locations, (d) feature size, (e) feature contrast, (f) edge linearity, (g) region discontinuities, (h) extraneous marks, (i) printing defects, (j) color (e.g., lightness, hue, or both), (k) pigmentation, and (l) contrast variations. In some embodiments, the second computing device 110 takes measurements on the same locations from mark to mark for each characteristic, but on different locations for different characteristics. For example, the first second computing device 110 might measure the average pigmentation on a first set of locations of a mark, and on that same first set of locations for subsequent marks, but measure edge linearity on a second set of locations on the mark and on subsequent marks. The two sets of locations (for the different characteristics) may be said to be "different" if there is at least one location that is not common to both sets.

In an embodiment, the results of characteristic measuring by the second computing device 110 include a set of metrics. There may be one or more sets of metrics for each of the measured characteristics. The second computing device 110 analyzes the set of metrics and, based on the analysis, generates a signature that is based on the set of metrics (block 208). Because the set of metrics includes data regarding an artifact (or multiple artifacts) of the mark 102, the signature will be indirectly based on the artifact. If the mark 102 carries data (as in the case of a 2D barcode), the second computing device 110 may also include such data as part of the signature. Put another way, in some embodiments, the signature may be based on both artifacts of the mark 102 and on the data carried by the mark 102.

In an embodiment, in order to generate the signature, for each measured characteristic of the mark 102, the second computing device 110 ranks the metrics associated with the characteristic by magnitude and use only those metrics that reach a predetermined threshold as part of the signature. For example, the second computing device 110 might refrain from ranking those metrics that are below the predetermined threshold. In an embodiment, there is a different predetermined threshold for each characteristic being measured. One or more of the predetermined thresholds may be based on a noise threshold and on the resolution of the first image-capturing device 106.

In an embodiment, the second computing device 110 obtains one hundred data points for each characteristic and collects six groups of measurements: one set of measurements for pigmentation, one set of measurements for deviation from a best-fit grid, one set of measurements for extraneous markings or voids, and three separate sets of measurements for edge linearity.

As part of the ranking process, the second computing device 110 may group together metrics that are below the predetermined threshold regardless of their respective locations (i.e., regardless of their locations on the mark 102). Also, the second computing device 110 may order the metrics (e.g., by magnitude) in each characteristic category as part of the ranking process. Similarly, the second computing device 110 might simply discount the metrics that are below the predetermined threshold. Also, the process of ranking may simply constitute separating metrics that are above the threshold from those that are below the threshold.

In an embodiment, the second computing device 110 orders the measured characteristics according to how sensitive the characteristics are to image resolution issues. For example, if the first image-capturing device 106 does not have the capability to capture an image in high resolution, it might be difficult for the second computing device 110 to identify non-linearities of edges. However, the second computing device 110 may have no problem identifying deviations in pigmentation. Thus, the second computing device 110 might, on this basis, prioritize pigmentation over edge non-linearities. According to an embodiment, the second computing device 110 orders the measured characteristics in reverse order of resolution-dependence as follows: subarea pigmentation, subarea position bias, locations of voids or extraneous markings, and edge non-linearities.

According to an embodiment, the second computing device 110 weights the measured characteristics of the mark 102 based on one or more of the resolution of the first image-capturing device 106 and the resolution of the captured image of the mark 102. For example, if the resolution of the first image-capturing device 106 is low, then the second computing device 110 may give more weight to the average pigmentation of the various subareas of the mark 102. If the resolution of first image-capturing device 106 is high, then the second computing device 110 may give measurements of the edge irregularities of various subareas higher weight than other characteristics.

If the mark 102 includes error-correcting information, such as that set forth by ISO/IEC 16022, then the second computing device 110 may use the error-correcting information to weight the measured characteristics. For example, the second computing device 110 could read the error-correcting information, use the error-correcting information to determine which subareas of the mark 102 have errors, and under-weight the measured characteristics of such subareas.

According to an embodiment, in generating the signature, the second computing device 110 weights the measurements for one or more of the characteristics of the mark 102 based on the mark-applying device 100. For example, assume that the mark-applying device 100 is a thermal transfer printer. Further assume that it is known that, for those marks applied by the mark-applying device 100, edge projections parallel to the substrate material direction of motion are unlikely to yield edge linearity measurements of a magnitude sufficient to reach the minimum threshold for the edge linearity characteristic. The second computing device 110 may, based on this known idiosyncrasy of the mark-applying device 100, under-weight the edge linearity characteristic measurements for the mark 102.

Continuing with FIG. 13, the second computing device 110 uses location identifiers corresponding to a subset of the metrics of the signature to derive an HID (block 210). In one embodiment, the second computing device 110 uses index numbers corresponding to a subset of the highest-magnitude metrics of the signature to derive an HID. Note that "highest-magnitude" metrics do not necessarily connote features of a mark that are visible to the unaided eye or even directly measurable by techniques other than those described herein. As will be discussed in further detail below, the second computing device 110 may, in deriving the HID, use index numbers corresponding to a subset of each set of metrics as a block within an overall HID. The second computing device 110 stores the signature and the HID (e.g., using a database program) in a media storage device 112 (e.g., a redundant array of independent disks) (block 212) such that the HID is associated with the signature. In some embodiments, the HID can also be used to look up the signature (e.g., the second computing device 110 uses a database program to set the HID as an index key for the signature). In some embodiments, the media storage device 112 is made up of multiple devices that are geographically and temporally distributed, as is often the case with cloud storage services. In some embodiments, one or more of the characteristic measuring, analysis of the various sets of metrics, generation of the signature, derivation of the HID, and storage of the signature and the HID are carried out by the first computing device 108. In other embodiments, all of those steps are carried out by the first computing device 108 and the media storage device 112 is directly accessed by the first computing device 108. In the latter embodiment, the second computing device 110 is not used. In still other embodiments, the second computing device 110 transmits the signature and HID to a separate database server (i.e., another computing device), which stores the signature and HID in the media storage device 112. It is to be understood that the media storage device 112 is not necessarily a single, on-site storage device, but rather may be one or more storage devices and may remotely located and accessed via a cloud-based service.

Continuing with FIG. 13, an unverified physical object 114 ("unverified object 114"), which may or may not be the legitimate physical object 104, needs to be tested to ensure that it is not counterfeit or otherwise illegitimate. Possible embodiments of the unverified object 114 are the same as those of the legitimate physical object 104. On the unverified object 114 is a candidate mark 116. Possible embodiments of the candidate mark 116 are the same as those of the genuine mark 102. A second image-capturing device 118 (e.g., a camera, machine-vision device, or scanner) captures an image of the candidate mark 116 (block 250 of FIG. 14B) and transmits the image to a third computing device 120. As with the first image-capturing device 106 and the first computing device 108, the second image-capturing device 118 may be part of the third computing device 120, and the transmission of the captured image of the candidate mark 116 may be internal (i.e., from the second image-capturing device 118 to logic circuitry of the third computing device 120). The third computing device 120 (or logic circuitry therein) receives the captured image and transmits the captured image to the second computing device 110. The second computing device 110 uses the captured image to measure various characteristics of the candidate mark 116, including the same characteristics that the second computing device 110 measured on the genuine mark 102. The result of this measurement is a set of metrics for the characteristic (block 252). Over successive measurements, the result may include one or more sets of metrics for each of the measured characteristics. The second computing device 110 then generates a signature that is based on the set (or sets) of metrics (block 254), and does so using the same technique it used to generate a signature for the genuine mark 102. If the candidate mark 116 is, in fact, the genuine mark 102 (or generated by the same process as the genuine mark 102), then the signature that the second computing device 110 creates will, like the signature generated from the captured image of the genuine mark 102, be based on the artifacts of the genuine mark 102. If, on the other hand, the candidate mark 116 is not the genuine mark 102 (e.g., is a counterfeit), then the signature generated by this latest image will be based on whatever other characteristics the candidate mark 116 exhibits—artifacts of the counterfeiting process, an absence of artifacts from the mark-applying device 100, etc. The second computing device 110 uses location identifiers corresponding to a subset of the metrics of the signature of the candidate mark 116 (e.g., index numbers of a subset of the highest-magnitude metrics) to derive an HID for the candidate mark 116 (block 256) (in the same manner set forth above with respect to block 210), and compares (e.g., through querying a database) the HID of the candidate mark 116 with HIDs of genuine marks stored in the media storage device 112 (block 258). As an outcome of the comparison, the second computing device 110 either receives no closely-matching results (e.g., no results that pass the predetermined threshold), or receives one or more closely-matching HIDs from the media storage device 114 (block 260). If the second computing device 110 receives no closely-matching results, then the second computing device 110 indicates (e.g., by transmitting a message) to the third computing device 120 indicating that the candidate mark 116 cannot be verified (e.g., transmits a message indicating that the candidate mark 116 is not genuine) (block 262). The third computing device 120 receives the message and indicates, on a user interface, that the candidate mark 116 cannot be verified (or that the candidate mark 116 is counterfeit). In some embodiments, the third computing device 118 carries out one or more of the measuring, generating, and deriving steps, and transmits the signature (or HID, if the third computing device 118 derives the HID) to the second computing device 110.

If, on the other hand, the second computing device 110 finds one or more HIDs that closely-match the HID of the candidate mark 116, then the second computing device 110 will respond by retrieving, from the media storage device 112, the signatures that are associated with the closely-matching HIDs (block 264). The second computing device 110 then compares the actual signature that it generated for the candidate mark 116 with the retrieved genuine signatures (block 266 of FIG. 14C). The second computing device 110 repeats this process for each signature to which a closely-matching HID is associated. If the second computing device 110 is not able to closely-match the signature of the candidate mark 116 with any of the retrieved signatures (block 268), then the second computing device 110 indicates (e.g., by transmitting a message) to the third computing device 120 indicating that the candidate mark 116 cannot be verified (block 270). The third computing device 120 receives the message and indicates, on a user interface, that the candidate mark 116 cannot be verified. If, on the other hand, the second computing device 110 is able to closely-match the signature of the candidate mark 116 with a retrieved signature, then the second computing device 110 indicates (e.g., by transmitting a message) to the third computing device 120 that the candidate mark 116 is genuine (block 272).

Turning to FIG. 15 an example of a system that may be used in another embodiment is described. Procedures that may be carried out within this system are shown in the flow charts of FIG. 16A, FIG. 16B, and FIG. 16C. FIG. 15, FIG. 16A, FIG. 16B, and FIG. 16C are described here in parallel.

Located at a packaging facility 300 are a label printer 302, a label-applying device 304, a packaging line 306, an image-capturing device 308, and a first computing device 310. The label printer 302 applies genuine marks, including a genuine mark 312 ("mark 312"), to a number of labels that are carried on a label web 314 (block 402 of FIG. 16A). Possible embodiments of a genuine mark include a one-dimensional ("1D") barcode and a 2D barcode. The label applying device 304 applies the labels (including individually-shown labels 316 and 318 of FIG. 15) to legitimate physical objects (block 404), two of which are shown in FIG. 15 with reference numbers 320 and 322 ("first object 320" and "second object 322"). FIG. 15 shows the physical objects as being boxes (e.g., boxes containing manufactured products), but the objects do not have to be boxes or containers. Possible embodiments of the legitimate physical objects include those listed previously for the object 104 of FIG. 13.

The image-capturing device 308 captures an image (or multiple images) of the mark 312 (block 406) and transmits the captured image (or multiple images) to a first computing device 310. The first computing device 310 receives the captured image (or images) and transmits the captured image (or (i) creates a fused image based on the multiple captured, as described above, or (ii) transmits the multiple captured images) to a second computing device 324 via a communication network 326 ("network 326"). Possible embodiments of the network 326 include a local-area network, a wide-area network, a public network, a private network, and the Internet. The network 326 may be wired, wireless or a combination thereof.

If the second computing device 324 receives multiple images of the mark 406, it may then fuse the multiple images (e.g., by averaging) to create a fused image. The second computing device 324 receives the captured image (e.g., as part of a fused image) and carries out quality measurements (e.g., such as those set forth in ISO 15415) on the mark 312 using the image (e.g., using the fused image) (block 408). For example, the second computing device 324 may determine whether there is unused error correction and fixed pattern damage in the mark 312. The second computing device 324 then uses the captured image to measure characteristics of the mark 312, resulting in one or more sets of metrics that include data regarding artifacts of the mark 312 (block 410). For example, the second computing device 324 may measure (for all or a subset of subareas of the genuine mark 312): (1) the average pigmentation of some or all of the subareas of the genuine mark 312 (e.g., all or some of the cells), (2) any deviation in the position of the subareas from a best-fit grid, (3) the prevalence of stray marks or voids, and (4) the linearity of one or more edges of the subarea. Each set of metrics corresponds to a measured characteristic, although there may be multiple sets of metrics for a single characteristic. For example, for each subarea being measured—say, one hundred subareas out of one thousand total subareas of the mark 312—there may be a metric for average pigmentation, a metric for deviation from best fit, a metric for the prevalence of stray marks, and three metrics for edge linearity. Thus, the resulting set of metrics would be one hundred metrics for pigmentation, one hundred for deviation for best fit, one hundred metrics for stray marks or voids, and three hundred metrics (three sets of one hundred metrics each) for edge linearity. In an embodiment, each set of metrics is in the form of a list, wherein each entry of the list includes information identifying the position in the mark 312 (e.g., a raster-based index number) from which the second computing device 324 took the underlying measurement and a data value (e.g., a magnitude) derived from the measurement itself.

The second computing device 324 then analyzes the metrics to identify those metrics that will be used to generate an electronic signature for the mark 312 (block 412), and generates the signature based on the analysis (block 414). The second computing device 324 identifies a subset of the highest-magnitude metrics of the signature (block 416), derives an HID block using location identifiers corresponding to the identified subset (block 418), creates an HID based on the HID block (block 420 of FIG. 16A), and stores the HID in association with the signature (block 422) in a media storage device 328 (whose possible implementations are the same as those described for the media storage device 112 of FIG. 13). In some embodiments, the second computing device 324 repeats blocks 416 and 418 for each set of metrics of the signature (e.g., once for the set of measurements for pigmentation, once set of measurements for deviation from a best-fit grid, once for the set of measurements for extraneous marks or voids, and once for each of the three separate sets of measurements for edge linearity). In some embodiments, the first computing device 310 carries out one or more of blocks 402 through 420 and transmits the signature or the HID to the second computing device 324.

Continuing with FIG. 15, at some point in the chain of distribution from the packaging facility 300 to a point of distribution (e.g., a point of sale), a user 330 (e.g., a salesperson or law enforcement worker) handles an unverified physical object 332 ("unverified object 332") that has an unverified label 334 that carries a candidate mark 336. Indicia on the unverified object 332 or information encoded in the candidate mark 336 might suggest that the unverified object 332 originated from a legitimate source, such as the packaging facility 300 (or the company for which the packaging facility 300 is handling the original objects on the packaging line 306). In this scenario, the user 330 wishes to determine whether the unverified object 332 is counterfeit or otherwise illegitimate.

The user 330 launches an application on a third computing device 338 which, in FIG. 15, is depicted as a smartphone. The third computing device 338, under control of the application (and possibly in response to additional input from the user 330) captures an image of the candidate mark 336 (block 450 of FIG. 16B) (e.g., using a camera 514, depicted in FIG. 17). The third computing device 338 decodes the explicit data in the candidate mark 336 (block 452) (e.g., data in a bar code, which indicates the identity of a product to which the bar code is applied), and transmits the captured image to the second computing device 324 via the network 326. The second computing device 324 then uses the captured image to measure a characteristic of the candidate mark 336, resulting in one or more sets of metrics (block 454), resulting in one or more sets of metrics for each of the measured characteristics. The second computing device 324 then analyzes the metrics to identify those metrics that will be used to generate an electronic signature for the mark 336 (block 456), and generates the signature based on the analysis (block 458). The second computing device 324 may repeat blocks 454 and 456 for each characteristic to be measured for the mark, and even repeat these blocks multiple times for a single characteristic (yielding a "signature-worthy" set of metrics on each iteration). The second computing device 324 identifies a subset of the highest-magnitude metrics of the signature (block 460) and derives an HID block the set of metrics (of the signature) using location identifiers associated with the identified subset (block 462). The second computing device 324 may repeat blocks 454 and 456 for each set of metrics of the signature, yielding multiple HID blocks (in essence, one HID block for each set of metrics). In some embodiments, the third computing device 338 carries out blocks 454 through 462 and transmits the signature or HID to the second computing device 324. The second computing device 324 then carries out the procedures described above with respect to FIG. 14B and FIG. 14C, which are reproduced in FIG. 16B and FIG. 16C. In other words, the second computing device 324 carries out blocks 464, 466, 468, 470, 472, 474, 476, and 478 of FIG. 16B and FIG. 16C in the same fashion that the second computing device 110 of FIG. 13 carried out blocks 258, 260, 262, 264, 266, 268, 270, and 272 of FIG. 14B and FIG. 14C.

In one implementation, one or more of the computing devices 108, 110, and 120 of FIG. 13 and one or more of the computing devices 310, 324, and 338 of FIG. 15 have the general architecture shown in FIG. 17. The device depicted in FIG. 17 includes logic circuitry 502, a primary memory 504 (e.g., volatile memory, random-access memory), a secondary memory 506 (e.g., non-volatile memory), user input devices 508 (e.g., a keyboard, mouse, or touchscreen), a display 510 (e.g., an organic, light-emitting diode display), and a network interface 512 (which may be wired or wireless). The memories 504 and 506 store instructions and data. Logic circuitry 502 executes the instructions and uses the data to carry out various procedures including, in some embodiments, the methods described herein (include, for example, those procedures that are said to be carried out by a computing device). Some of the computing devices may also include a camera 514 (e.g., the third computing device 338, particularly if it is implemented as a mobile device).

In an embodiment, a genuine mark (such as the genuine mark 312 of FIG. 15) is made up of a number of locations referred to herein as "subareas." The subareas may correspond to "cells" according ISO/IEC 15415 and may be uniformly-sized. To help illustrate some of the concepts discussed herein, attention is directed to FIG. 18, which illustrates a mark 600 having a first subarea 650, a second subarea 652, a third subarea 654, and a fourth subarea 656. A characteristic of the first subarea 650 is that its average pigmentation deviates significantly (e.g., to a degree that exceeds a predetermined threshold) from other subareas. A characteristic of the second subarea 652 is that its offset from a best-fit grid 658 is significantly higher than that of other subareas. A characteristic of the third subarea 654 is that it includes significantly higher incidence of voids than other subareas. Finally, a characteristic of the fourth subarea 656 is that it includes an edge 660 whose linearity is significantly less than edges of other subareas.

In an embodiment, to carry out the process of analyzing the metrics obtained from measuring characteristics of a mark (such as in block 412 of FIG. 16A and block 456 of FIG. 16B), a computing device (such as the second computing device 324) performs the following tasks. The computing device generates the best-fit grid 658. In doing so, the computing device identifies ideal locations for boundaries between the various subareas of the mark. The computing device selects subareas whose characteristic measurements are to be used for generating the signature for the mark. In an embodiment, the computing device carries out this selection based on which subareas have characteristics whose measurements deviate the most (e.g., above a predetermined threshold) from a normal or optimal measurement expected for that subarea. Examples of the kind of subareas that the computing device would select in this scenario include:

(1) Subareas whose average color, pigmentation, or intensity are closest to the global average threshold differentiating dark cells from light cells as defined by a 2D barcode standard—i.e., the "lightest" dark cells and the "darkest" light cells. The first subarea 650 falls within this category. In an embodiment, if the computing device identifies a given subarea as having a deviant average pigmentation density, the computing device may need to reassess subareas for which the identified subarea was a nearest neighbor. When the computing device carries out such reassessment, the computing device may discount the identified subarea as a reference.

(2) Subareas whose position deviates the most (e.g., above a predetermined threshold) from an idealized location as defined by the best-fit grid 658. In some embodiments, the computing device determines whether a given subarea falls into this category by identifying the edges of the subarea, determining the positions of the edges, and comparing the positions of the edges to their expected positions, which are defined by the best-fit grid 658. In other embodiments, the computing device generates a histogram of the boundary region between two adjacent subareas of opposite polarity (e.g., dark/light or light/dark), with the sample region overlapping the same percentage of each subarea relative to the best-fit grid 658, and evaluates the deviation of the histogram from a 50/50 bimodal distribution. The second subarea 652 falls within this category.

(3) Subareas that contain extraneous markings or voids, either light or dark. In an embodiment, the computing device determines whether a subarea falls within this category by generating a luminance histogram for the subarea and determining whether the distance between the outermost dominant modes of the histogram is sufficiently (e.g., above a pre-determined threshold) great. The third subarea 654 falls within this category.

(4) Subareas having one or more edges that have one or more of (a) a length that exceeds a pre-determined threshold, (b) continuity for a length that exceeds (or falls below) a predetermined threshold), and (c) a linearity that exceeds (or falls below) a predetermined threshold. In an embodiment, the computing device determines whether a subarea falls within this category by calculating a pixel-wide luminance value over the length of one subarea, offset from the best-fit grid 658 by the length of half of a subarea, run perpendicular to the grid line bounding that edge in the best-fit grid 658. The fourth subarea 656 falls within this category.

After the computing device measures the characteristics of the mark (genuine or candidate), the computing device makes the measured characteristics of the mark available as an index-array associated list (associable by subarea (e.g., cell) position in the mark).

Turning to FIG. 19, in another example, assume that the mark being analyzed is a 1D linear barcode 700. Features that a computing device (such as the second computing device 324) may use to form an electronic signature include: variations 702 in the width of or spacing between bars; variations 704 in the average color, pigmentation or intensity; voids 706 in black bars (or black spots in white stripes); and irregularities 708 in the shape of the edges of the bars.

Turning to FIG. 20 and FIG. 21, the process that a computing device (such as the second computing device 324) carries out to identify a subset of the highest magnitude metrics of the electronic signature for a mark at block 416 of FIG. 16A and block 460 of FIG. 16B (and derive an HID from the location identifiers associated with the subset) will now be described. For each measured characteristic (and for each set of metrics for a characteristic in those cases where a characteristic is measured multiple times) the computing device takes the set of metrics that make up part of an electronic signature and sorts the set by value. In FIG. 20, for example, a first set 802 of metrics (depicted as a list) represents the pigmentation for various cells of a 2D barcode, with each cell having an associated index number. The data for each cell is unitless at this point, but when the computing device originally took the pigmentation measurement, it did so in terms of gray value. The first set 802 is just one of multiple sets of metrics that make up the electronic signature for the 2D barcode. The computing device sorts the first set 802 by the magnitude of the data value and extracts a subset 804 of index numbers corresponding to a subset 806 of the highest-magnitude data values. The computing device then makes the subset 804 of index values an HID block for the first set 802 of metrics.

In another example, in FIG. 21, a first set 902 of metrics corresponds to a first characteristic of the mark (e.g., the genuine mark 312 or the candidate mark 336), a second set 904 of metrics corresponds to a second characteristic of the mark, and a third set 906 of metrics (the "nth set" or final set) corresponds to a third characteristic of the mark. There may be any number of sets of metrics, however. Each member of each set of metrics in this example includes (1) an index value, which correlates with the raster position of the subarea of the mark from which a measurement of the characteristic was obtained, and (2) a data value, which is a magnitude that is either the measurement itself or is derived from the measurement (e.g., after some statistical processing and normalization). The computing device sorts each set of metrics by data value. For each set of metrics, the computing device extracts the index values corresponding to a highest-magnitude subset of the data values. In this example, each highest-magnitude subset is the top twenty-five data values of a set of metrics. The computing device derives a first HID block 908 from the index values corresponding to the highest-magnitude subset of the first set 902 of metrics. The computing device similarly derives a second HID block 910 from the index values corresponding to the highest-magnitude subset of the second set 904 of metrics. The computing device continues this process until it has carried out this process for each of the sets of metrics (i.e., through the nth set 906 of metrics to derive a third or "nth" HID block 912), resulting in a set of HID blocks. The computing device forms the HID by aggregating the HID blocks. In this example, the HID blocks contain the extracted index values themselves.

Turning to FIG. 22, an example of how a computing device (e.g., the second computing device 324) compares an HID generated for a candidate mark to an HID of a genuine mark (e.g., as described in conjunction with blocks 464 and 466 in FIG. 16B) according to an embodiment is shown. The computing device attempts to match index values that make up the respective HID blocks of the candidate mark and the genuine mark, with like sets of index values being matched against one another for an "apples to apples" comparison (e.g., the extracted subset of the index values for pigmentation of the candidate mark is compared to the extracted subset of the index values for pigmentation of the genuine mark). The computing device counts each match towards a match score. Thus, for example, the block 1002 of the genuine mark and the block 1004 of the candidate mark have a match score of 21, while the block 1006 of the candidate mark and the block 1008 of the genuine mark have a match score of 4.

Turning to FIG. 23, an example of how a computing device (e.g., the second computing device 324) compares an overall HID of a genuine mark with that of a candidate mark according to an embodiment is described. The computing device takes each individual HID block of an HID value 1100 of a genuine signature and compares it to the corresponding block of an HID value 1102 of a candidate signature and assigns a match score (e.g., as described above with respect to FIG. 22). The computing device then combines each of the scores into an overall match score. If the overall match score meets or exceeds a predetermined threshold score, then the computing device deems the HIDs to be closely matched. For example, the computing device may use a predetermined threshold score of 120, meaning that if the score is 120 or more, then the computing device would deem the two HIDs to be closely matching. This threshold could be as low as zero. In some embodiments the computing device disregards the minimum and simply take the "top <n>" HID scores (e.g., the top 10). In such a case, the computing device would consistently be performing a test on the top 10 best HID matches. This addresses the possibility of having an inaccurate HID cutoff and thereby generating a false negative through the filtering step (at the expense of unnecessary computations on actual non-genuine candidates). The computing device then retrieves the signature associated with the genuine HID value 1100. The computing device repeats this process until it has compared the candidate HID value 1102 with a number (perhaps all) of the HID values stored in a database of genuine mark signatures. The outcome of this process will be a subset of the whole set of genuine mark signatures, each of which the computing device can then compare (via a more "brute force" method) to the signature of the candidate mark.

There are various ways by which one or more of the computing devices described herein may compare electronic signatures (e.g., of a candidate mark and a genuine more) with one another. In an embodiment, the computing device compares one electronic signature (e.g., of a candidate mark) with another electronic signature (e.g., of a genuine mark) (e.g., at blocks 266 and 472) using direct numerical correlation. For example, the computing device (e.g., the second computing device 324) array-index matches the raw sets of metrics of the two marks for each characteristic. The computing device also subjects each raw set of the genuine mark to normalized correlation to a like-order extracted metric set from a candidate mark. The computing device then uses the correlation results to arrive at a match/no match decision (genuine vs. counterfeit).

In another example, the computing device compares a candidate signature with a genuine signature through the use of autocorrelation, such as by comparing the autocorrelation series of the sorted metrics of the candidate mark with the autocorrelation series of the (stored) sorted genuine signature. For clarity, the well-known statistical operation:

$$r_{xy} = \frac{n\Sigma x_i y_i - \Sigma x_i \Sigma y_i}{\sqrt{n\Sigma x_i^2 - (\Sigma x_i)^2} \sqrt{n\Sigma y_i^2 - (\Sigma y_i)^2}}$$

is the common Normalized Correlation Equation, where r is the correlation result, n is the length of the metric data list, and x and y are the metrics data sets for the genuine mark and the candidate mark, respectively. When the computing device carries out the autocorrelation function, the data sets x and y are the same.

To produce the autocorrelation series according to an embodiment, the computing device carries out the operation set forth in the Normalized Correlation Equation multiple times, each time offsetting the series x by one additional index position relative to the series y (remembering that y is a copy of x). As the offset progresses, the data set "wraps" back to the beginning as the last index in the y data series is exceeded due to the x index offset. According to an embodiment, the computing device accomplishes this by doubling the y data and "sliding" the x data from offset 0 through offset n to generate the autocorrelation series.

In some embodiments, at block 212 in FIG. 14A and at block 422 in FIG. 16A, instead of storing the entire signature in the media storage device, the second computing device instead stores a set of polynomial coefficients that describe (to a predetermined order and precision) a best-fit curve matching the shape of the autocorrelation results. This is feasible because the second computing device carries out the process of generating the signature on sorted metrics data and, as a result, the autocorrelation series for the characteristic data (i.e., the metrics that help represent the artifacts within the genuine mark) is typically a simple polynomial curve.

In an embodiment, a computing device (e.g., the second computing device 110 or second computing device 324) computes $r_{xy}$, where each term $x_i$ is an artifact represented by its magnitude and location, and each term $y_i = x_{(i+j)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n−j are interchangeable, the autocorrelation series forms a U-shaped curve, an example of which is shown in FIG. 24, which is necessarily symmetric about j=0 and j=n/2. Thus, the computing device in this embodiment need only calculate half of the curve, although in FIG. 24 the whole curve from j=0 to j=n is shown for clarity.

In one implementation, a computing device (such as the second computing device 110 or second computing device 324) carries out block 266 of FIG. 14C or block 472 of FIG. 16C using the actual autocorrelation numbers, and then repeats the process on the candidate mark using the polynomial-modeled curve. In practice, it has been found that a 6th-order equation using six-byte floating-point values for the coefficients will tend to match the genuine signature data within a one percent curve fit error or "recognition fidelity." The resulting match scores that the computing device obtains may be within one percent of one another. This may be true of both the high match score (as would be expected if the candidate mark was genuine) and of a low match score (as would be expected if the candidate mark was not genuine).

In an embodiment, a computing device that analyzes metrics of a mark for the purpose of generating an electronic signature (e.g., as set forth in block 412 of FIG. 16A, and block 456 of FIG. 16B) bounds and normalizes the metrics that it uses to generate the signature. For example, the computing device may express the polynomial coefficients to a fixed precision, express the autocorrelation data itself as values between −1 and +1, and use, as the sort order list, the array index location within the analyzed mark (genuine or candidate). If the mark being analyzed is a 2D data matrix, the array index may be a raster-ordered index of cell position within the mark, ordered from the conventional origin datum for the symbology being used. In one common type of 2D data matrix, the origin is the point where two solid bars bounding the left and bottom sides of the grid meet.

According to an embodiment, a computing device compares (attempts to match) the genuine signature with the candidate signature (e.g., as set forth in block 266 of FIG. 14C or block 472 of FIG. 16C) as follows. The computing device reconstitutes the signatures using the stored polynomial coefficients, autocorrelates the metrics in each list (i.e., for each characteristic measured) to generate polynomial coefficients, and compares the two sets of polynomial coefficients (compares the two autocorrelation series). The computing device may carry out this comparison in a number of ways. For example, the computing device may attempt to correlate the autocorrelation series of the candidate mark against the (reconstituted) autocorrelation curve of the signature of the genuine mark. Alternatively, the computing device may construct a curve for each of the autocorrelation series (candidate and genuine) and performing a curve-fit error on the pair of curves. FIG. 24 and FIG. 25 illustrate this process. The degree of correlation between the two sets autocorrelated values for a given characteristic (or given set of metrics for a characteristic) becomes a match score for that characteristic or set of metrics. The computing device then determines whether the candidate mark is genuine or not basic on all of the match scores for the various characteristics.

In an embodiment, a computing device that analyzes metrics of a mark for the purpose of generating an electronic signature (e.g., as set forth in block 412 of FIG. 16A, and block 456 of FIG. 16B) applies a power series analysis to the autocorrelation data for the candidate mark and to the autocorrelation data for the genuine mark. The computing device may apply such a power series analysis using a discrete Fourier transform ("DFT"):

$$X_k = \sum_{n=0}^{N-1} x_n \cdot e^{-i2\pi k n/N}$$

where $X_k$ is the $k^{th}$ frequency component, N is the length of the list of metrics, and x is the metrics data set. The computing device calculates the power series of the DFT, analyzes each frequency component (represented by a complex number in the DFT series) for magnitude, and discards the phase component. The resulting data describes the distribution of the metric data spectral energy, from low to high frequency, and it becomes the basis for further analysis. Examples of these power series are shown graphically in FIG. 26, FIG. 27, and FIG. 28.

In an embodiment, a computing device that analyzes metrics of a mark for the purpose of generating an electronic signature (e.g., as set forth in block 412 of FIG. 16A, and block 456 of FIG. 16B) employs two frequency-domain analytics: Kurtosis and Distribution Bias. In this context, Distribution Bias refers to a measure of energy distribution around the center band frequency of the total spectrum. To carry out Kurtosis, the computing device may use the following equation:

$$\text{kurtosis} = \frac{\sum_{n=1}^{N}(Y_n - \overline{Y})^4}{N(N-1)s^4}$$

where $\overline{Y}$ is the mean of the power series magnitude data, s is the standard deviation of the magnitudes, and N is the number of analyzed discrete spectral frequencies.

To calculate the Distribution Bias in an embodiment, the second computing device uses the following equation:

$$\text{Distribution Bias} = \frac{\sum_{n=0}^{(\frac{N}{2})-1} x_n - \sum_{n=N/2}^{N} x_n}{\sum_{n=0}^{N} x_n}$$

where N is the number if analyzed discrete spectral frequencies.

When using frequency-domain analytics (e.g., using the DFT) in an embodiment, a computing device considers the following criteria: The smooth polynomial curve of the signature of a genuine mark (arising from the by-magnitude sorting) yields recognizable characteristics in the spectral signature when analyzed in the frequency domain. A candidate mark, when the metrics data are extracted in the same order as those extracted from the genuine mark, will present a similar spectral energy distribution if the symbol is genuine. In other words, the genuine sort order "agrees" with the candidate's metric magnitudes. Disagreement in the sorted magnitudes, or other superimposed signals (such as photocopying artifacts), tend show up as high-frequency components that are otherwise absent in the genuine symbol spectra, thus providing an additional measure of mark authenticity. This addresses the possibility that a counterfeit autocorrelation series might still satisfy the minimum statistical match threshold of the genuine mark. The distribution characteristics of the DFT power series of such a signal will reveal the poor quality of the match via the high frequencies present in the small amplitude match errors of the candidate series. Such a condition could be indicative of a photocopy of a genuine mark. In particular, the computing device deems a high Kurtosis and a high Distribution Ratio to be present in the spectra of a genuine mark. In some embodiments, the computing device uses this power series distribution information in conjunction with the match score as a measure of confidence in the verification of a candidate mark.

Turning to FIG. 29, in an embodiment, a computing device generates an electronic signature for a mark (e.g., as set forth in block 208 of FIG. 14A, block 254 for FIG. 14B, block 414 of FIG. 16A, and block 458 of FIG. 16B) by encoding the signature as a string of bytes, which may be represented as American Standard Code for Information Interchange ("ASCII") characters, rather than as numeric magnitude data. This alternative format allows the computing device to use the signature data directly as an index for looking up the mark in a media storage device. In this embodiment, rather than storing the location and magnitude of each signature metric for the genuine mark, the computing device stores the presence (or absence) of significant signature features and each of the evaluated locations within the genuine mark. For example, in the case of a 2D Data Matrix symbol that does not carry or encode a unique identifier or serial number, the computing device stores the signature data of the mark as a string of characters, each encoding the presence or absence of a feature exceeding the minimum magnitude threshold for each characteristic in a subarea, but not encoding further data about the magnitude or number of features in any one characteristic. In this example, each subarea in the mark 1700 of FIG. 29 has four bits of data, one bit for each of set of metrics, where a '1' indicates that the particular metric has a significant feature at that subarea. For example, 0000 (hexadecimal 0) may mean that none of the four tested characteristics are present to a degree greater than the threshold magnitude in that particular subarea. A value of 1111 (hexadecimal F) would meaning that all four of the tested characteristics are present to a degree greater than the minimum in that particular subarea.

In the example of the mark 1700, the first six subareas are coded as follows. (1) A first subarea 1702 has no artifact for average luminance: it is satisfactorily black. It has no grid bias. It does have a large white void. It has no edge shape artifact: its edges are straight and even. The computing device thus codes it as 0010. (2) A second subarea 1704 has a void and an edge shape artifact. The computing device thus codes it as 0011. (3) A third subarea 1706 is noticeably gray rather than black, but has no other artifacts. The computing device thus codes it as 1000. (4) A fourth subarea 1708 has no artifacts. The computing device thus codes it as 0000. (5) A fifth subarea 1710 has a grid bias but no other artifacts. The computing device thus codes it as 0100. (6) A sixth module 1712 has no artifacts. The computing device thus codes it as 0000. Thus, the first six modules are coded as binary 001000111000000001000000, hexadecimal 238040, decimal 35-128-64, or ASCII #€@. Using a 2D Data Matrix code as an example, with a typical symbol size of 22×22 subareas, the ASCII string portion containing the unique signature data would be 242 characters in length, assuming the data is packed two modules per character (byte). The computing device stores the signature strings of genuine marks in a database, flat file, text document or any other construct appropriate for storing populations of distinct character strings.

According to an embodiment, the process by which a computing device (e.g., the second computing device 324) tests a candidate mark to determine whether the mark is genuine in an ASCII-implemented embodiment is as follows:

(1) The computing device analyzes the candidate mark and extracts its ASCII string.

(2) The computing device performs a search query via a database program using the ASCII string.

(3) The computing device (under the control of the database program) subjects signatures stored in a media storage device to a test for an exact match of the complete candidate search string. If the computing device does not find an exact string match, the computing device may attempt to locate an approximate match, either by searching for sub-strings or by a "fuzzy match" search on the whole strings.

(4) Where the search returns a match to one reference string of at least a first, minimum confidence match threshold, the computing device deems the genuine mark and candidate mark to be the same. In other words, the computing device identifies the candidate mark to be genuine. If, on the other hand, the search returns no string with a percentage match above a second, lower threshold, the computing device rejects the candidate mark as counterfeit or invalid.

(5) Where the search returns one reference string with a percentage match between the first and second thresholds, the computing device may deem the result to be indeterminate. Where the search returns two or more reference strings with a percentage match above the second threshold, the computing device may deem the result to be indeterminate. Alternatively, the computing device may conduct a further analysis to match the candidate mark's string with one of the other stored reference strings.

(6) When the result is indeterminate, the computing device may indicate (e.g., on a user interface or by transmitting a message to the third computing device 240) indicating that that the result is indeterminate. The computing device may prompt the user to submit another image of the candidate mark for testing. Instead, or in addition, the computing device may employ a retry method for encoding the individual features in the captured image of the candidate mark. The computing device may apply the retry method to any subarea whose signature data in the candidate mark is close to the magnitude minimum threshold for that metric. If the mark being tested uses an error correction mechanism, the retry method may be applied to any subarea or part of the candidate mark that the error correction mechanism indicates as possibly damaged or altered. Instead, or in addition, the computing device may de-emphasize any signature data with a magnitude that is close to that minimum magnitude threshold, for example, by searching with its presence bit asserted (set to 1) and then again with the bit un-asserted (set to 0), or by substituting a "wild-card" character. Alternatively, the computing device may recompute the percentage match query by underweighting or ignoring those bits representing features that are close to the threshold.

Mutual Vs. Unique Signature Information

In terms of composition, signatures of marks can be thought of as a summation of three signals: Uniquely Identifying information (UI), Shared or Mutual information (MI), and noise (N). The Uniquely Identifying information is what can be thought of as the unique 'fingerprint' component of the mark, while the Mutual information is the carrier of the sibling signature where common features are shared across multiple marks. The noise component can be either systematic (an artifact of the verification device, for instance) or random, and in either case does not contribute positively to the signature identification process.

Extending the above discussion, in the case of a genuine item it can be seen that both UI and MI correlate well, impacted to the negative by the relative magnitude of N. In the case of a sibling, the UI component is generally uncorrelated, but here MI shows a definite similarity between the two sibling signatures. For counterfeit marks, all three component signals are uncorrelated. FIG. 30 graphically illustrates this concept.

Sibling Production

Generally, siblings occur as part of plate-based printing processes, such as lithographic or flexographic printing. During a production run, every impression made by a particular plate may share a sibling relationship where the signature data is somewhat correlated. For plates with multiple impressions of the same artwork, the siblings are produced per-impression. It is typical of a flexographic plate to have multiple instances of the pattern to be printed arranged such that, when mounted to a plate cylinder, one revolution of the cylinder produces multiple impressions of the (same) artwork pattern. For example, a six impression plate may yield six printed marks per cylinder revolution. In this case, every 6th mark is part of its own 'sibling set.' In other words, as this process runs, the production batch will have 6 distinct sets of related siblings (one per plate impression). For certain characteristics of certain features, there may be no detectable correlation between sibling marks. That is, according to certain characteristics of certain features, they appear as 'counterfeits' with respect to one another from a signature analysis standpoint. See, for example, FIG. 31. In an embodiment, however, using certain other characteristics, a computing device may identify a correlation and determine that the marks are siblings. This aspect will be discussed below in more detail.

Note that sibling production is not a deliberate or actively managed process. It is a natural attribute of marks produced by the above discussed printing methods, and as such constitutes an "emergent" print property of which use can be made.

Sibling Recognition

As illustrated in FIG. 12, sibling signatures exhibit an elevated similarity when their data is subjected to statistical correlation analysis.

Signal Separation

According to various embodiments, a computing device recognizes when sibling signature information is present, and uses this information during mark analysis, e.g., by distinguishing between an independently produced counterfeit and an illicit copy of a mark made with the legitimate marking equipment. To carry out this process in an embodiment, the computing device separates the mutual from the unique information while minimizing the effects of noise.

In an embodiment, the computing device identifies the mutual information component within a set of sibling signatures by taking the average of all the signatures. Since the UI components are by definition uncorrelated, their individual contributions will average out (along with the random noise component), leaving only the shared sibling MI.

Once the computing device isolates MI, it can subtract the MI from the original individual signatures, thereby creating signatures with the MI removed. From a signature analysis standpoint, this effectively converts siblings into non-siblings, since once the shared information has been removed there remain only non-correlating signals. How this is useful shall be discussed further below.

Anti-Siblings

A form of shared information includes conditions where an anti-correlation exists between an instance of a mark and its siblings. Here, when the computing device compares a mark to its anti-sibling, the result is an elevated correlation result in the negative. That is, while a sibling relationship will generally produce a cross-correlation between two marks of between 0.1 and 0.4, and anti-sibling will yield a signature correlation of between −0.1 and −0.4. Remembering that truly independent marks (non-siblings or counterfeits) will be uncorrelated with scores near zero, the anti-correlation phenomenon indicates that a process is at work creating a measurable relationship between the signatures derived from multiple marks. Therefore, even though the measured relationship is one of opposites, therein still resides information indicating a likely similar mark origination, which the computing device can use.

The plots shown in FIGS. 32-34 illustrate example signature data for the three relationships discussed above.

Applications of the Sibling Phenomenon

In an embodiment, the computing device may perform at least three primary analytical operations on signature data to create useful applications of the sibling information:

Carry out cross-correlation operations on individual signatures to thereby establish that sibling relationships exist among a population of signatures.

Calculate the common signature information making up the sibling signature (i.e., the shared information) for a set of siblings.

"Clean" siblings of their shared sibling signature information and thereafter treat them as non-sibling marks in subsequent search and signature data processing operations.

Having identified that sibling relationships exist between signatures in a database, and having extracted those sibling signatures, the computing device is able to perform useful operations on the database and constituent signature data.

For example, the computing device may narrow the search space for finding the correct original genuine signature within the repository when executing a verification operation on a candidate mark. With the sibling signatures of the mark data held in the database, the computing device can perform a two-step search, effectively reducing the size of the data block to which it applies the exhaustive low-frequency waveform search operation. At a high level, the procedure carried out by the computing device according to an embodiment is as follows:

Analyze all signatures in the database and carry out a clustering operation on the signatures based on MI.

For each cluster,
Extract the sibling signature
Store the sibling signature in the database in association with the corresponding cluster.

Upon reception of a candidate mark, select the correct cluster by comparing the cluster signatures with the incoming candidate signature.

Pass the best-matching cluster in its entirely into a matching procedure.

By narrowing down the search in an initial pass through a set of cluster signatures of genuine marks, a computing device or logic circuitry can significantly cut down on the number of signatures that need to be compared.

Use of Sibling Processing Techniques in the Context of HID

In an embodiment, a computing device may use sibling identification and processing to further optimize the techniques described above with respect to the HID embodiment.

What is described above is a set of clustered original genuine fingerprint data that can be searched by comparing an incoming candidate to each cluster's sibling signature, with the one yielding the highest similarity being the correct cluster upon which to perform an exhaustive secondary search. The fingerprint processing from there proceeds as described above.

In many embodiments, the primary groupings of siblings will be their impression position on the printing plate. For extremely large production lots, even reducing the size of the search block to a single group using the sibling signature may yield a search latency exceeding the limits imposed by real-time verification requirements. Reducing the size of the clusters (e.g., by narrowing the search to HIDs corresponding to a particular, identified printer, as indicated by sibling data) may be used to reduce the search space (i.e., the computing device need only carry out the most computationally expensive comparison process on a subset of signatures) and thereby speed up the process.

For example, turning to FIG. 35, a computing device builds a search tree by running a clustering procedure (e.g., a well-known clustering procedure such as K-means clustering) on the signatures. This procedure will yield bottom tier of clusters. For each cluster, the computing device extracts a single sibling signature that represents all of the members of that cluster. The computing device then runs the same clustering procedure on the resulting clusters and thereby identifies superclusters. The computing device then continues for n levels, thereby building the search tree. When the computing device receives a candidate mark, it extracts a signature from the mark (using one or more of the techniques previously described—measuring characteristics, etc.), including a sibling signature, enters the search tree at the top, compares the candidate sibling signature, finds the best match, and so on. The result is that the computing device is comparing the candidate against successively more precise sibling signatures that resolve into smaller and smaller subsets until ultimately it reaches get to the bottom tier of the tree, where it ultimately carries out the more exhaustive comparison on the full, individual signatures. The computing device then gives one or more notifications as noted above in the previous sections. Note that, instead of sibling signatures, each successive supercluster or cluster could be represented by an HID, and the comparison (for sameness) can be made using the HIDs (until the final cluster on the bottom tier).

Continuing with FIG. 35, assume that a computing device receives a candidate mark ("incoming mark") in a manner previously described. Further assume that the computer device has access to a database of marks that are indexed as described in conjunction with the HID Embodiment, with the further feature that, as shown in FIG. 35, each sibling (e.g., each individual, identified printer) has its own supercluster and/or cluster associated with it and appropriately indexed in the database. The computing device may: (a) analyze the mark using one or more of the techniques described herein, (b) identify a sibling signature within the candidate mark (e.g., to identify which printer produced the candidate mark [e.g., identify which plate printed the mark or which plate impression group the mark belongs to]), (c) use the identified sibling signature to select which supercluster to search, (d) use further sibling signature data (or other non-sibling characteristics) to determine which cluster within the selected supercluster to search, (e) repeat this process of narrowing down the search space as needed and as based on the structure of the database, and (f) conduct the final search of the search space using either a brute force method or using one or more of the HID techniques described above.

Signature Decay

It has been observed in studies that sibling signatures sometimes exhibit a decay property; that is, they change over time with a quantifiable time constant. The plot of FIG. 36 illustrates this concept.

In creating the plot of FIG. 36, the computing device uses the first item in the series as the reference signature against which all the other signatures are compared. Again, the typical periodic series of peaks is evident, showing that the test set indeed contains sibling marks. However, a decay of the sibling similarity is observed in the data, meaning that the strength of the sibling similarity has a localized aspect with respect to the production sequence of the marks. In short, the closer to each other two marks reside within the production series, the stronger their shared similarity measure.

Carried out long enough—that is, extending the above chart much further to the right—one would observe the sibling similarity peaks eventually extinguish completely. What that means physically is that there would be marks produced by the same plate impression but devoid of the shared mutual information necessary to 'behave' like siblings. Including all these marks in the same cluster would produce poor performance during cluster searches due to the resulting sibling signature being the average of many weakly correlated signatures. Any such derived signature would match with similar weakness to any candidate, even if that candidate mark 'belonged' to the compared cluster/plate impression group.

In these instances the computing device employs a method of periodically creating a new cluster as it moves along the mark series. This has the effect of 'cutting up' the (potentially enormous) single set of sibling marks into smaller, more manageable sets. Of particular benefit, the frequency of establishing new clusters can be controlled as desired, and thus yield clusters sized as appropriate for fast secondary searches, or even for exhaustive processing using the full mark signature comparison methods.

The plot of FIG. 37 illustrates the single cluster data of FIG. 36 processed into five smaller clusters. Note how the shared similarity measure within each new cluster is much improved, meaning that the sibling signatures derived for each cluster may be used as a way of selecting an incoming candidate signature into the correct cluster.

Statistical Analysis of Signature Data

In an embodiment, the computing device creates multiple filtered profiles for a genuine mark over multiple spatial frequency bands and stores those filtered profiles in a media storage device. Subsequently, when the computing device receives an image of a candidate mark that is to be tested for genuineness, the computing device (a) creates filtered profiles for the candidate mark (e.g., blocks 508, 510, 608, and 610), (b) compares the filtered profile for the candidate mark in a particular spatial frequency band with the filtered profile of the genuine mark in the same spatial frequency band (e.g., by running a statistical correlation function on the data series of the filtered profile of the genuine mark and the filtered profile of the candidate mark) (e.g., block 612), (c) assigns a correlation score based on the statistical correlation, (d) repeats (b) and (c) for multiple frequency bands, and (e) creates a spatial frequency spectrum correlation profile based on the collection of correlation scores. For example, the correlation score may be the numerical series correlation for the genuine and candidate metrics data band-filtered at a particular frequency band.

Sibling Series Patterns

FIG. 38 depicts a plot showing the similarity between characteristics of single references mark (the first in the plot series) and a group of marks created in the same production batch on the same printing device. As can be seen, there are a series of sibling peaks (data points that possibly map to a sibling signature) which, in this example, have a period of seven (i.e., the plate used to produce this series of marks had seven impressions around the print cylinder). When a computing device obtains the data reflected in this plot and conducts an analysis, the computing device would conclude that the data between the sibling peaks conforms to an approximately repeating shape. This data, representing the six marks between each sibling peak, may be used by the computing device to characterize the similarity of the non-siblings against a reference mark when evaluated in order of print production. In effect, what the computing device may do is plot and identify the "stable dissimilarity" that is characteristic between different sibling sets. Thus, the computing device, in an embodiment, may establish (at the front end when the mark is produced) or identify (during verification of a candidate mark) a signature of the printing process that produced this series of marks. The computing device may apply this principle in a variety of ways. For example, if the computing device collects a set of counterfeit data over a period of time, and a subsequent law enforcement raid yields a seizure of counterfeit marks or production equipment, the computing device can fit the collected counterfeit sibling signature data against the signature data obtained from the computing device analyzing (according to one or more techniques described herein) the seized marks or marks produced by the seized equipment. This may then be used as evidence in the prosecution of the counterfeiter and to establish with certainty that the equipment seized did indeed produce the counterfeits found in circulation.

In an embodiment, the spatial frequency spectrum correlation profile is made up of a data series that includes the correlation scores ordered in a predetermined manner. FIG. 39 shows an example of a spatial frequency spectrum correlation profile, depicted as a plot. The horizontal axis is made up of numerical values assigned to each of the band-pass filters. For example, band-pass filter #1 might admit spectral components from wavelengths of 3 millimeters to 6 millimeters, band-pass filter #2 might admit spectral components from wavelengths of 6 millimeters to 12 millimeters, etc. The vertical axis is made up of the correlation scores of the correlation operation carried out by the computing device on the respective filtered profiles of the candidate mark and the genuine mark.

In an embodiment, the computing device compares the spatial frequency spectrum correlation profile of a candidate mark and that of a genuine mark and determines, based on the comparison, whether the candidate mark is the genuine mark. Additionally or alternatively, the computing device determines whether the candidate mark was printed using the same printing plate as the genuine mark (e.g., after making a determination that the candidate mark is not genuine). The shape of the spatial frequency spectrum correlation profile indicates the result and the computing device may interpret this shape as part of carrying out block 614. For example, FIG. 39 shows the typical 'hump' shape of a genuine mark (line 2102) and the low, flat line of a counterfeit mark (line 2104). FIG. 40 shows a genuine (line 2202) vs. a photocopy of the same genuine mark (line 2204).

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope. For example, the steps of the various flow charts can be reordered in ways that will be apparent to those of skill in the art. Furthermore, the steps of these flowcharts as well as the methods described herein may all be carried out on a single computing device.

What is claimed is:

1. On a computing device, a method for determining whether a candidate mark is genuine, the method comprising:
    receiving a captured image of a genuine mark;
    measuring, using the captured image, a characteristic of the genuine mark at a plurality of locations within the genuine mark, resulting in a set of metrics for the characteristic for the genuine mark;
    generating, based on the set of metrics, an electronic signature for the genuine mark;
    repeating the receiving, measuring, and generating steps for each of a plurality of genuine marks, resulting in a plurality of genuine signatures;
    carrying out a statistical correlation analysis of the plurality of genuine signatures;
    determining, based on the statistical correlation analysis, which signatures are sufficiently correlated to indicate that the marks they represent were printed on the same printer;
    based on the correlation determination, clustering the genuine signatures of the plurality into a plurality of clusters;
    generating a sibling signature for each of the plurality of clusters;
    receiving a captured image of a candidate mark;
    measuring, using the captured image, a characteristic of the candidate mark at a plurality of locations within the genuine mark, resulting in a set of metrics for the characteristic for the candidate mark;
    generating, based on the set of metrics, an electronic signature for the candidate mark;
    comparing the electronic signature of the candidate mark with the sibling signature of each of the plurality of clusters to identify which cluster is the best match for the candidate mark;
    comparing the electronic signature of the candidate mark to each of the electronic signatures of the cluster identified to be the best match;
    determining whether the candidate mark is genuine based the comparison of its electronic signature with each of the electronic signatures of the cluster identified to be the best match; and
    generating a message to a user based on the genuineness determination.

2. The method of claim 1, wherein the statistical correlation analysis comprises:
    calculating an average of the plurality of genuine signatures; and
    identifying mutual information of the plurality of genuine signatures based on the calculated average, wherein the mutual information comprises features that are shared by genuine signatures printed from the same printer.

3. The method of claim 2, further comprising removing the mutual information from each of the plurality of signatures in a cluster of the plurality of clusters prior to comparing the electronic signature of the candidate mark to each of the electronic signatures of the cluster identified to be the best match.

4. The method of claim 1, wherein generating a sibling signature for a cluster comprises identifying common features are shared across each of the electronic signatures of the cluster.

5. The method of claim 1, wherein comparing the electronic signature of the candidate mark with the sibling signature of each of the plurality of clusters comprises comparing an autocorrelation series of the metrics of the candidate mark with an autocorrelation series of the stored metrics of the sibling signature.

6. The method of claim 1, wherein comparing the electronic signature of the candidate mark with the electronic signature of each of the plurality electronic signatures of the cluster determined to be the best match comprises comparing an autocorrelation series of the metrics of the candidate mark with an autocorrelation series of the metrics of each of the plurality of electronic signatures of the cluster.

7. The method of claim 1, wherein each of the plurality of locations is a subarea of the genuine mark and the characteristic is an average pigmentation of the subarea.

8. The method of claim 1, wherein each of the plurality of locations is a subarea of the genuine mark and the characteristic is a deviation in the position of the subarea from a best-fit grid.

9. The method of claim 1, wherein each of the plurality of locations is a subarea of the genuine mark and the characteristic is the occurrence of stray marks or voids in the subarea.

10. The method of claim 1, wherein the characteristic is the projected average pixel values of an edge of the genuine mark.

11. The method of claim 1, wherein the genuine mark is a printed barcode.

12. The method of claim 1, further comprising:
    receiving one or more additional captured images of the genuine mark,
    wherein measuring a characteristic of the genuine mark using the captured image comprises:
        fusing the captured image of the genuine mark with the one or more additional captured images to create a fused image, and using the fused image, measuring a characteristic of the genuine mark at a plurality of locations within the genuine mark, resulting in a set of metrics for the characteristic.

13. On a computing device, a method for determining whether a candidate mark is genuine, the method comprising:

receiving a captured image of a genuine mark;
measuring, using the captured image, a characteristic of the genuine mark at a plurality of locations within the genuine mark, resulting in a set of metrics for the characteristic for the genuine mark,
wherein the plurality of locations corresponds to a plurality of location identifiers;
generating, based on the set of metrics, an electronic signature for the genuine mark;
repeating the receiving, measuring, and generating steps for each of a plurality of genuine marks, resulting in a plurality of genuine signatures;
determining, based on a statistical correlation analysis of the plurality of genuine signatures, which genuine signatures are sufficiently correlated to indicate that the marks they represent were printed on the same printer;
based on the statistical correlation analysis, clustering the genuine signatures of the plurality into a plurality of clusters;
generating a sibling signature for each of the plurality of clusters;
deriving a hash identifier for the sibling signature using a subset of the plurality of location identifiers;
receiving a captured image of a candidate mark;
measuring, using the captured image, a characteristic of the candidate mark at a plurality of locations within the candidate mark, resulting in a set of metrics for the characteristic for the candidate mark;
generating, based on the set of metrics, an electronic signature for the candidate mark;
deriving a hash identifier for the electronic signature of the candidate mark using a subset of the plurality of location identifiers;
comparing the hash identifier of the candidate mark with the hash identifier of each of the plurality of clusters to identify which cluster is the best match;
comparing the electronic signature of the candidate mark to each of the electronic signatures of the cluster identified to be the best match;
determining whether the candidate mark is genuine based the comparison of its electronic signature with each of the electronic signatures of the cluster identified to be the best match; and
generating a message to a user based on the determination.

14. The method of claim 13, wherein the plurality of locations is associated with a plurality of location identifiers, the method further comprising:

deriving a hash identifier for the candidate mark using a subset of the plurality of location identifiers, wherein the subset of the plurality of locations is sibling-specific;
wherein comparing the electronic signature of the candidate mark with the sibling signature of each of the plurality of clusters comprises
determining, based on a comparison of the hash identifier of the candidate mark with a hash identifier of each of the sibling signatures of the plurality of clusters, whether the hash identifier of the candidate mark closely matches a hash identifier of any of the sibling signatures,
if the hash identifier of the candidate mark is determined to closely match a hash identifier of a sibling signature, then searching only the cluster for further electronic signature matches.

15. The method of claim 13, further comprising:

deriving a hash identifier for the candidate mark using index values corresponding to the subset of the plurality of locations associated with highest-magnitude metrics of the set of metrics of the candidate mark;
wherein comparing the electronic signature of the candidate mark with the sibling signature of each of the plurality of clusters comprises
determining, based on a comparison of the hash identifier of the candidate mark with a hash identifier of a sibling signature of a cluster of the plurality of clusters, whether the hash identifier of the candidate mark closely matches the hash identifier of the sibling signature;
if the hash identifier of the candidate mark is determined to closely match the hash identifier of the sibling signature, then retrieving, from a media storage device, an electronic signature of the genuine mark.

16. The method of claim 13, wherein the plurality of location identifiers comprises a plurality of index values.

17. The method of claim 13, wherein each of the plurality of locations is a subarea of the mark being measured and the characteristic is an average pigmentation of the subarea.

18. The method of claim 13, wherein each of the plurality of locations is a subarea of the mark being measured and the characteristic is a deviation in the position of the subarea from a best-fit grid.

19. The method of claim 13, wherein each of the plurality of locations is a subarea of the mark being measured and the characteristic is the occurrence of stray marks or voids in the subarea.

20. The method of claim 13, wherein the characteristic is the projected average pixel values of an edge of the genuine mark.

21. The method of claim 13, further recomprising:

receiving one or more additional captured images of the genuine mark,
wherein measuring a characteristic of the genuine mark using the captured image comprises:
fusing the captured image of the genuine mark with the one or more additional captured images to create a fused image, and
using the fused image, measuring a characteristic of the genuine mark at a plurality of locations within the genuine mark, resulting in a set of metrics for the characteristic.

22. A computing device that carries out actions comprising:

receiving a captured image of a genuine mark;
measuring, using the captured image of the genuine mark, a characteristic of the genuine mark at a plurality of locations within the genuine mark, resulting in a set of metrics for the characteristic for the genuine mark;
generating, based on the set of metrics for the genuine mark, an electronic signature for the genuine mark;
repeating the receiving, measuring, and generating steps for each of a plurality of genuine marks, resulting in a plurality of genuine signatures;

carrying out a statistical correlation analysis of the plurality of genuine signatures;
determining, based on the statistical correlation analysis, which signatures are sufficiently correlated to indicate that the marks they represent were printed on the same printer;
based on the correlation determination, clustering the genuine signatures of the plurality into a plurality of clusters;
generating a sibling signature for each of the plurality of clusters;
receiving a captured image of a candidate mark;
using the captured image of the candidate mark, measuring the characteristic at a plurality of locations within the candidate mark, resulting in a set of metrics for the characteristic for the candidate mark;
generating, based on the set of metrics for the candidate mark, an electronic signature for the candidate mark;
comparing the electronic signature of the candidate mark with the sibling signature of each of the plurality of clusters to identify which cluster is the best match for the candidate mark;
comparing the electronic signature of the candidate mark to each of the electronic signatures of the cluster identified to be the best match;
determining whether the candidate mark is genuine based the comparison of its electronic signature with each of the electronic signatures of the cluster identified to be the best match; and
generating a message to a user based on the genuineness determination.

23. The computing device of claim 22, wherein each of the plurality of locations is a subarea of the mark being measured and the characteristic is an average pigmentation of the subarea.

24. The computing device of claim 22, wherein each of the plurality of locations is a subarea of the mark being measured and the characteristic is a deviation in the position of the subarea from a best-fit grid.

25. The computing device of claim 22, wherein the characteristic is the projected average pixel values of an edge of the mark being measured.

26. The computing device of claim 22, further recomprising:
receiving one or more additional captured images of the genuine mark,
wherein measuring the characteristic of the genuine mark using the captured image comprises:
fusing the captured image of the genuine mark with the one or more additional captured images to create a fused image, and
using the fused image, measuring a characteristic of the genuine mark at a plurality of locations within the genuine mark, resulting in a set of metrics for the characteristic for the genuine mark.

* * * * *